(12) United States Patent
Takasawa et al.

(10) Patent No.: US 8,356,312 B2
(45) Date of Patent: Jan. 15, 2013

(54) CARTRIDGE DRIVE APPARATUS FOR A DISC CARTRIDGE THAT HOLDS A DISC

(75) Inventors: Takeharu Takasawa, Kanagawa (JP); Takeshi Kubo, Kanagawa (JP); Nobuhiko Tsukahara, Kanagawa (JP); Naofumi Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 12/942,090

(22) Filed: Nov. 9, 2010

(65) Prior Publication Data

US 2011/0119693 A1    May 19, 2011

(30) Foreign Application Priority Data

Nov. 16, 2009   (JP) ................................ 2009-261406

(51) Int. Cl.
  *G11B 21/08*  (2006.01)
  *G11B 7/085*  (2006.01)
(52) U.S. Cl. ................... 720/615; 369/30.83; 369/30.85
(58) Field of Classification Search ............... 369/30.81, 369/30.82, 30.83, 30.84; 720/614, 615, 732, 720/733
  See application file for complete search history.

(56) References Cited

U.S. PATENT DOCUMENTS

| | | | | |
|---|---|---|---|---|
| 5,138,591 A * | 8/1992 | Ogawa et al. | ............... | 369/30.83 |
| 5,481,512 A * | 1/1996 | Morioka et al. | ........... | 369/30.82 |
| 5,508,994 A * | 4/1996 | Nakamichi et al. | ........ | 369/30.78 |
| 5,970,043 A * | 10/1999 | Fujisawa | ....................... | 720/714 |
| 6,341,119 B1 * | 1/2002 | Ezawa et al. | ............... | 369/30.83 |
| 6,959,444 B2 * | 10/2005 | Peng | .............................. | 720/615 |
| 7,159,229 B2 | 1/2007 | Inoue et al. | | |
| 7,246,363 B2 * | 7/2007 | Morioka et al. | ............. | 720/614 |
| 7,339,858 B2 * | 3/2008 | Tatekawa | .................. | 369/30.85 |
| 7,533,397 B2 | 5/2009 | Ohgi | | |
| 7,774,802 B2 * | 8/2010 | Tokita et al. | .................. | 720/614 |
| 8,065,694 B2 * | 11/2011 | Owens et al. | ................. | 720/732 |
| 2001/0012260 A1 * | 8/2001 | Tamiya et al. | ................ | 369/192 |
| 2002/0021653 A1 * | 2/2002 | Takeshima et al. | .......... | 369/191 |
| 2003/0012089 A1 * | 1/2003 | Fujimoto | ................... | 369/30.82 |
| 2011/0119691 A1 | 5/2011 | Goto et al. | | |
| 2011/0225602 A1 | 9/2011 | Kubo et al. | | |
| 2011/0296449 A1 | 12/2011 | Goto et al. | | |
| 2011/0296450 A1 | 12/2011 | Goto et al. | | |
| 2011/0296451 A1 | 12/2011 | Goto et al. | | |

FOREIGN PATENT DOCUMENTS

| | | |
|---|---|---|
| JP | 2004-134019 A | 4/2004 |
| JP | 2007-115328 A | 5/2007 |
| JP | 2007-172726 A | 7/2007 |

* cited by examiner

*Primary Examiner* — Brian Miller
(74) *Attorney, Agent, or Firm* — Wolf, Greenfield & Sacks, P.C.

(57) ABSTRACT

A cartridge drive apparatus for a disc cartridge having upper and lower shells which are separatably joined to each other to form a cartridge body is disclosed, in which a accommodated disc is able to be inserted or ejected by separating the upper and lower shells vertically. The cartridge drive apparatus includes a cartridge holder which, by inserting the cartridge body, has an upper holder supporting the upper shell and a lower holder supporting the lower shell, and a holder moving mechanism which separates the upper holder and the lower holder of the cartridge holder to separate the upper shell and the lower shell and thus is able to allow the disc to be inserted or ejected.

7 Claims, 42 Drawing Sheets

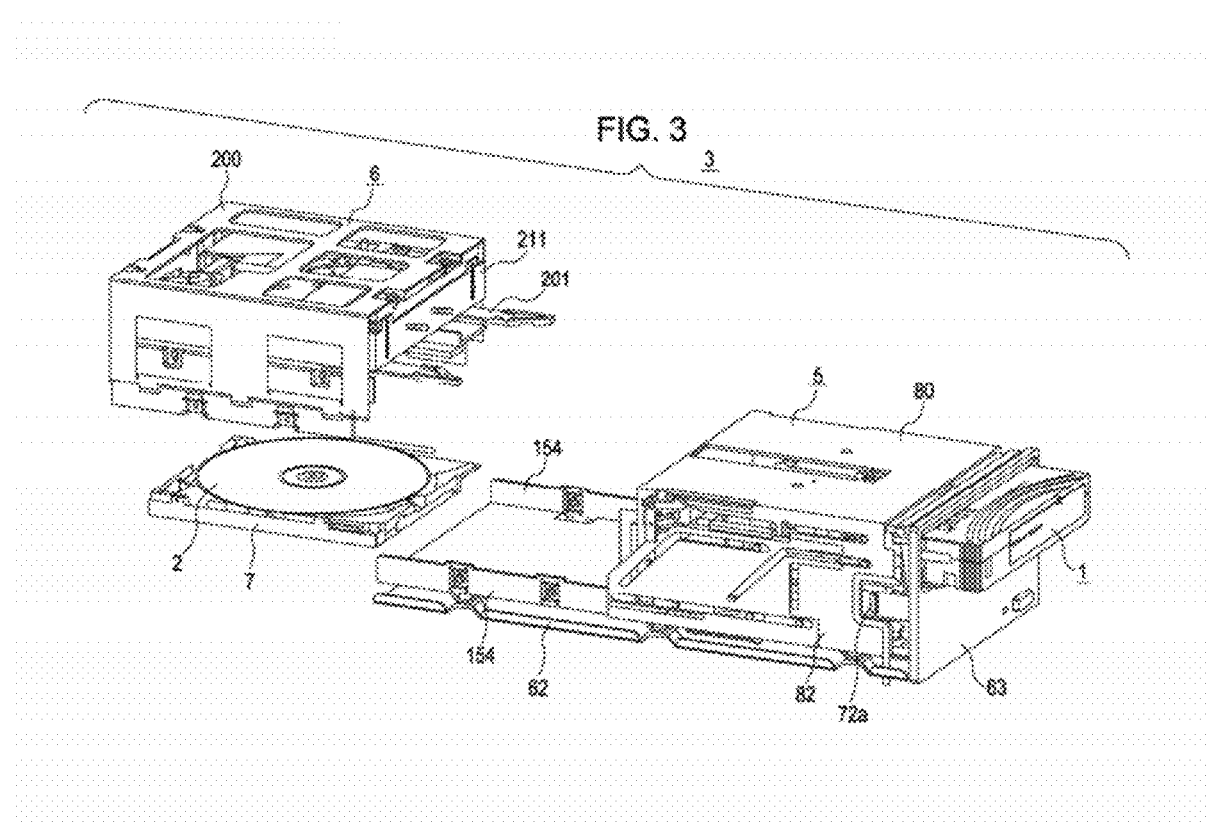

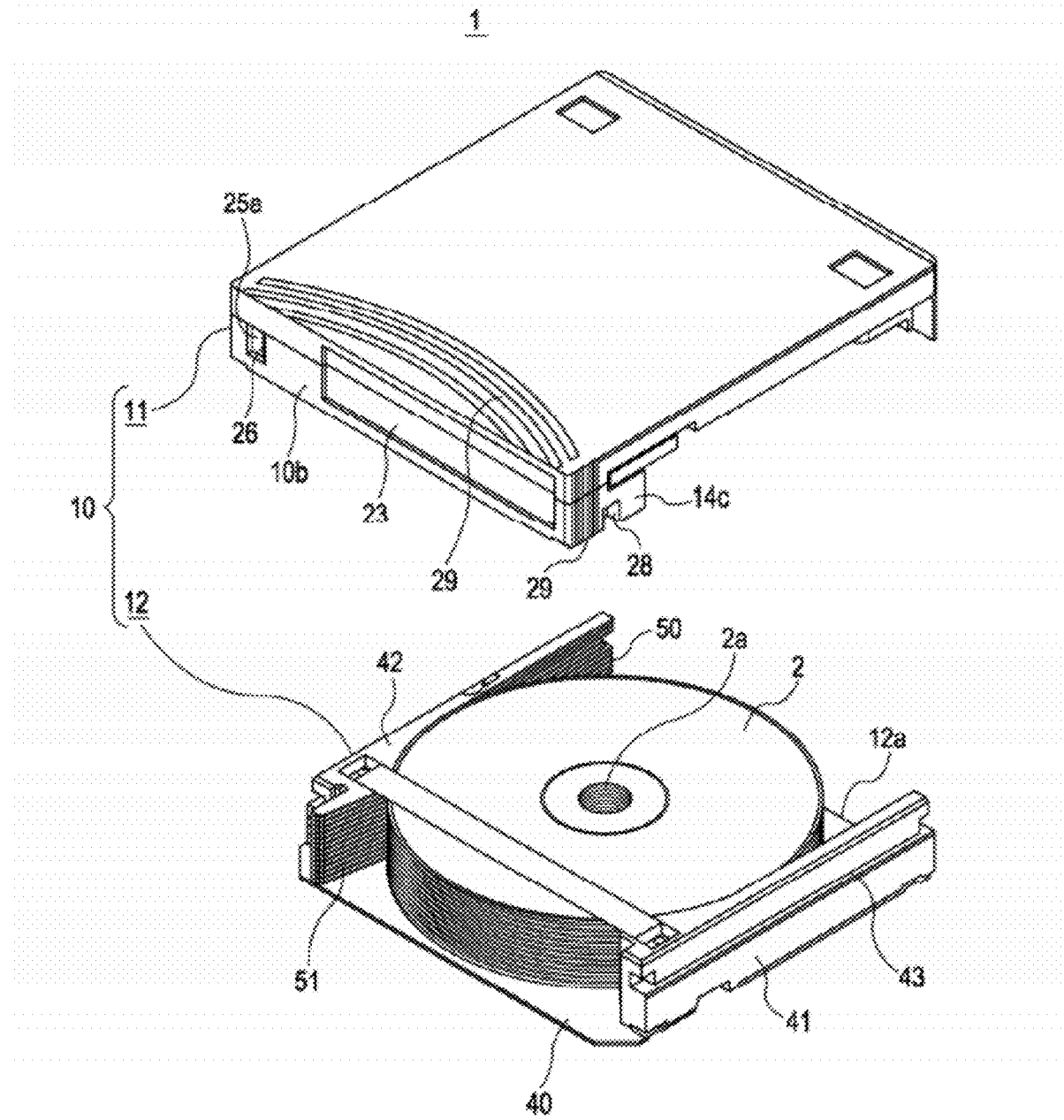

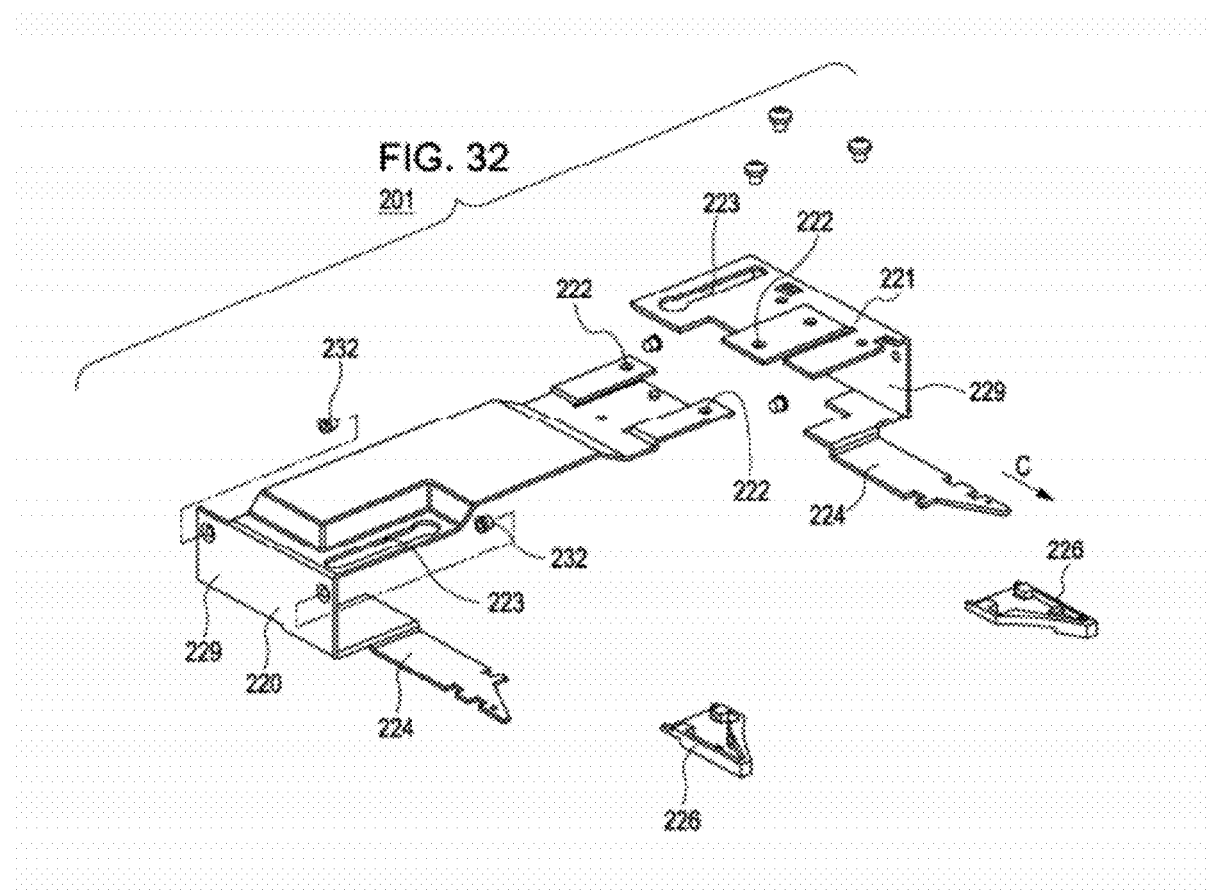

203, 204

CARTRIDGE DRIVE APPARATUS FOR A DISC CARTRIDGE THAT HOLDS A DISC

BACKGROUND OF THE INVENTION

1. Field of the Invention

The present invention relates to a cartridge drive apparatus capable of ejecting a disc by separating a cartridge body when a disc cartridge accommodating the disc is inserted.

2. Description of the Related Art

In the past, various cartridge drive apparatuses for a disc cartridge accommodating optical discs have been used. This type of the disc cartridge drive apparatus includes a shutter opening/closing mechanism for opening or closing a shutter which retracts a cartridge body into the inside of the apparatus body and closes a recoding/reproducing opening formed at the cartridge body. In the disc cartridge drive apparatus, as the recording/reproducing opening is opened, an optical pickup mechanism faces the optical disc in a radial direction, so that writing and/or reading of information signals is performed.

However, the recording capacity of a disc-type recording medium has dramatically increased in recent years, and thus the recording medium has the capacity necessary for storing amount of information to handle on the individual level. On the other hand, even in a case where super-multilayered discs or volumetric recording discs, which will be expected to be put into practical use in the future, are applied to a cloud computer data center or a system demanding to record and store large-capacity of data, the recording capacity of one cartridge will not be sufficient in the future if each sheet is stored in the cartridge one by one in the same manner as in Blu-ray Disc (BD) or professional disc.

In addition, if a data center is configured by using a disc loader machine or cart machine which handles a plurality of disc cartridges which each accommodates a large-capacity disc, it is not sufficient to improve the using efficiency of a space.

As a method of solving the above problems, a configuration, in which several sheets of sheet-like discs are stored in one cartridge, has been proposed by Japanese Unexamined Patent Application Publication No. 2004-134019, Japanese Unexamined Patent Application Publication No. 2007-115328, and Japanese Unexamined Patent Application Publication No. 2007-172726. However, since the above configuration demands dedicated as many disc trays as the number of discs which is able to be accommodated therein, it causes the cartridge body to grow in size and in weight. In addition, for example, since it is necessary that the disc cartridge drive apparatus driving the disc be provided with a mechanism for transporting the disc tray and ejecting only the disc from the disc tray, the disc loading mechanism becomes complicated and larger. Moreover, there is a problem in that the apparatus body becomes larger and expensive, for example, since a mechanism for stabilizing rotation of the sheet-like disc is necessary.

SUMMARY OF THE INVENTION

Therefore, it is desirable for the present invention to provide a cartridge drive apparatus which achieves space-savings, in which a disc cartridge accommodating discs is accommodated, without using a disk tray.

According to an embodiment of the present invention, there is provided a cartridge drive apparatus for a disc cartridge having upper and lower shells which are separatably joined to each other to form a cartridge body, in which a accommodated disc is able to be inserted or ejected by separating the upper and lower shells vertically, the cartridge drive apparatus including: a cartridge holder which, by inserting the cartridge body, has an upper holder supporting the upper shell and a lower holder supporting the lower shell; and a holder moving mechanism which separates the upper holder and the lower holder of the cartridge holder to separate the upper shell and the lower shell and thus is able to allow the disc to be inserted or ejected.

An embodiment of the present invention includes the cartridge holder having the upper holder and the lower holder which hold each of the upper and lower shells of a disc cartridge, in which a disc is able to be inserted or ejected by separating the upper and lower shells, and a holder lifting mechanism for separating the cartridge holder vertically. Therefore, according to an embodiment of the present invention, since the insertion and ejection of the disc is possible only by vertically separating the upper and lower shells, the cartridge drive apparatus which achieves space-savings with a simple configuration is able to be provided.

BRIEF DESCRIPTION OF THE DRAWINGS

FIG. 3 is an exploded perspective view illustrating a Disc changer apparatus;

FIGS. 4A and 4B are perspective views illustrating an appearance of a disc cartridge, in which FIG. 4A illustrates an upper surface side and FIG. 4B illustrates a lower surface side;

FIG. 5 is a perspective view illustrating a state where a disc cartridge is divided into upper and lower shells;

FIGS. 26A and 26B are perspective views illustrating the state in which an optical disc is ejected from a lower shell, in which FIG. 26A shows the state in which an push-out lever is guided by a guide part, and FIG. 26B shows the state in which the push-out lever is removed from the guide part and ejects the optical disc to a position in which the optical disc is retracted by a carry loader;

FIG. 32 is an exploded perspective view illustrating a loading arm;

FIGS. 41A and 41B are diagrams illustrating a slide limiter mechanism in a typical pushing-back process, in which FIG. 41A is a perspective view and FIG. 41B is a cross-sectional view;

FIGS. 42A and 42B are diagrams illustrating a slide limiter mechanism in the state in which movement of a loading arm is limited in a pushing-back process, in which FIG. 42A is a perspective view and FIG. 42B is a cross-sectional view.

DESCRIPTION OF THE PREFERRED EMBODIMENTS

A disc cartridge and a Disc changer apparatus to which the present invention is applied will now be described in detail with reference to the accompanying drawings. In addition, the description will be performed in the following order.

Figure 1:
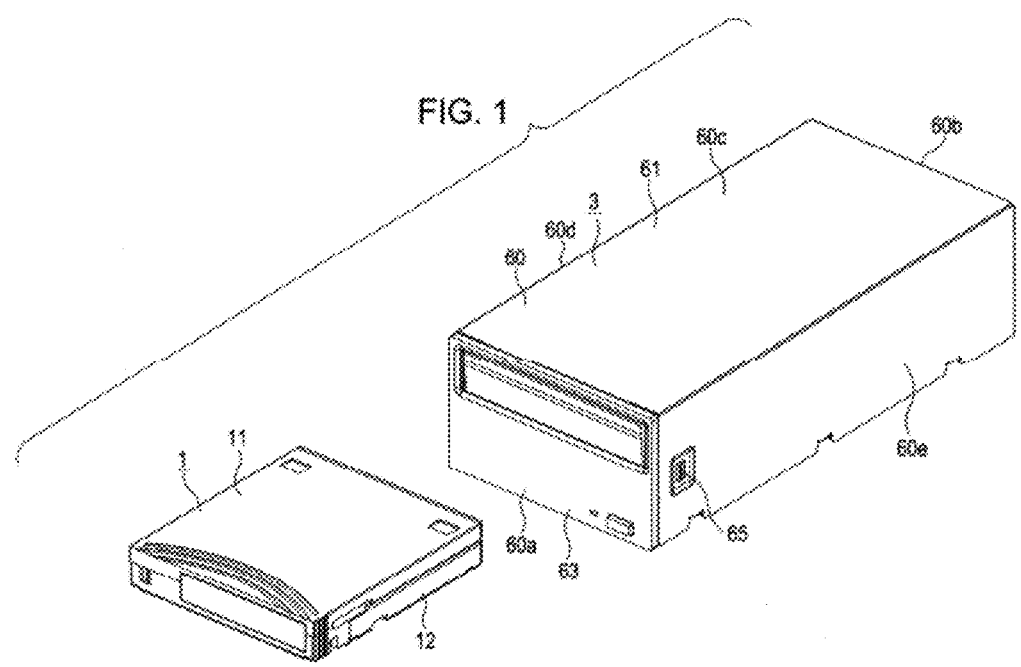
FIG. 1 is a perspective view illustrating an appearance of a disc cartridge and a Disc changer apparatus.
Figure 2:
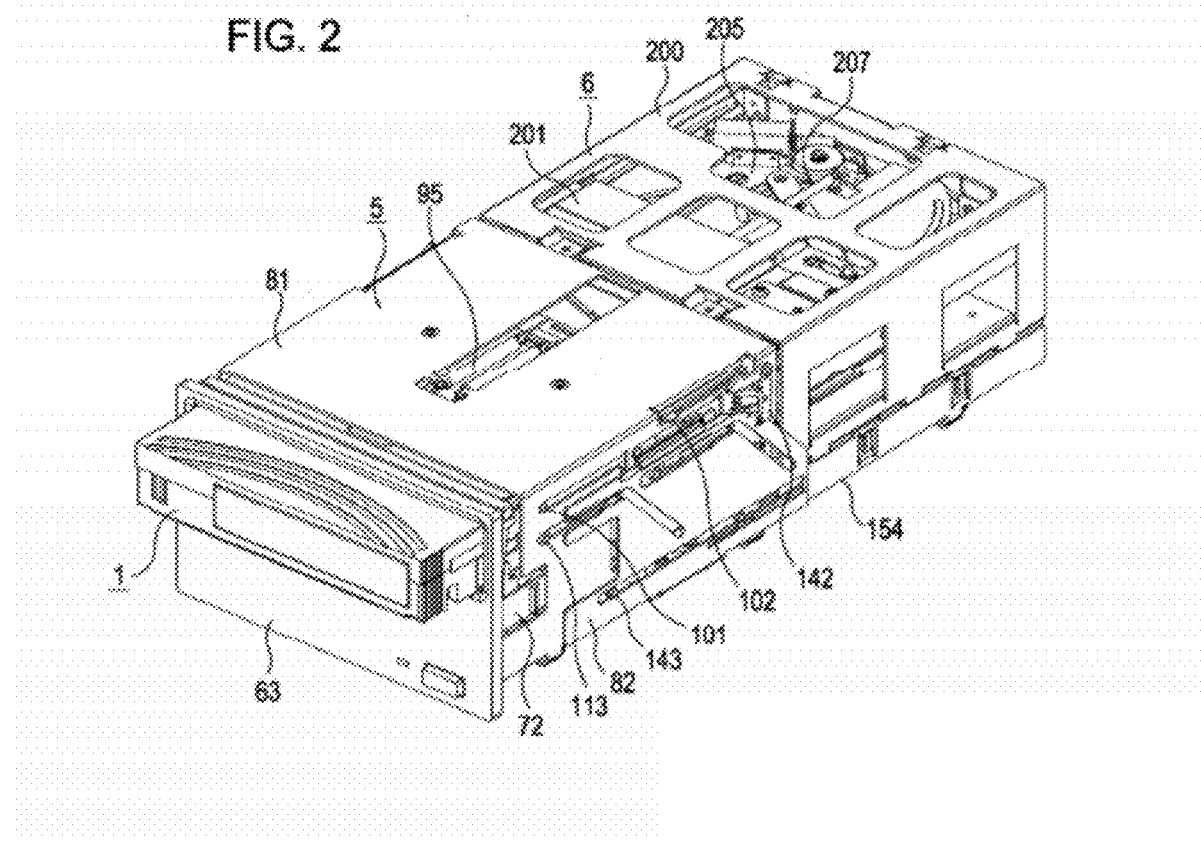
FIG. 2 is a perspective view illustrating an appearance of a Disc changer apparatus.

1. Disc cartridge
1-1 Upper shell
1-2 Lower shell
2. Disc changer apparatus
2-1 Apparatus body
2-2 Selector loader
2-3 Carry loader
2-4 Operation of disc changer apparatus A disc cartridge and a disc changer apparatus to which the present invention is applied includes, as shown in FIG. 1, a disc cartridge 1 in which a plurality of optical discs 2 serving as disc-type recording media is accommodated, and a Disc changer apparatus 3 mounted with the disc cartridge 1 and selectively transporting the optical discs 2. FIGS. 2 and 3 show the state in which a top cover 61 is removed from the Disc changer apparatus 3. As shown in FIGS. 2 and 3, the Disc changer apparatus 3 includes a select loader 5 which ejects the optical disc 2, in which an information signal is recorded or reproduced from the plurality of optical discs 2 accommodated in the disc cartridge 1, and a carry loader 6 which retracts the optical disc 2 ejected from the select loader 5 and transports the optical disc 2 to a recording/reproducing device 7.

If the disc cartridge 1 is inserted in the Disc changer apparatus 3, the disc cartridge 1 is separated into an upper shell 11 and a lower shell 12 by the selector loader 5 to eject the optical disc 2, and the optical disc 2 is transported to a chucking position of the recording/reproducing device 7 by the carry loader 6. In addition, if the writing or reading of the information signal on or from the optical disc 2 is completed in the Disc changer apparatus 3, the optical disc 2 is inserted in the disc cartridge 1, which is mounted on the select loader 5, by the carry loader 6, and then the upper and lower shells 11 and 12 of the disc cartridge 1 are joined to each other by the select loader 5 to eject the optical disc to the outside of the disc cartridge 1.

1. Disc Cartridge

Figure 4A:
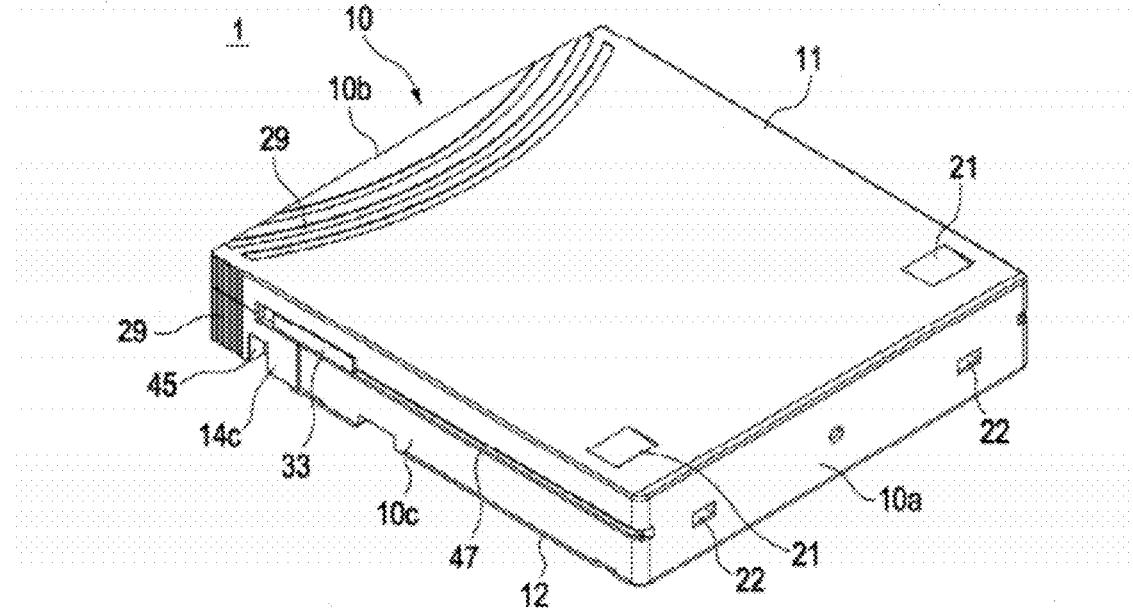
Figure 4B:
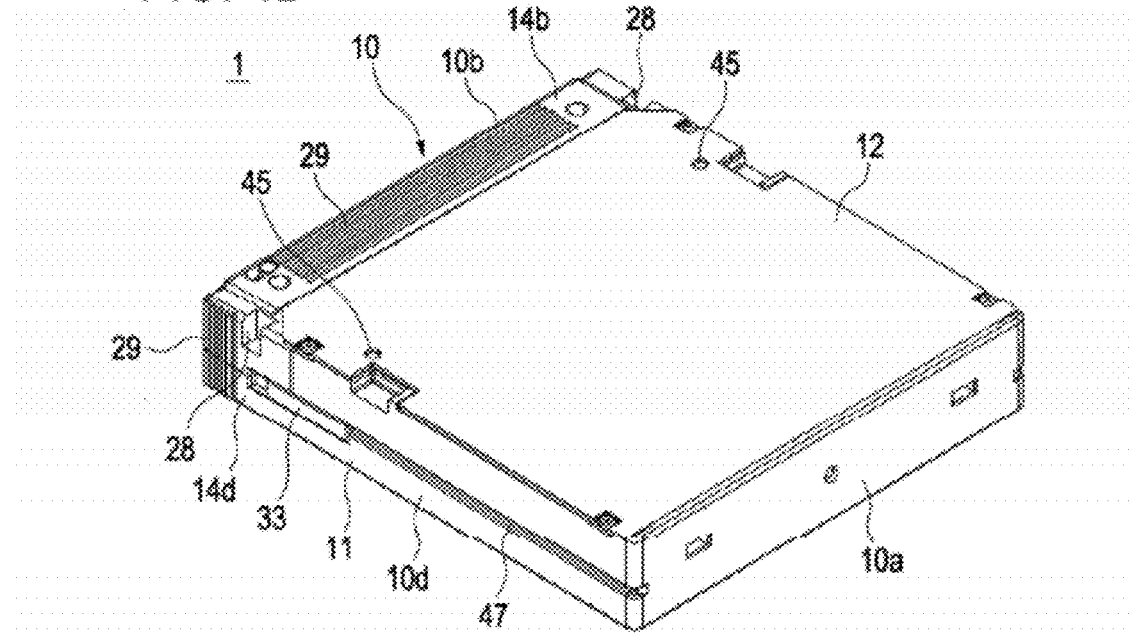

The disc cartridge 1 includes, as shown in FIGS. 4A, 4B, and 5, a rectangular cartridge body 10 which is formed by matching and joining the upper and lower shells 11 and 12. In the disc cartridge 1, after the upper and lower shells 11 and 12 are separated, the plurality of optical discs 2 are accommodated in the lower shell 12, and then the optical disc 2 is inserted in or ejected from one end portion 12a side extending in a longitudinal direction of the lower shell 12. That is, In the disc cartridge 1, the cartridge body 10 is not provided with an insertion/ejection opening for the optical disc 2, and the insertion and ejection of the optical disc 2 is performed by separating the upper and lower shells 11 and 12 constituting the cartridge body 10.

At this time, in the cartridge body 10, when the optical disc 2 is inserted in or ejected from the lower shell 12, a side surface of one end portion in the longitudinal direction, which serves as an insertion end portion of the Disc changer apparatus 3, is referred to as a front surface 10a, a side surface of the other end portion opposite to the front surface 10a, on which a recessed portion 23 for label adhesion is formed, is referred to as a rear surface 10b, lateral surfaces, which are perpendicular to the front surface 10a and the rear surface 10b and are provided with separation grooves 47 for the upper and lower shells 11 and 12, are referred to as a left side surface 10c and a right side surface 10d.

1-1 Upper Shell

Figure 6:
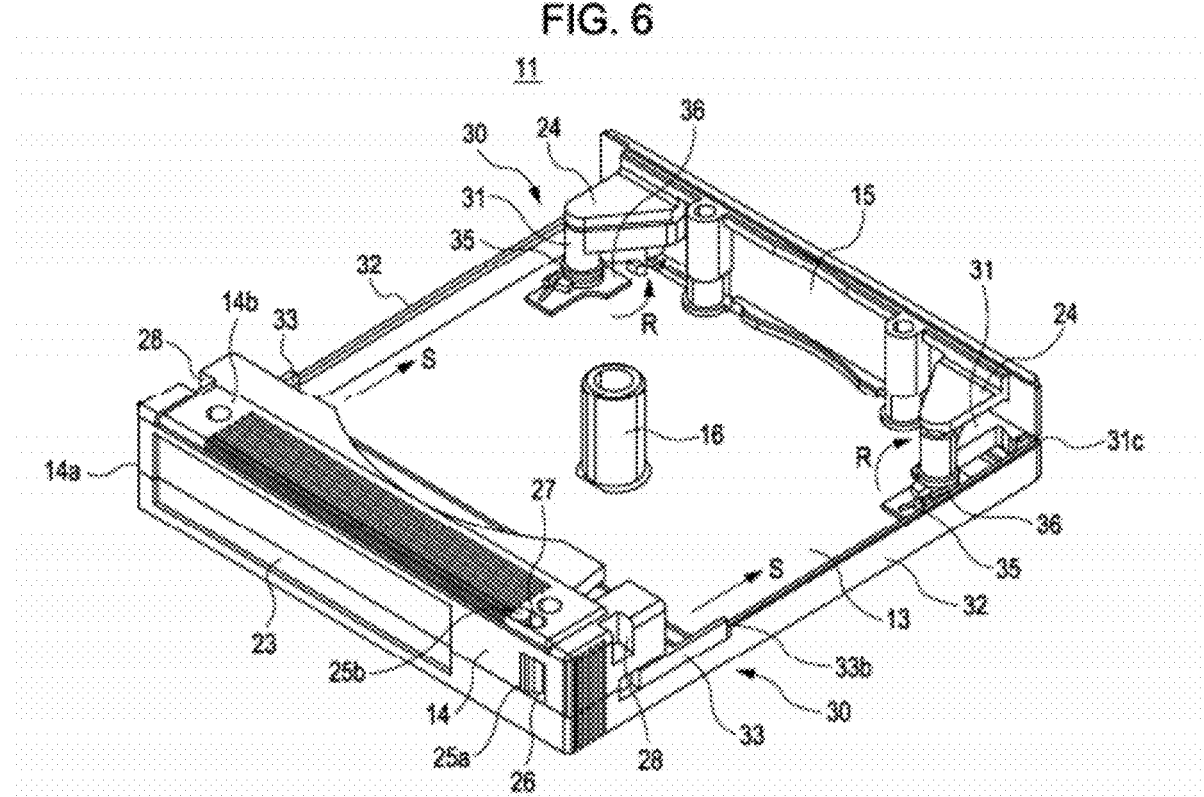
FIG. 6 is a perspective view illustrating an appearance of an upper shell.

The upper shell 11 is formed by using engineering plastic, and, as shown in FIG. 6, includes a rectangular upper surface plate 13 forming the upper surface of the cartridge body 10, a rear surface block 14 attached to the upper surface plate 13 and forming the rear surface of the cartridge body 10, a front surface wall 15 attached to the upper surface plate 13 and forming the front surface of the cartridge body 10, and a support shaft 16 vertically arranged at an almost central portion of the upper surface plate 13.

Figure 7:
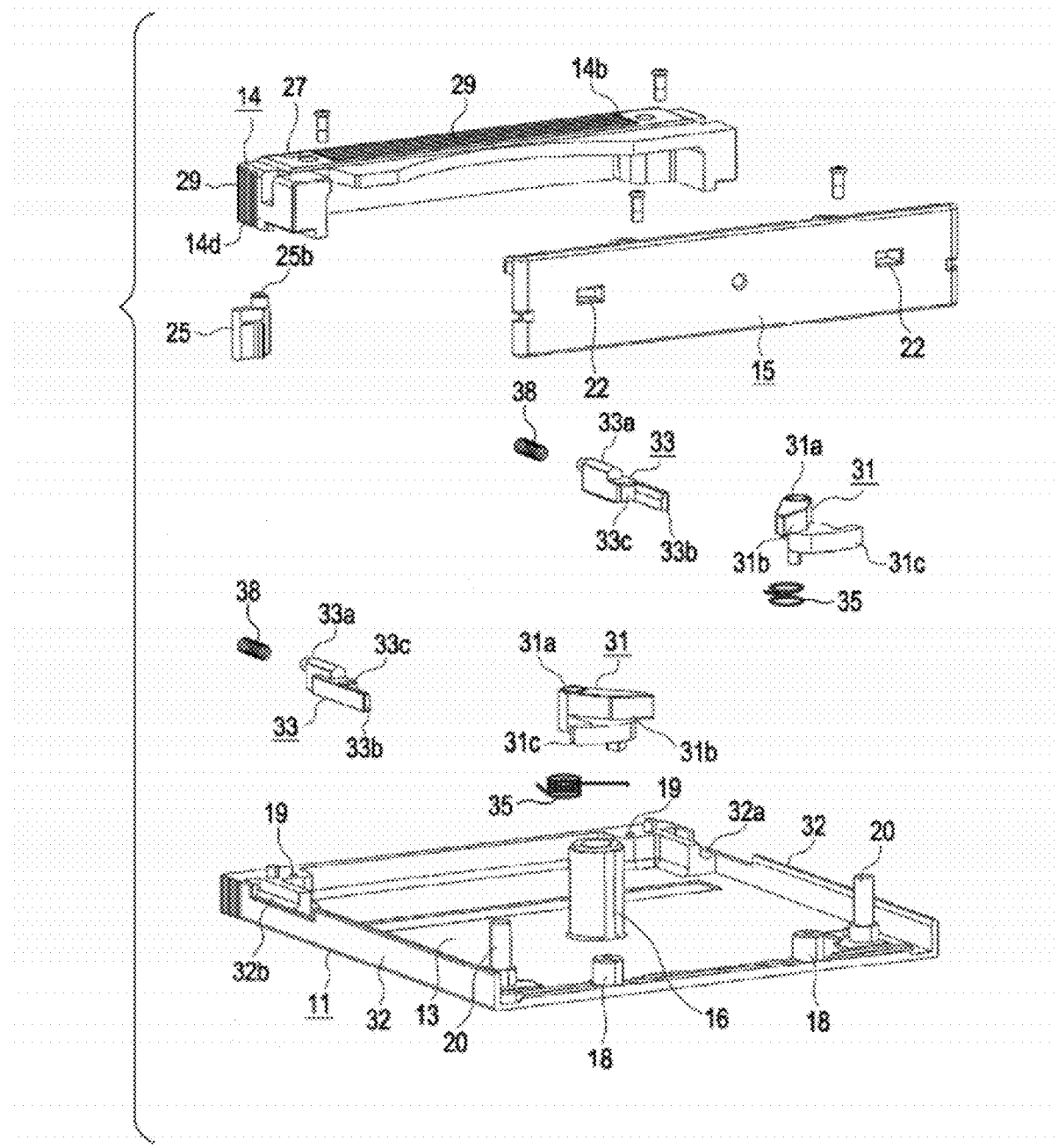
FIG. 7 is an exploded perspective view illustrating an upper shell.

As shown in FIG. 7, the upper surface plate 13 is provided with screw holes 18 at one end side in the longitudinal direction, to which the front surface wall 15 is fixed by a screw. In addition, the upper plate 13 is provided with screw holes 19 at the other end side in the longitudinal direction, to which the rear surface block 14 is fixed by a screw. In addition, the upper surface plate 13 is provided with rotational support shafts 20 which are vertically arranged at both sides which avoid a projection surface of the optical disc 2 of one end side in the longitudinal direction to rotatably support front-side lock pieces 31 of lock mechanisms 30 described below. Moreover, the upper surface plate 13 is provided with a concave portion 21 which is joined to a cartridge holder 80 described below when the disc cartridge 1 is inserted in the select loader 5 of the Disc changer apparatus 3.

The front surface wall 15 is fixed and screwed to one end portion of the upper surface plate 13 in the longitudinal direction to constitute the front surface of the cartridge body 10. The front surface wall 15 is provided with lock releasing holes 22 at both sides thereof in the longitudinal direction, so that when the disc cartridge 1 is inserted in the Disc changer apparatus 3, lock releasing pieces 99 are moved in the lock releasing hole 22 to rotate the front-side lock piece 31 of the lock mechanism 30. In addition, the front surface wall 15 is provided with a support piece 24 to support the front-side lock piece 31 together with a rotational support shaft 20 at the inner side of the cartridge body 10.

The rear surface block 14 is fixed and screwed to the other end portion of the upper surface plate 13 in the longitudinal direction to form the rear surface of the cartridge body 10. The rear surface block 14 is provided with a recessed portion 23 for label adhesion at an outer surface 14a constituting the rear surface of the cartridge body 10. In addition, in the outer surface 14a adjacent to the recessed portion 23, the rear surface block 14 is provided with an operation hole 26, in which a knob portion 25a formed at an erroneous erasure preventing switch 25 and operated by a user is outwardly faced by the operation hole 26. Moreover, in a lower surface portion 14b which forms a portion of the lower surface of the cartridge body 10 together with the lower shell 12, the rear surface block 14 is provided with a contact hole 27, in which a contact piece 25b formed at the erroneous erasure preventing switch 25 and coming contact with an identification switch 110 of the select loader 5 is outwardly faced by the contact hole 27.

In addition, a holding hole 28 to hold the cartridge body 10 is formed at both side portions 14c and 14d of the rear surface block 14. The holding hole 28 is used as a hole which is held by a robot arm in a case where a process of ejecting the disc cartridge 1 from a library and inserting the disc cartridge into the Disc changer apparatus 3 is automated using the robot arm.

In addition, the upper surface plate 13, the lower surface portion 14b of the rear surface block 14, and both lateral surface portions 14c and 14d forming a portion of the lateral surface of the cartridge body 10 are provided with a grain 29 to prevent slippage. Moreover, a pattern of the grain 29 each formed on the upper surface plate 13 and the lower surface portion 14b are different from each other, so that when a user holds the disc cartridge 1, upper and lower directions are able to be distinguished in correspondence with the differences in the patterns. Also, in the disc cartridge 1, since the grain 29 is formed only on the rear surface 10b of the cartridge body 10, a user is able to distinguish an insertion direction when the user holds the disc cartridge 1.

The support shaft 16 vertically arranged at the almost central portion of the upper surface plate 13 is used to secure stiffness of the cartridge body 10 and facilitate positioning of the optical disc 2 which is accommodated in the cartridge body 10. The support shaft 16 is formed in the circular cylindrical shape having a diameter slightly shorter than that of the center hole 2a of the optical disc 2. In addition, the support shaft 16 has the same height as the thickness of the disc cartridge 1, and a front surface of the support shaft 16 comes into contact with a bearing portion 46 formed at the lower shell 12 and thus is supported by the bearing portion when the upper and lower shells 11 and 12 are butted against each other.

When the upper and lower shells 11 and 12 are butted against each other, the support shaft 16 is inserted in the center hole 2a of the optical disc 2 which is accommodated in the lower shell 12, and then comes into contact with the bearing portion 46. Consequently, the support shaft 16 is able to prevent wobble of the optical disc 2 in the cartridge body 10, while increasing the stiffness of the cartridge body 10.

That is, the disc cartridge 1 receives the optical discs 2 without using a disc tray, and, as described below, performs insertion and ejection of the optical discs 2 by sliding the optical discs 2 in a direction parallel with upper and lower surfaces of the cartridge body 10. In a case where the cartridge body is provided with the insertion/ejection opening for the optical disc, since it is not possible for the support shaft to stand up at a transport region of the optical disc in the disc cartridge, it is difficult for the cartridge body 10 to secure the stiffness of the central portions of the upper and lower surfaces.

In this regard, since the disc cartridge 1 performs the insertion and ejection of the optical discs 2 by separating the upper and lower shells 11 and 12, without providing the cartridge body 10 with the insertion/ejection opening for the optical disc 2, the support shaft 16 does not interfere with the insertion and ejection of the optical discs 2. Since the disc cartridge 1 is provided with the support shaft 16, when the upper and lower shells 11 and 12 come into contact with each other, the central portions of the upper and lower surfaces of the cartridge body 10 are supported by the support shaft to increase the stiffness thereof. In addition, since the support shaft is inserted in the center hole 2a of the optical discs 2, it is able to prevent wobble of the optical discs 2 in the cartridge body 10.

Furthermore, in the case where the disc cartridge 1 ejects the optical discs 2 from the cartridge body 10 and transports the optical discs into the Disc changer apparatus 3, the upper and lower shells 11 and 12 are separated, and a predetermined optical disc 2 is pushed by an push-out lever 167 which is installed at the select loader 5. At this time, since the support shaft 16 is inserted in the center hole 2a of other optical discs 2 which are accommodated above the predetermined optical disc 2, it is possible to regulate the wobble of other optical discs 2 and prevent the other optical disc from being ejected with the predetermined optical disc 2 (refer to FIG. 43).

The upper surface plate 13 is provided with the lock mechanisms 30 joining to the upper and lower shells 11 and 12 together at corner portions of the upper surface plate which is deviated from the projection surface of the optical disc 2 accommodated in the lower shell 12 when the upper and lower shells 11 and 12 are joined to each other. The lock mechanisms 30 include front-side lock pieces 31 which are supported by the rotational support shafts 20 installed at one end side in the longitudinal direction, and rear-side lock pieces 33 which are slidably supported on extension lines of separation walls 32 vertically arranged at both sides of the upper surface plate 13 in a widthwise direction.

The front-side lock piece 31 has a shaft hole 31a through which the rotational support shaft 20 vertically arranged at the upper surface plate 13 and the support shaft installed at the support piece 24 provided at the front surface wall 15 are inserted, a pressing surface portion 31b facing outwardly from the lock releasing hole 22 of the front surface wall 15 and pressed against the lock releasing piece 99, and an engaging portion 31c engaged with an engaged concave portion 56 of the lower shell 12. In addition, the front-side lock piece 31 locks one end portion of a coil spring 35, so that the engaging portion 31c is joined to the lower shell 12 and the pressing surface portion 31b is biased to rotate in a direction of the arrow R in FIG. 6 facing the lock releasing hole 22.

The coil spring 35 has one end portion locked to the front-side lock piece 31 and the other end portion locked to a spring hanging portion 36 which is installed at the upper surface plate 13.

The rear-side lock piece 33 is supported by the other side of the upper surface plate 13 in the longitudinal direction. The rear-side lock piece 33 is supported by a slide stepped portion 32a, which is formed on the extension line of the separation wall 32 of the upper surface plate 13, in a slidable manner, and thus is positioned on the extension line of the respective separation grooves 47 which are formed between the upper shell 11 and the lower shell 12, as shown in FIGS. 4A and 4B.

The rear-side lock piece 33 has a support piece portion 33a which is supported slidably between the separation wall 32 and the rear surface block 14, a pressing piece portion 33b positioned on the extension line of the separation groove 47, and an engaging portion 33c formed on one end portion of the support piece portion 33a and engaging with an engaged concave portion 57 of the lower shell 12. Since a coil spring 38 is locked by one end portion of the support piece portion 33a, the engaging portion 33c is engaged with the lower shell 12, and the pressing piece portion 33b is slid towards the front side of the cartridge body 10, so that the rear-side lock piece 33 is typically biased to slide in the direction of the arrow S in FIG. 6 which is positioned on the extension line of the separation groove 47.

With the configuration of the lock mechanism 30, the front-side lock piece 31 and the rear-side lock piece 33 are respectively biased in the direction of the arrow R and the direction of the arrow S in FIG. 6, such that each engaging portions 31c and 33c is engaged with the lower shell 12 so as to join the upper and lower shells 11 and 12 to each other. In the lock mechanism 30, if the disc cartridge 1 is mounted in the cartridge holder 80 of the select loader 5, the pressing surface portion 31b is pressed by the lock releasing piece 99 entered from the lock releasing hole 22, so that the front-side lock piece 31 is rotated in the direction opposite to the arrow R against the biasing force of the coil spring 35. In addition, the pressing piece portion 33b is pressed by the upper shell separating piece 103 which is inserted in the separation groove 47, so that the rear-side lock piece 33 is slid in the direction opposite to the arrow S against the biasing force of the coil spring 38.

Consequently, each of the engaging portions 31c and 33c of the front-side lock piece 31 and the rear-side lock piece 33 is unengaged from the lower shell 12 in the lock mechanism 30, so that the upper and lower shells 11 and 12 are able to be separated. In addition, when the disc cartridge 1 is ejected from the Disc changer apparatus 3, since the pressing is released by the lock releasing piece 99 and the upper shell separated plate 103 in the lock mechanism 30, the front-side lock piece 31 and the rear-side lock piece 33 receive the biasing force from the coil springs 35 and 38, respectively and then are biased in the direction of the arrow R and the direction of the arrow S. Therefore, each engaging portion 31c and 33c is joined to the lower shell 12 so as to join the upper and lower shells 11 and 12 to each other.

1-2 Lower Shell

Figure 9:
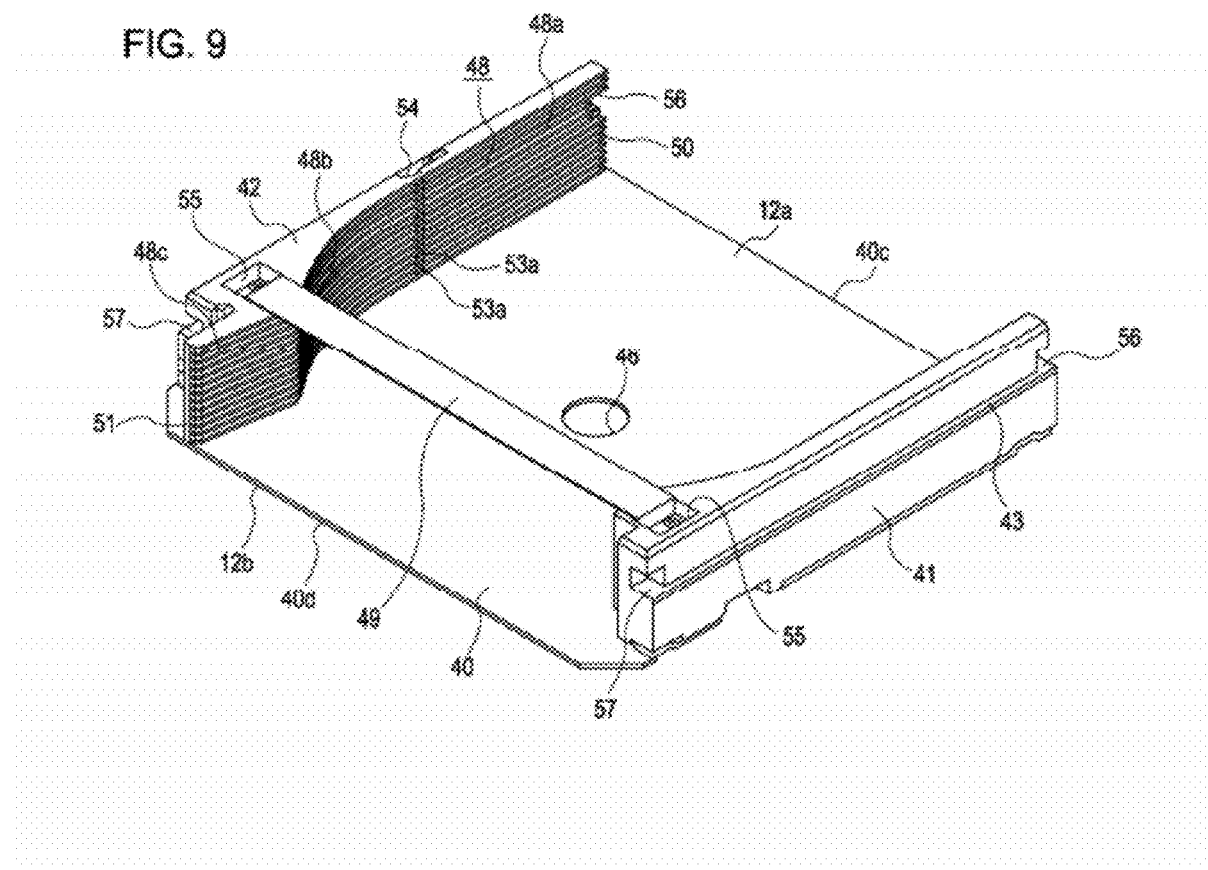
FIG. 9 is a perspective view illustrating an appearance of a lower shell.

Next, the lower shell 12 accommodating the optical disc 2 will be described. The lower shell 12 includes, as shown in FIGS. 5 and 9, a rectangular lower plate 40 forming a lower surface of the cartridge body 10, left and right disc holders 41 and 42 forming a portion of the lateral surface of the cartridge body 10 and accommodating the optical discs 2, and a holder plate 49 supporting the left and right disc holders 41 and 42.

Figure 8:
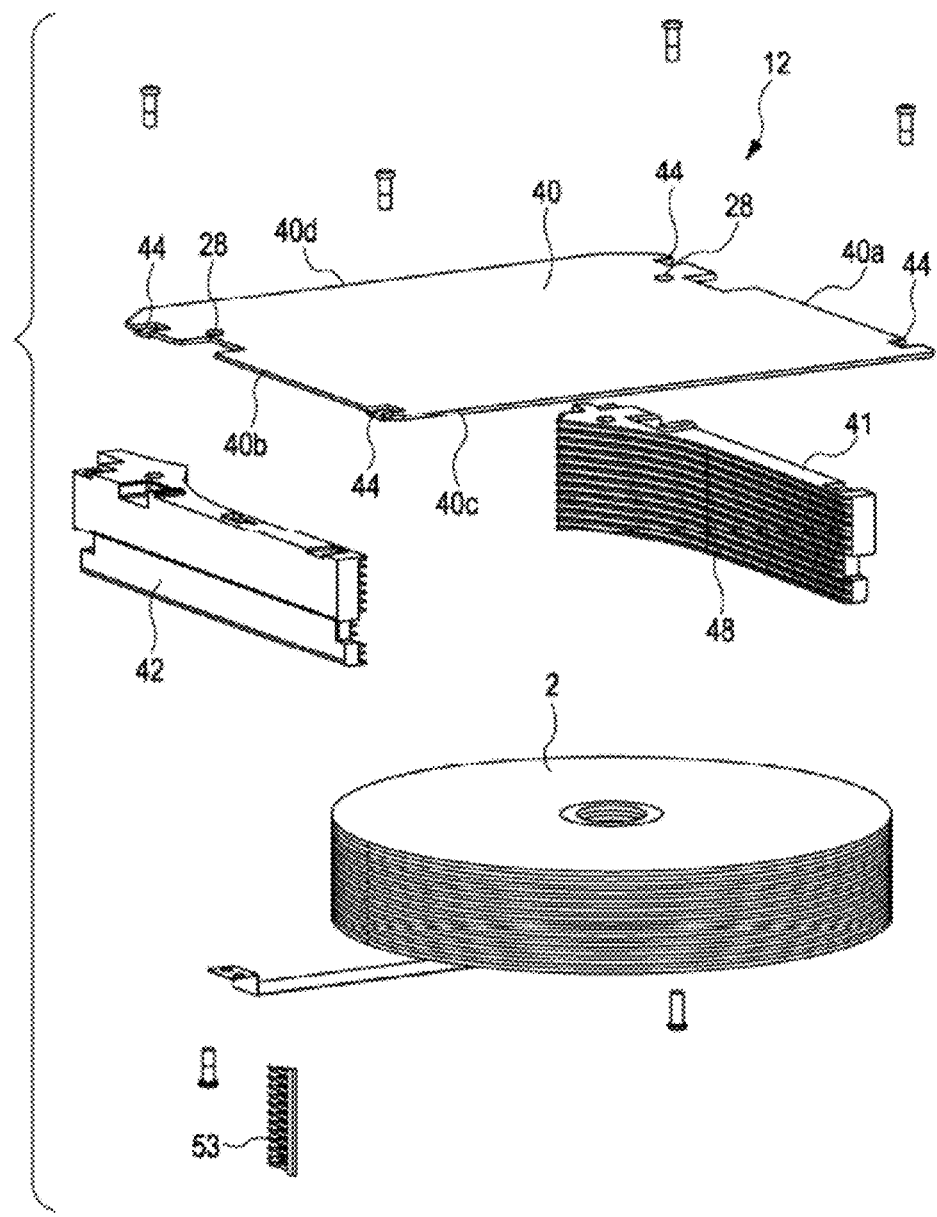
FIG. 8 is an exploded perspective view illustrating a lower shell.

The lower plate 40 is made of metal or resin such as engineering plastic, and as shown in FIG. 8, is provided with screw holes 44 at edges 40a and 40b facing each other in a widthwise direction perpendicular to a longitudinal direction. The left and right disc holders 41 and 42 are fixed to the edges by screws. In addition, the lower plate 40 has open faced edges 40c and 40d which are approximately perpendicular to the edges 40a and 40b, to which the left and right disc holders 41 and 42 are attached, to form a disc insertion/ejection opening 50 and a disc extrusion opening 51 for the optical disc 1 which will be described below.

Figure 10:
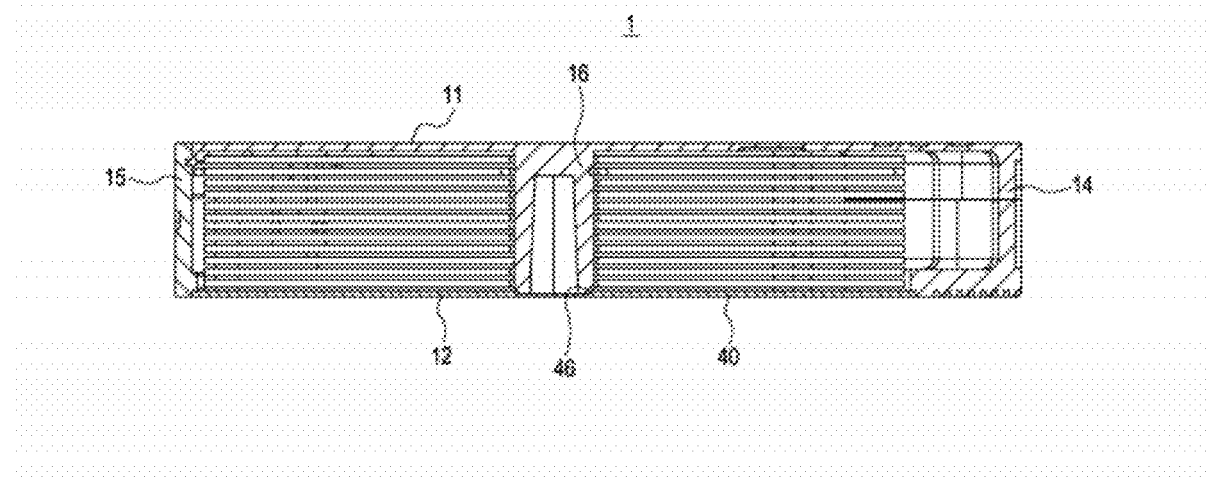
FIG. 10 is a cross-sectional view illustrating the state in which upper and lower shells come into contact with each other.

Furthermore, the lower plate 40 is provided with a bearing portion 46 at an approximately central portion thereof, in which the front end portion of the support shaft 16 arranged in a protruding manner at the upper shell 11 comes into contact with the bearing portion 46. The bearing portion 46 is formed in a circular concave portion, and as shown in FIG. 10, the front end portion of the support shaft 16 comes into contact with the bearing portion when the upper and lower shells 11 and 12 are joined to each other. In the cartridge body 10, therefore, the support shaft 16 is inserted in the center holes 2a of the optical discs 2 accommodated at the accommodating position of the lower shell 12 to prevent the wobble of the optical discs 2. In addition, the approximately central portions of the upper and lower shells 11 and 12 are pivotally supported by the support shaft 16 to increase the stiffness of the cartridge body 10, so that it is possible to prevent the upper and lower shells 11 and 12 from being deformed and thus the optical discs from being scratched.

Furthermore, the lower plate 40 is provided with a positioning hole 45 to promote the positioning of the lower shell 12 in the lower holder 91 of the cartridge holder 80 described below, when the disc cartridge 1 is inserted in the select loader 5 of the Disc changer apparatus 3.

The left and right disc holders 41 and 42 support the plurality of optical discs 2, and are fixed and screwed to both edges 40a and 40b of the lower plate 40 in the widthwise direction thereof. The left and right disc holders 41 and 42 form a portion of left and right lateral surfaces of the cartridge body 10, respectively, when the upper and lower shells 11 and 12 are butted against each other. Outer surfaces of the left and right disc holders 41 and 42 are provided with entrance grooves 43, into which separating pieces 103 and 115 described below installed at the cartridge holder 80 are moved.

The upper portions of the left and right disc holders 41 and 42 move back inwardly with the entrance groove 43 as a border, and the separation wall 32 of the upper shell 11 covers the upper portion of the entrance groove 43 from an outward direction by the joining of the upper and lower shells 11 and 12. Therefore, in the left and right disc holders 41 and 42, the lower portion of the entrance groove 43 forms the left and right lateral surfaces 10c and 10d of the cartridge body 10 together with the separation wall 32 of the upper shell 11. At this time, in the left and right disc holders 41 and 42, the separation grooves 47 are formed by the lower end surface of the separation wall 32 and the upper end surface of the entrance groove 43.

In addition, the left and right disc holders 41 and 42 are provided with a plurality of support grooves 48 at each inner surface thereof. Each of the support grooves 48 has a groove height slightly thicker than the thickness of the optical disc 2. Moreover, the same number of support grooves 48 is formed in the left and right disc holders 41 and 42. A pair of left and right support grooves 48 supports an outer edge which is a non-signal recording region of the optical disc 2, and is able to slide along a planar direction of the optical disc 2. Furthermore, the support grooves 48 are formed in parallel with the lower plate 40 to slide the optical disc 2 in the longitudinal direction of the lower shell 12.

The support grooves 48 are formed from one end surfaces of the left and right disc holders 41 and 42 to the other end surfaces. In addition, each of the support grooves 48 are provided with a straight portion 48a formed at the one end portion 12a side of the lower shell 12 and parallel with the side edge of the lower plate 40, and a circular-arc portion 48b consecutively extending from the straight portion 48a and approaching each other toward the other end portion 12b side of the lower shell 12. Furthermore, the support groove 48 of the right disc holder 42 is provided with a guide portion 48c to guide the push-out lever 167 of the select loader 5 described below along the other end portion 12b from the circular-arc portion 48b.

Figure 11:
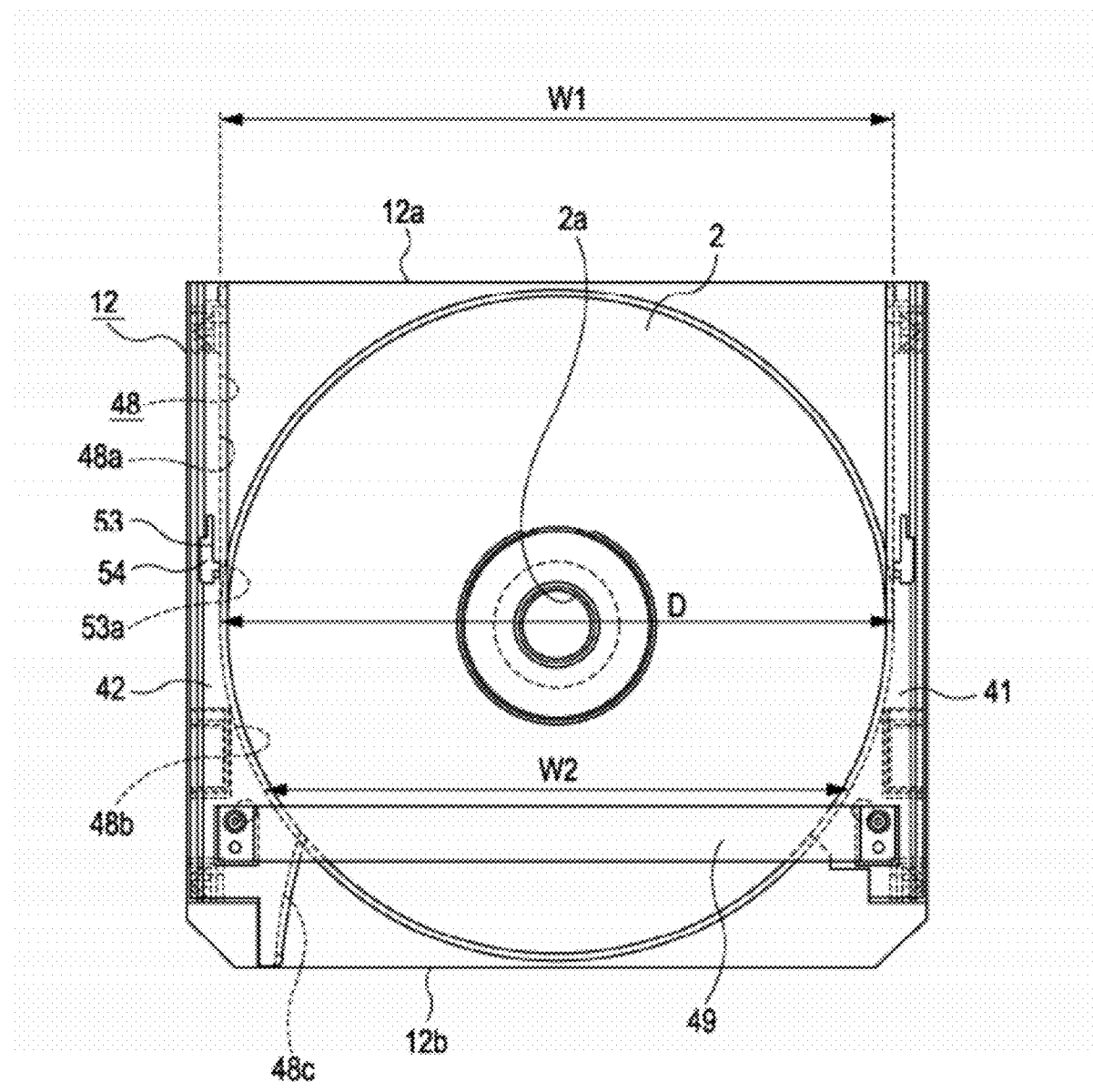
FIG. 11 is a plan view illustrating the state in which an optical disc is accommodated in an accommodating position of a cartridge body.

As shown in FIG. 11, the width W1 between the straight portions 48a formed at the one end portion 12a side of the lower shell 12 is slightly wider than the maximum width D of the optical disc 2 in the left and right disc holders 41 and 42. In addition, the straight portions 48a face one end portion of the left and right disc holders 41 and 42 in the support grooves 48. Therefore, at the one end portion 12a side of the lower shell 12, the disc insertion/ejection opening 50 is provided through which the optical disc 2 is inserted or ejected, and the straight portion 48a is able to slidably support the optical disc 2.

In addition, in the left and right disc holders 41 and 42, the width W2 between the circular-arc portions 48b consecutively extending from the straight portion 48a to the other end portion 12b side of the lower shell 12 is narrower than the maximum width D of the optical disc 2. Furthermore, the circular-arc portion 48b has substantially the same curvature as that of the optical disc 2. Consequently, the lower shell 12 stops the optical disc 2 which has slid along the straight portion 48a at the circular-arc portion 48b, thereby restricting the accommodating position of the optical disc 2 in the cartridge body 10. Moreover, since the circular-arc portion 48b has substantially the same curvature as that of the optical disc 2, the circular-arc portion is able to support the outer circumference of the optical disc 2 in the shape of circular arc, so that the optical disc is able to be reliably held at the accommodating position of the cartridge body 10.

At this time, the accommodating position of the optical disc 2 supported by the circular-arc portion 48b is formed to be slightly inclined to the one end side of the rectangular cartridge body 10 in the longitudinal direction, that is, the front surface 10a side which is provided with the disc insertion/ejection opening 50.

Figure 25:
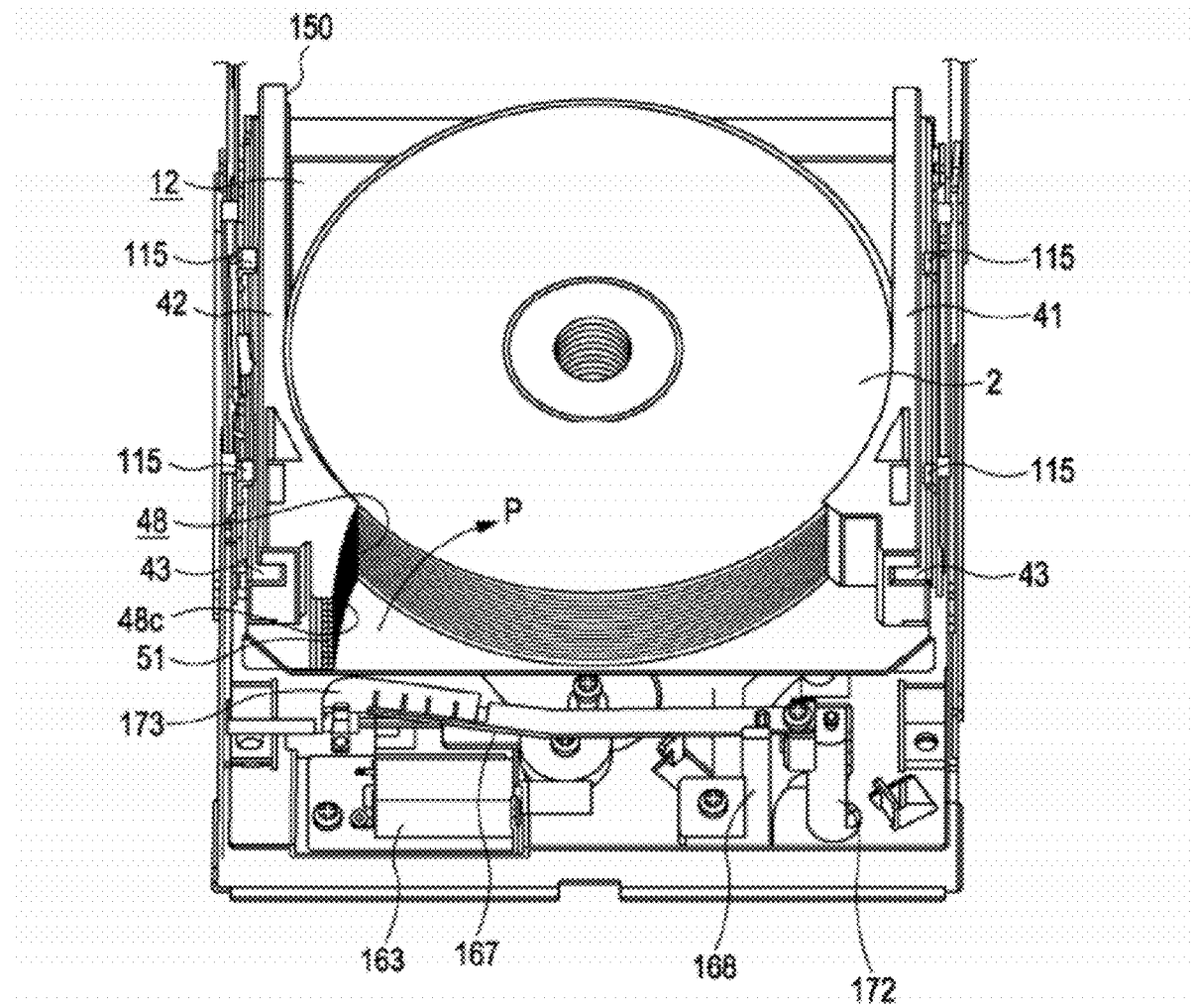
FIG. 25 is a perspective view illustrating a push-out mechanism.

The right disc holder 42 is provided with the guide portion 48c extending from the circular-arc portion 48b to the other end portion of the lower shell 12. The guide portion 48c faces the other end surface of the right disc holder 42, and the push-out lever 167 is able to move forward and backward from the other end surface. In addition, the guide portion 48c is formed in the shape of circular arc along a rotation trace of the push-out lever 167. Therefore, at the other end portion 12b of the lower shell 12, the disc extrusion opening 51 is provided through which the push-out lever 167 moves forward and backward to push the optical disc 2 towards the disc insertion/ejection opening 50, and the front end portion of the push-out lever 167 is supported by the guide portion 48c, so that the push-out lever 167 is able to be reliably rotated. In addition, the guide portion 48c is able to guide the push-out lever 167 to the support groove 48 in which the predetermined optical disc 2 to be ejected toward the select loader 5 is accommodated, as described below, so that the predetermined optical disc 2 is reliably pushed out to the disc insertion/ejection opening 50 (FIG. 25).

The support grooves 48 are provided in the plural, 12 in this embodiment, along a thickness direction of the cartridge body 10 perpendicular to the lower plate 40, so that the maximum of 12 sheets of optical discs 2 are able to be stacked and accommodated.

In addition, the right disc holder 42 is provided with a self-lock spring 53 to restrict the optical discs 2 at the accommodating position of the cartridge body 10. The self-lock spring 53 has an elastic piece 53a which is arranged in a protruding manner to move forward and backward in the support groove 48, and the optical disc 2 is biased to the circular-arc portion 48b by the elastic piece 53a to restrict the accommodating position.

Figure 12:
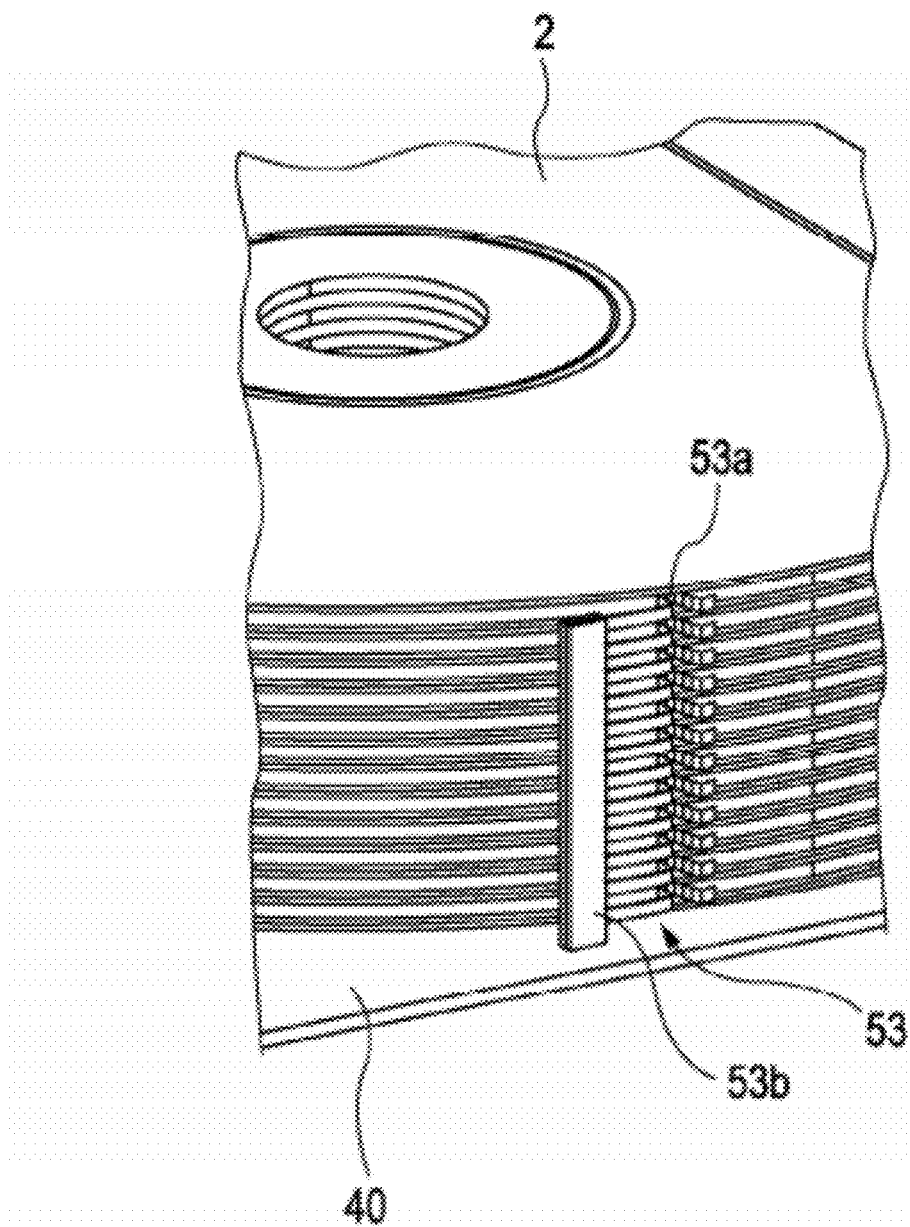
FIG. 12 is a perspective view illustrating a self-lock spring.

The self-lock spring 53 has, as shown in FIG. 12, the same number of elastic pieces 53a as that of the support grooves 48, and a support body 53b including the elastic pieces 53a. The self-lock spring 53 is made of a flexible material such as metal spring in whole, and the plurality of elastic pieces 53a are extended laterally along the longitudinal direction of substantially the rectangular plate-like support body 53b. In addition, if the self-lock spring 53 is arranged at an installation hole 54 formed at a substantially central portion of the right disc holder 42 in the longitudinal direction, the elastic piece 53a is arranged in a protruding manner at an opening formed at the lateral surface of the support groove 48 to the inside of the support groove 48. Since the elastic piece 53a has flexibility, the self-lock spring 53 is arranged in a protruding manner at the opening to move forward and backward. In addition, the elastic piece 53a has a bent front end portion protruding toward the inside of the support groove 48, and if the outer circumference of the optical disc 2 comes into sliding contact with the elastic piece 53a, it does not damage the outer circumference of the optical disc 2.

When the optical disc 2 is inserted from the disc insertion/ejection opening 50 of the lower shell 12, the self-lock spring 53 is pressed against the outer circumference of the optical disc 2 which has slid along the support groove 48, and then the elastic piece 53a moves back toward the inside of the installation hole 54 of the right disc holder 42. If the optical disc 2 is inserted into the accommodating position at which the optical disc comes into contact with the circular-arc portion 48b, as shown in FIG. 11, the elastic piece 53a comes into contact with the one end portion 12a side of the lower shell 12 rather than the center hole 2a of the optical disc 2. Therefore, the self-lock spring 53 presses the optical disc 2 against the circular-arc portion 48b to restrict the optical disc in the accommodating position of the cartridge body 10. The self-lock spring 53 is able to prevent the wobble of the optical discs 2 due to the weight of the optical discs 2 or vibration of the cartridge body 10, thereby reliably performing the insertion and ejection of the optical discs 2 in the Disc changer apparatus 3.

If the optical disc 2 is slid to the disc insertion/ejection opening 50 by the push-out lever 167, the elastic piece 53a of the self-lock spring 53 is pressed against the outer circumference of the optical disc 2, and then moves back toward the inside of the right disc holder 42. Therefore, the self-lock spring 53 does not interfere with the insertion and ejection of the optical discs 2.

The holder plate 49 is extended between the left and right disc holders 41 and 42. The holder plate 49 is to prevent the wobble of the left and right disc holders 41 and 42, in particular, to prevent the optical discs 2 from being released from the support grooves 48 due to the wobble in the direction so that the left and right disc holders 41 and 42 are spaced apart from each other.

The holder plate 49 employs a metal plate in the shape of a rectangular plate, and is screwed to locking holes 55 and 55 formed in the upper surface of the left and right disc holders 41 and 42. Since the holder plate 49 is locked to the other end portion 12b of the lower shell 12 which is the accommodating position of the optical disc 2, if an impact is applied to the cartridge body 10 such as movement, dropping or the like of the cartridge body, it is able to prevent the wobble of the left and right disc holders 41 and 42, thereby preventing the optical discs 2 supported between the support grooves 48 from dropout. In particular, the holder plate 49 is extended on the circular-arc portion 48b supporting the optical disc 2 in the shape of circular arc, as shown in FIG. 9, so that the outer circumferences of the optical discs 2 are able to be reliably supported by the circular-arc portion 48b.

In addition, the left and right disc holders 41 and 42 are respectively provided with the engaged concave portion 56 with which the engaging portion 31c of the front-side lock piece 31 of the lock mechanism 30 is engaged, and the engaged concave portion 57 with which the engaging portion 33c of the rear-side lock piece 33 is engaged. The engaged concave portion 56 is formed by cutting the one end surface, in which the disc insertion/ejection opening 50 of the left and right disc holders 41 and 42 is formed, in a concave shape. In addition, the engaged concave portion 57 is formed by cutting the other end surface, in which the disc extrusion opening 51 of the left and right disc holders 41 and 42 is formed, in a concave shape.

The engaged concave portion 56 is engaged with the engaging portion 31c if the front-side lock piece 31 receives the biasing force from the coil spring 35 and then is rotated in the direction of the arrow R. In addition, the engaged concave portion 57 is engaged with the engaging portion 33c if the rear-side lock piece 33 receives the biasing force from the coil spring 38 and then is slid in the direction of the arrow S.

The engaged concave portion 56 is unengaged from the engaging portion 31c if the front-side lock piece 31 is rotated in the direction opposite to the arrow R by the lock releasing piece 99. In addition, the engaged concave portion 57 is unengaged from the engaging portion 33c when the engaged concave portion 57 is consecutively extended from the separation groove 47 of the cartridge body 10 and the upper shell separating piece 103 is moved in the separation groove 47 to allow the pressing piece portion 33b of the rear-side lock piece 33 to be pressed against the upper shell separating piece 103.

With the configuration of the disc cartridge 1 described above, if the upper and lower shells 11 and 12 are joined to each other by the lock mechanism 30, the support shaft 16 arranged in a protruding manner at the upper surface plate 13 of the upper shell 11 comes into contact with the bearing portion 46 formed at the lower plate 40 of the lower shell 12. Accordingly, the disc cartridge 1 is able to secure the stiffness of the cartridge body 10, without using the disc tray, thereby preventing deformation of the cartridge body 10 and thus preventing the optical disc 2 from being scratched due to the deformation of the cartridge body 10.

In addition, the disc cartridge 1 includes the upper surface plate 13, the front surface wall 15, the rear surface block 14, the pair of left and right separation walls 32, which constitutes the upper shell 11, the lower plate 40 and the left and right disc holders 41 and 42 which constitutes the lower shell 12, to form the whole surface of the cartridge body 10. That is, the cartridge body 10 is not provided with an opening through which the optical disc 2 is inserted or ejected, and a door for opening or closing the opening. Accordingly, the disc cartridge 1 is able to constitute the cartridge body 10 so that it is sturdy. Since the support shaft 16 of the upper shell 11 comes into contact with the bearing portion 46 of the lower shell 12, the stiffness of the upper surface and the lower surface of the disc cartridge 1 is improved at substantially the central portions thereof. Therefore, the disc cartridge 1 is able to improve the resistance against the dropping or vibration.

In addition, in the disc cartridge 1, since the support shaft 16 is inserted in the center holes 2a of the optical discs 2, the positioning of the optical discs 2 in the cartridge body 10 is established and the wobble of the optical discs 2 due to drop or vibration is prevented. Accordingly, when the upper and lower shells 11 and 12 are separated, since the optical discs 2 are accommodated at the predetermined accommodating position, the disc cartridge 1 is able to perform the insertion and ejection of the optical discs 2 smoothly.

The whole surface of the disc cartridge 1 is closed by the upper and lower shells 11 and 12, and since there is no an opening for insertion or ejection of the disc and a door for opening or closing the opening, air tightness of the cartridge body 10 is increased to prevent entry of dust or the like. In addition, since the disc cartridge 1 is not provided with an opening for insertion or ejection of the disc and a door for opening or closing the opening, it is able to prevent a finger of a user or alien substance from coming into contact with the optical disc 2 in a case where the door is opened by misuse of the user.

Moreover, since the upper and lower shells 11 and 12 are separated vertically by the select loader 5 described below, the disc cartridge 1 slides the optical disc 2 accommodated in the lower shell 12 in the planar direction of the disc to insert and eject the optical disc. Accordingly, the disc cartridge 1 is able to insert and eject the optical disc 2 with the simple configuration, without using a disc tray.

At this time, since the support shaft 16 is inserted in the optical discs 2, which are accommodated higher than the predetermined optical disc 2 to be inserted or ejected, among the plurality of optical discs 2 which are stacked and accommodated, the disc cartridge 1 is able to prevent another optical disc 2 from being ejected with the predetermined optical disc 2.

At this time, the disc cartridge 1 is not limited to the rectangular shape so long as the upper and lower shells 11 and 12 are separatably formed in the upward and downward directions, and by joining the upper and lower shells 11 and 12 to each other the whole surface of the cartridge body 10 is closed and by separating the upper and lower shells 11 and 12 from each other the optical disc 2 is allowed to be inserted or ejected in the planar direction. In addition, the disc cartridge 1 may be formed integrally with the lower plate 40 of the lower shell 12 and the left and right disc holders 41 and 42. Moreover, in the disc cartridge 1, the left and right disc holders 41 and 42 of the lower shell 12 receive and hold the optical disc 2 and also form the sidewall of the cartridge body 10. However, the left and right disc holders for accommodating and holding the optical discs 2 and a sidewall member forming the sidewall of the cartridge body 10 may be separately formed.

2. Disc Changer Apparatus

Next, the Disc changer apparatus 3 which selects and pulls out the optical discs 2 accommodated in the disc cartridge 1 to write and/or read information signal will be described. The Disc changer apparatus 3 includes the select loader 5 which separates the cartridge body 10 of the disc cartridge 1 to eject the optical disc 2, and the carry loader 6 which retracts the optical disc 2 ejected from the select loader 5 and transports the optical disc 2 to the recording/reproducing device 7.

The select loader 5 has a cartridge insertion/removal position at which the disc cartridge 1 is inserted in or removed from the Disc changer apparatus 3, and a disc insertion/ejection position at which the optical disc 2 is inserted in or ejected from the lower shell 12. If the disc cartridge 1 is mounted at the cartridge insertion/removal position, the select loader 5 releases the locking of the lock mechanism 30, and transports only the lower shell 12 to the disc insertion/ejection position. At this time, the select loader 5 controls the lifting height of the lower shell 12 in accordance with the optical disc 2 to be ejected. The select loader 5 pushes out the optical disc 2 positioned at the predetermined height towards the carry loader 6.

The carry loader 6 retracts the optical disc 2 pushed out from the lower shell 12 to a chucking position of the recording/reproducing device 7. After the recording and/or reproduction for the optical disc 2 is completed, the carry loader 6 pushes back the optical disc 2 to the accommodating position of the lower shell 12.

2-1 Apparatus Body

As shown in FIGS. 1 and 2, the whole of the Disc changer apparatus 3 has an apparatus body 60 formed in the shape of a rectangular box. The apparatus body 60 has a rectangular top cover 61, a bottom cover 62 covered by the top cover 61, and a front panel 63 serving as an insertion/removal surface of the disc cartridge 1. The select loader 5 and the carry loader 6 are mounted in the apparatus body 60 of the Disc changer apparatus 3. At this time, in the apparatus body 60, a surface at which the front panel 63 is installed is referred to as a front surface 60a, a surface opposite to the front surface 60a is referred to as a rear surface 60b, a main surface formed by the top cover 61 is referred to as an upper surface 60c, and both lateral surfaces of the top cover 61 are referred to as a left lateral surface 60d and a right lateral surface 60e, as shown in FIG. 1.

Figure 13:
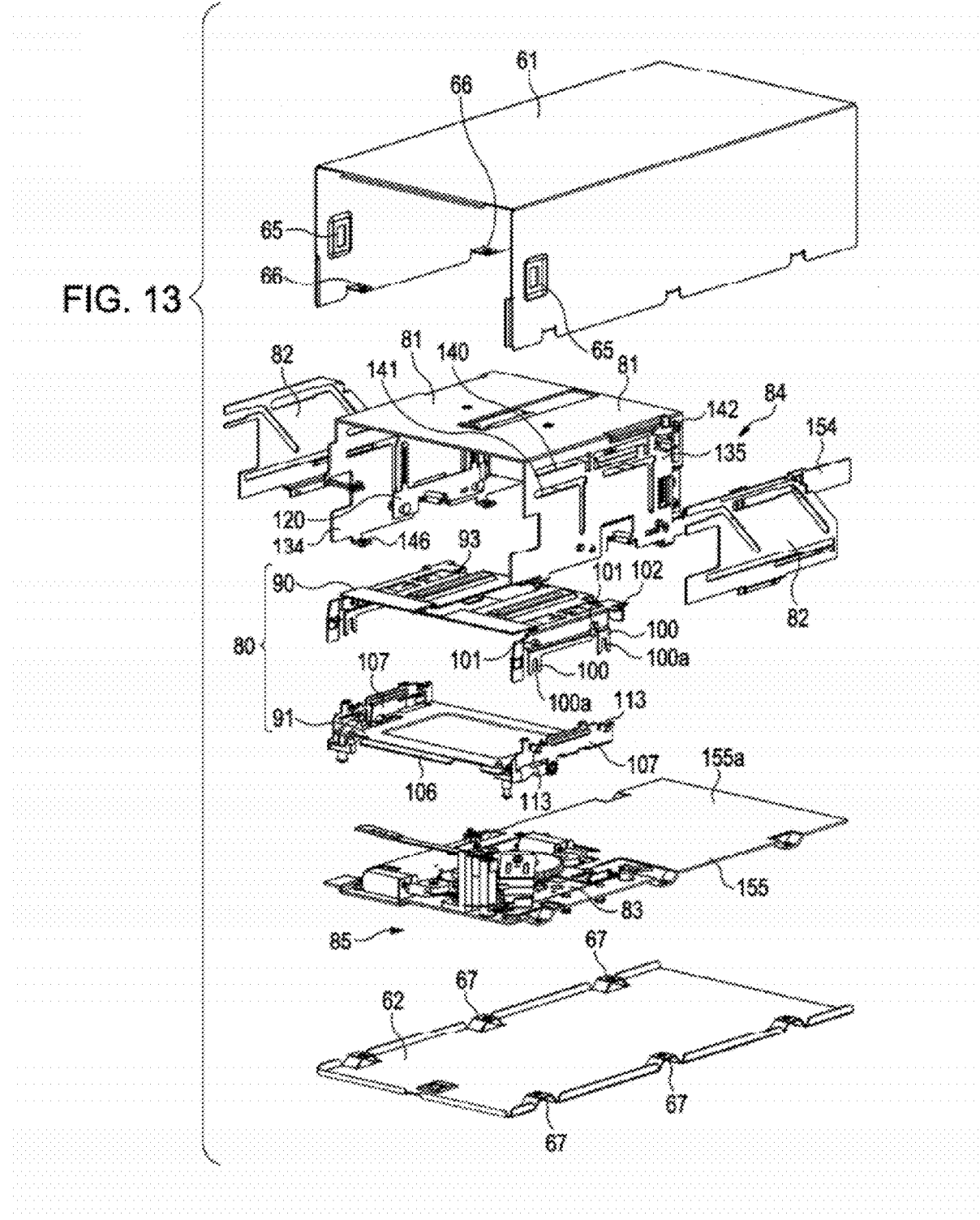
FIG. 13 is an exploded perspective view illustrating a select loader.

As shown in FIG. 13, the top cover 61 forms the rear surface 60b, the upper surface 60c, the left lateral surface 60d and the right lateral surface 60e for the apparatus body 60. The left and right lateral surfaces 60d and 60e are provided with panel engaging holes 65 with which the front panel 63 is engaged, and cover connecting pieces 66 connecting to the bottom cover 62 is arranged in a protruding manner at the inner surfaces thereof.

The bottom cover 62 is formed in the shape of a rectangular plate having substantially the same size as the upper surface 60c of the apparatus body 60, and is provided with a plurality of cover connecting portions 67, to which the cover connecting pieces 66 of the top cover 61 are screwed, at both edges in a widthwise direction perpendicular to the longitudinal direction. The cover connecting pieces 66 and the cover connecting portions 67 are provided with screw holes, and are fastened with the holder cover 81 described below.

Figure 14:
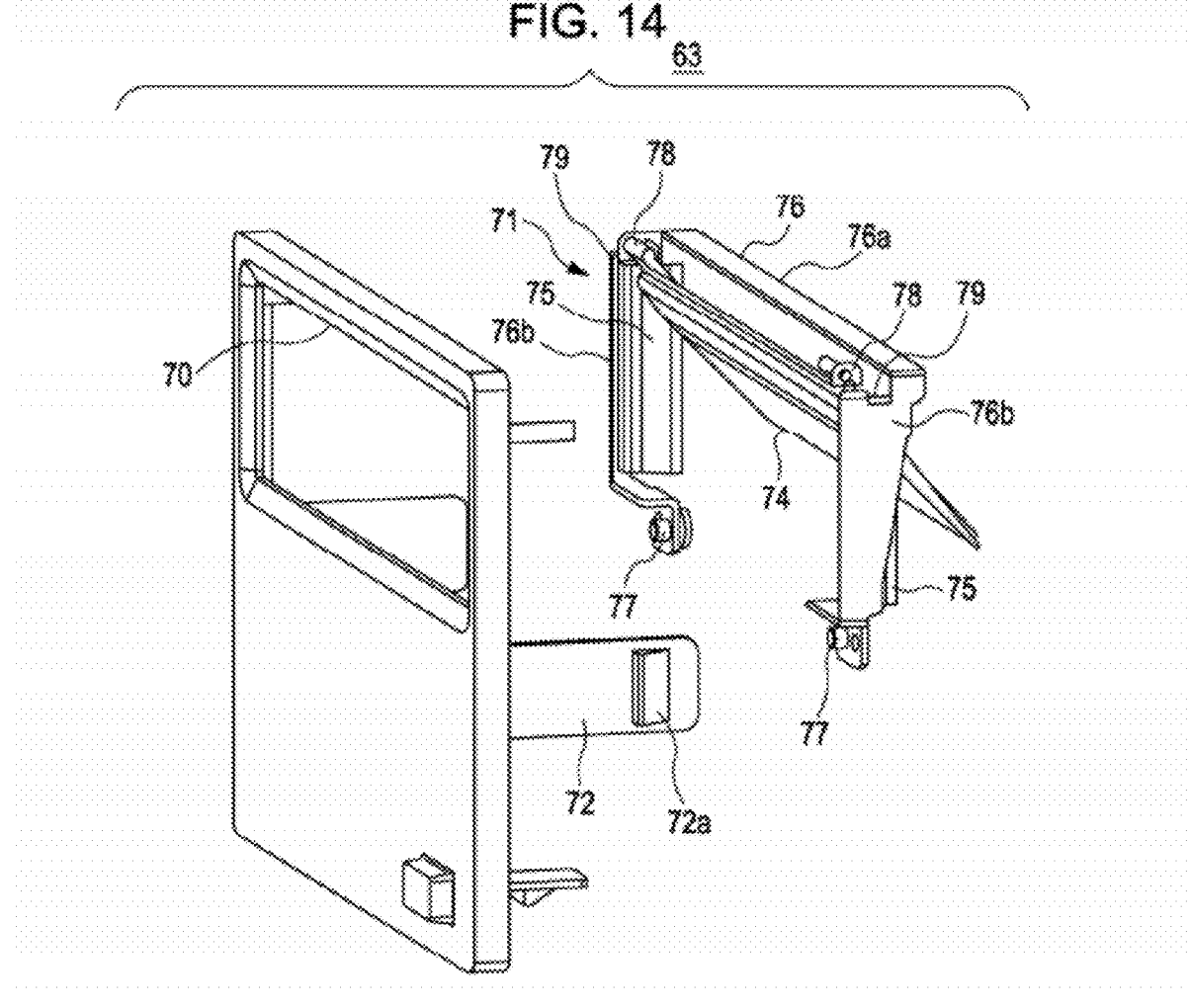
FIG. 14 is an exploded perspective view illustrating a front panel.

The front panel 63 is, as shown in FIG. 14, formed in the shape of a rectangular plate, and has a cartridge insertion/removal opening 70, in which the disc cartridge 1 is inserted in or removed from, a bezel 71 closing the cartridge insertion/removal opening 70, and a cover engaging piece 72 engaging with the panel engaging hole 65 of the top cover 61. The cartridge insertion/removal opening 70 is a rectangular opening slightly larger than the front surface 10a of the cartridge body 10, is opened at the upward side of the apparatus body 60, and is positioned at substantially the same height as the cartridge holder 80 which is transported to the cartridge insertion/removal position described below.

The bezel 71 has a center bezel 74 opening and closing substantially the whole surface of the cartridge insertion/removal opening 70 except for both sides thereof in the longitudinal direction, a pair of side bezels 75 and 75 opening and closing both sides of the cartridge insertion/removal opening 70 in the longitudinal direction, and a support frame 76 attached to the rear surface of the front panel 63 and pivotally supporting the center bezel 74 and the side bezels 75 and 75.

The support frame 76 has a center arm portion 76a having substantially the same length as the length of the cartridge insertion/removal opening 70 in the longitudinal direction, and a pair of side arm portions 76b and 76b extending from both end portions of the center arm portion 76a and pivotally supporting the center bezel 74 and the side bezels 75 and 75. At the front end portion of the side arms 76b, a connecting portion 77 is provided which is connected to the front panel 63. The support frame 76 is attached to the front panel 63 by screwing the connecting portions 77 to the rear surface of the front panel 63.

At the upper end portions of the side arm portions 76b and 76b, a first support portion 78 pivotally supporting the center bezel 74 are provided, and a second support portion 79 pivotally supporting the side bezels 75 is provided along the longitudinal direction.

The center bezel 74 is supported by each of the first support portions 78 of the side arm portions 76b and 76b, so that the center bezel 74 pivots from the upper edge in the widthwise direction, which is perpendicular to the longitudinal direction of the cartridge insertion/removal opening 70, toward the rear surface 60b of the apparatus body 60. In addition, the side bezels 75 and 75 are supported by each of the second support portions 79 of the side arm portions 76b and 76b, so that the side bezels pivots from both edges of the cartridge insertion/removal opening 70 in the longitudinal direction toward the rear surface 60b of the apparatus body 60.

In addition, the center bezel 74 and the side bezels 75 and 75 are typically biased to pivot toward the front surface 60a side, which closes the cartridge insertion/removal opening 70, by a coil spring (not illustrated). At this time, the side bezels 75 and 75 are overlapped with both end portions of the center bezel 74 in the longitudinal direction from the rear surface 60b side.

In the state in which such the bezel 71 is waiting for being mounted in the apparatus body 60 of the disc cartridge 1, the center bezel 74 and the side bezels 75 and 75 pivot and are biased towards the front surface 60a closing the cartridge insertion/removal opening 70. In the bezel 71, if the disc cartridge 1 is inserted in the cartridge insertion/removal opening 70, the center bezel 74 is pressed against the front surface 10a of the cartridge body 10, and then pivots towards the rear surface 60b. Also, the side bezels 75 and 75 are pressed by the center bezel 74 and pivoted towards the rear surface 60b. In addition, in the bezel 71, while the cartridge body 10 is mounted in the apparatus body 60, the center bezel 74 comes into contact with the cartridge body 10 to restrict the pivoting towards the front surface 60a side, and the pivoting of the side bezels 75 and 75 towards the front surface 60a is restricted by the center bezel 74.

In addition, the bezel 71 is able to avoid the interference of the upper shell separating piece 103 or the lower shell separating piece 115 installed at the cartridge holder 80, as described below, by installing the side bezels 75, and to be provided at the cartridge insertion/removal position of the cartridge body 10 at the front surface 60a side of the apparatus body 60, thereby achieving the miniaturization of the apparatus body 60.

At this time, the cover engaging piece 72 has an engaging protrusion portion 72a engaging with the panel engaging hole 65 of the top cover 61.

2-2 Select Loader

Figure 15:
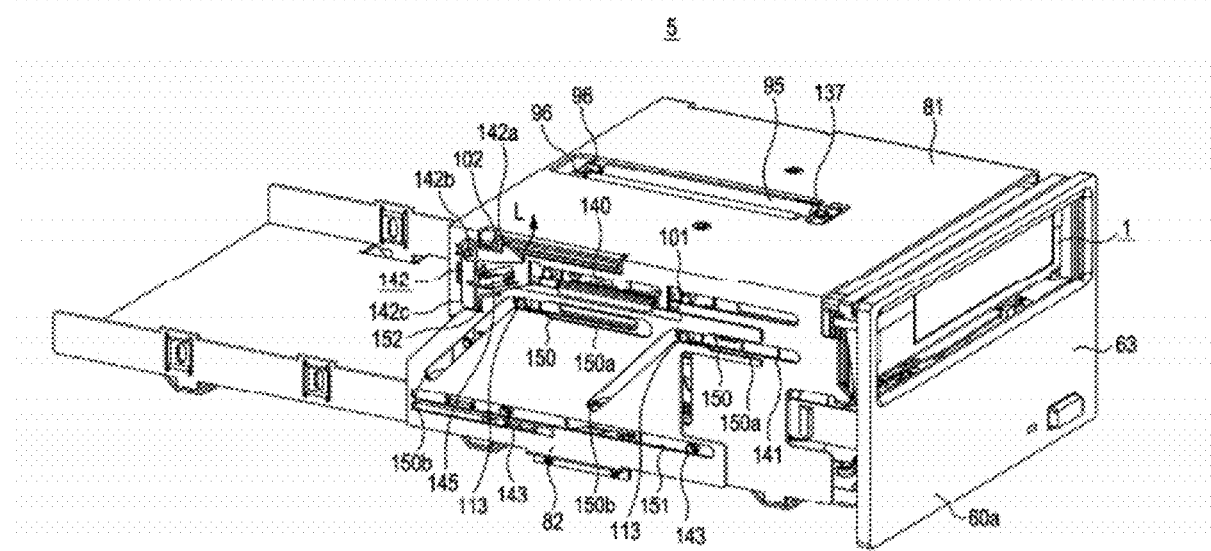
FIG. 15 is a perspective view illustrating an appearance of a select loader.
Figure 16:
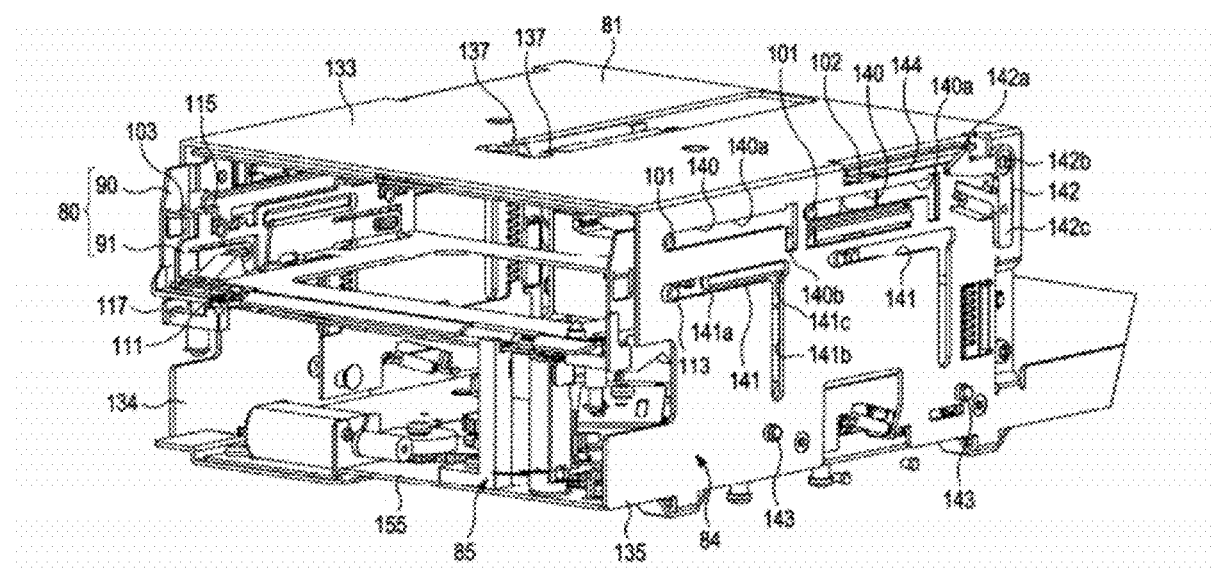
FIG. 16 is a perspective view illustrating an appearance of a select loader.

Next, the select loader 5 separating the cartridge body 10 of the disc cartridge 1 to eject the optical disc 2 will be described. The select loader 5 includes, as shown in FIGS. 13, 15 and 16, a cartridge holder 80 on which the disc cartridge 1 is mounted, a holder lifting mechanism 84 which separates the cartridge holder 80 into the upper and lower shells 11 and 12 and transports the lower shell 12 to the disc insertion/ejection position, and a disc push-out mechanism 85 which pushes the optical disc 2 from the lower shell 12, which is transported to the disc insertion/ejection position, towards the carry loader 6. The holder lifting mechanism 84 has a holder cover 81 which supports the cartridge holder 80 in a slidable manner, a cam plate 82 which transports the cartridge holder 80, and a driving mechanism 83 which slides the cam plate 82.

The cartridge holder 80 has an upper holder 90 and a lower holder 91 which are separatably engaged with each other, in which the upper holder 90 holds the upper shell 11 and the lower holder 91 holds the lower shell 12. The cartridge holder 80 is moved between the cartridge insertion/removal position at which the cartridge holder is slid to the whole surface 60a side of the apparatus body 60, an insertion position at which the cartridge holder is slid from the cartridge insertion/removal position to the rear surface 60b of the apparatus body 60, and the disc insertion/ejection position at which the optical disc 2 is moved down from the insertion position and then the insertion and ejection of the optical disc 2 is performed by the holder lifting mechanism 84 described below. The upper holder 90 and the lower holder 91 are joined to each other at the cartridge insertion/removal position, so that the cartridge body 10 is inserted in or removed from the cartridge holder 80. In addition, the lower holder 91 is moved down to the disc insertion/ejection position, so that the lower and upper holders 90 and 91 of the cartridge holder 80 are separated to insert or eject the optical disc 2.

Since the upper holder 90 is supported to be slid in forward and backward direction of the apparatus body 60 by the holder cover 81, the upper holder 90 is held over the cartridge insertion/removal position at which the cartridge body 10 is inserted in or removed from the apparatus body 60, and the insertion position at which the cartridge body 10 is slid to the rear surface 60b of the apparatus body 60. The upper holder 90 has a substantially rectangular support surface portion 93 supporting the upper surface plate 13 of the upper shell 11, and a pair of left and right upper lateral surface portions 94 and 94 vertically arranged at both edges of the support surface portion 93. Lock releasing mechanisms 92 are provided at the support surface portion 93 and the upper lateral surface portions 94 and 94 to release the locking of the lock mechanism 30.

The support surface portion 93 is provided with a spring hanging portion 96 at substantially the central portion of the rear surface 60b side, with a tension coil spring 95 extended between the spring hanging portion 96 and the holder cover 81. The upper holder 90 is typically biased to the front surface 60a side of the apparatus body 60 by the tension coil spring 95. At this time, the upper holder 90 may be slid forward and backward by the driving mechanism using a motor, as well as using the tension coil spring 95.

Figure 17:
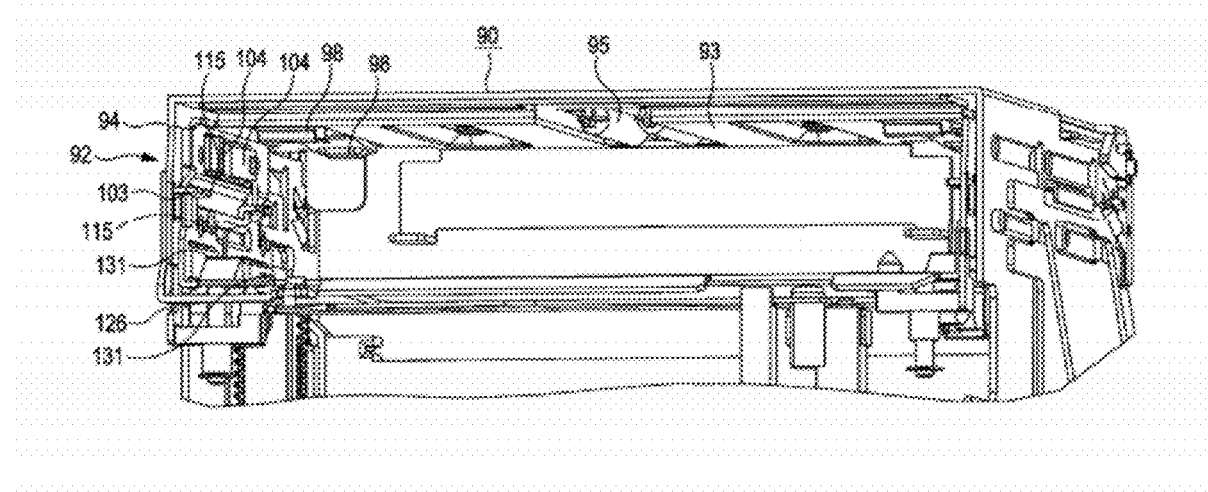
FIG. 17 is a perspective view illustrating a cartridge holder.

The support surface portion 93 is provided with an upper shell holding convex portion 98 at the inner surface opposite to the upper surface plate 13 of the upper shell 11, as shown in FIG. 17, with the upper shell holding convex portion 98 engaging with the concave portion 21 formed at the upper surface plate 13. The upper shell holding convex portion 98 is made up of a rectangular elastic piece having flexibility and extending from the support surface portion 93 to the inner surface side. The upper shell holding convex portion 98 is formed at the front surface 60a side and the rear surface 60b side of the apparatus body 60. The front end portion of the upper shell holding convex portion 98 formed at the front surface 60a side is fitted with a resin component such as POM. The upper shell holding convex portion 98 formed at the rear surface 60b side and engaging with the concave portion 21 is formed by hammering a plate.

The pair of left and right upper lateral surface portions 94 and 94 has a holder engaging piece 100 which is engaged with the lower holder 91, a cam pin 101 which is engaged with the holder cover 81 in a slidable manner, a holder holding piece 102 which holds the cartridge holder 80 at the rear surface 60b side of the apparatus body 60 against the biasing force of the tension coil spring 95, and an upper shell separating piece 103 which is moved in the separation groove 47 of the cartridge body 10 and holds the upper shell 11 at the upper holder 90.

The holder engaging piece 100 is engaged with the engaging cam pin 113, which is arranged in a protruding manner at the lower holder 91, from the upward direction, so that the upper and lower holders 90 and 91 are joined to each other to be slid in an integrated manner in the forward and backward direction of the apparatus body 60. The holder engaging pieces 100 are spaced apart from each other in the front and rear of the upper lateral surface portion 94 in accordance with the engaging cam pin 113 of the lower holder 91. The holder engaging piece 100 is provided with slits 100a with an opened lower end portion. The slits 100a are formed in the upward and downward direction which is substantially perpendicular to an insertion and removal direction of the cartridge body 10. As the lower holder 91 is moved up and down, the engaging cam pin 113 arranged in a protruding manner at the lower holder 91 is moved into the slit 100a from the lower end portion serving as the opened end portion and is moved back. In the cartridge holder 80, as the engaging cam pin 113 is joined to the holder engaging piece 100, the upper holder 90 and the lower holder 91 are joined to each other, so that the upper and lower holders are able to be slid in an integrated manner in the forward and backward direction of the apparatus body 60.

The cam pin 101 is inserted in the upper cam slit 140 formed in the holder cover 81, so that the upper holder 90 is supported to be slid in the forward and backward direction of the apparatus body 60 along the upper cam slit 140. The cam pins 101 are spaced apart from each other in the front and rear and are arranged in a protruding manner at the outer surface of the upper lateral surface portions 94 and 94.

The holder holding pieces 102 are arranged outwardly in a protruding manner at the rear surface 60b side of the upper lateral surface portions 94 and 94. The holder holding piece 102 is joined to a holder latch 142 which is pivotally supported by the holder cover 81, and thus the cartridge holder 80, which is biased to the front surface 60a side of the apparatus body 60 by the tension coil spring 95, is held at the rear surface 60b side of the apparatus body 60. The holder holding piece 102 is arranged in a protruding manner at the through-groove 144 formed in the holder cover 81 in the forward and backward direction towards the outer surface of the holder cover 81. When the cartridge body 10 is mounted and the cartridge holder 80 is slid toward the rear surface 60b of the apparatus body 60, the holder holding piece 102 is locked by the holder latch 142 installed at the outer surface of the holder cover 81.

The upper lateral surface portion 94 is provided with a pressing piece 104 pressing the separation wall 32 of the upper shell 11. The pressing piece 104 is made of a flexible plate-like substance arranged in a protruding manner at the upper lateral surface portion 94 toward the inside of the upper holder 90. The pressing piece 104 formed at the front surface 60a of the apparatus body 60 is fitted with a resin component such as POM, and the pressing piece 104 formed at the rear surface 60b side is formed by hammering a plate. Since the pressing piece 104 presses the upper shell 11, wobble of the upper holder 90 is prevented, and the upper holder 90 is able to be reliably engaged or disengaged from the lower shell 12.

The support surface portion 93 and the upper lateral surface portion 94 are provided with lock releasing mechanism 92 to release the locking of the lock mechanism 30. The lock releasing mechanism 92 has a lock releasing piece 99 which is provided at the support surface portion 93, and an upper shell separating piece 103 which is provided at the upper lateral surface portion 94.

Figure 18:
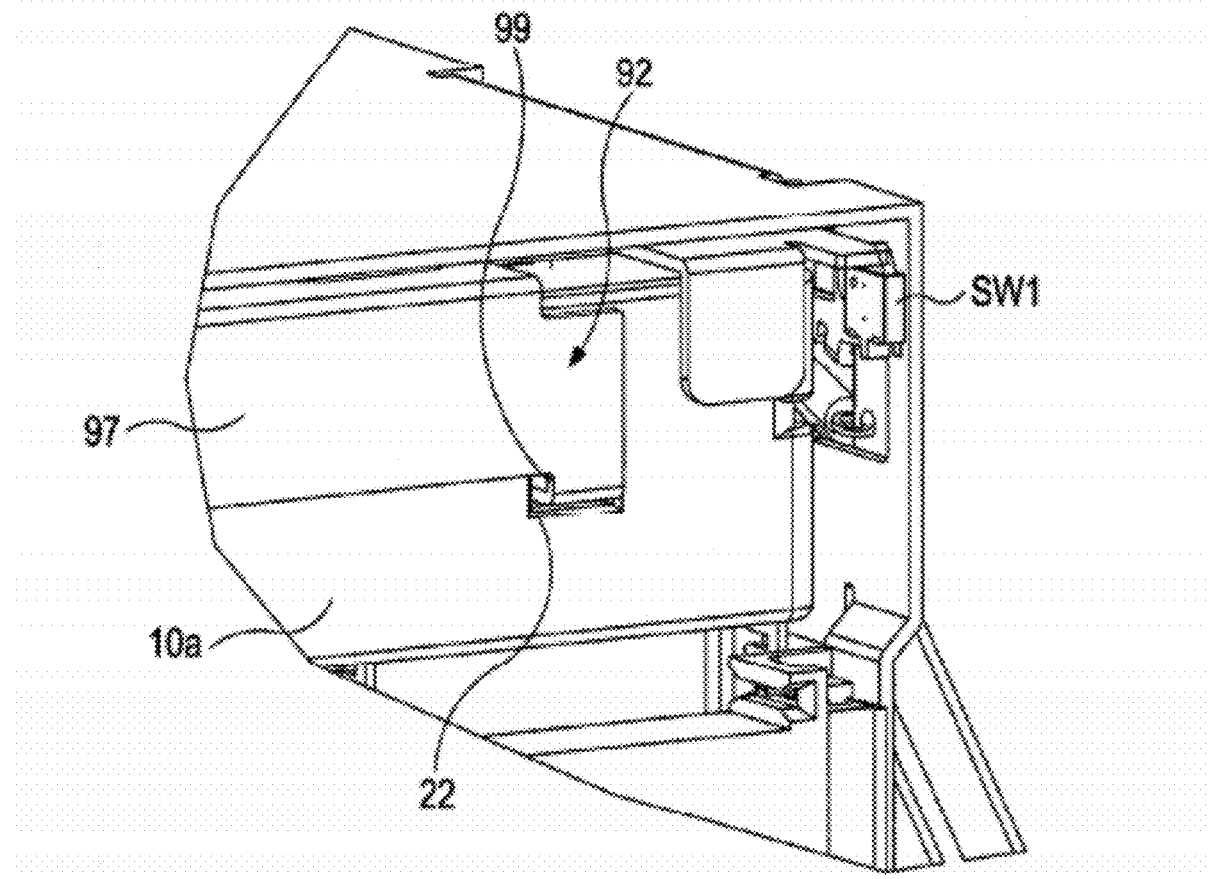
FIG. 18 is a perspective view illustrating a lock releasing piece.

The lock releasing piece 99 is moved in the lock releasing hole 22 formed in the front surface wall 15 of the upper shell 11 to pivot the front-side lock piece 31. As shown in FIG. 18, the support surface portion 93 has a rear lateral surface 97 which is downwardly bent from a side edge of the rear surface 60b side of the apparatus body 60. The lock releasing piece 99 is formed by bending the lower end portion of the rear lateral surface 97 towards the front surface 60a side, and is moved in or out from the lock releasing hole 22 in accordance with the attachment or detachment of the cartridge body 10 to or from the cartridge holder 80.

Therefore, if the cartridge body 10 is mounted on the cartridge holder 80, the lock releasing piece 99 is moved in the lock releasing hole 22 to press the pressing surface portion 31b, so that the front-side lock piece 31 pivots in the direction opposite to the arrow R against the biasing force of the coil spring 35. Since the front-side lock piece 31 pivots in the direction opposite to the arrow R, the engaging portion 31c moves back from the engaged concave portion 56, so that the engagement with the lower shell 12 is released. In addition, if the cartridge body 10 is pulled out from the cartridge holder 80, the lock releasing piece 99 exits from the lock releasing hole 22, so that the front-side lock piece 31 is able to pivot in the direction of the arrow R by the biasing force of the coil spring 35. Since the front-side lock piece 31 pivots in the direction of the arrow R, the engaging portion 31c is joined to the engaged concave portion 56.

The upper shell separating pieces 103 move in the separation grooves 47 formed on the left and right lateral surfaces 10c and 10d of the cartridge body 10 to release the locking of the rear-side lock piece 33 and support the lower end surface of the separation wall 32 of the upper shell 11. Therefore, the upper shell 11 is held in the upper holder 90 which is placed in the cartridge insertion/removal position. The upper shell separating pieces 103 are formed in the shape of plate which is able to support the lower end surface of the separation wall 32, and protrude toward the inside of the upper lateral surface portions 94 and 94. In addition, as the upper and lower holders 90 and 91 are joined to each other, the upper shell separating piece 103 is arranged in parallel with the lower shell separating piece 115 formed at the lower holder 91.

If the cartridge body 10 is inserted in the cartridge holder 80, the upper shell separating pieces 103 move in the separation grooves 47, so that the pressing piece portion 33b of the rear-side lock piece 33 is pressed and then is slid in the direction opposite to the arrow S and the separation wall 32 of the upper shell 11 is supported from below. Therefore, the upper shell separating pieces 103 release the locking of the upper and lower shells 11 and 12 and the upper and lower shells 11 and 12 are able to be separated, and support the upper shell 11 at the cartridge insertion/removal position. As the lower shell 12 is moved down, the upper and lower shells 11 and 12 are separated.

The lifting of the lower holder 91 is operated by the holder cover 81 to transport the lower shell 12 between the cartridge insertion/removal position and the disc insertion/ejection position. The lower holder 91 includes a placing surface portion 106 on which the lower plate 40 of the lower shell 12 is placed, and a pair of left and right lower lateral surface portions 107 and 107 vertically arranged at both edges of the placing surface portion 106.

A switch piece 111 of the identification switch 110 is arranged in a protruding manner at the placing surface portion 106, and the switch piece comes into contact with a contact piece 25b of the erroneous erasure preventing switch 25 which is installed in the cartridge body 10. The switch piece 111 has flexibility, so that the switch piece 111 is installed separatably in the identification switch 110. In addition, if the cartridge body 10 is mounted on the cartridge holder 80, the switch piece 111 is installed at the lower surface of the cartridge body 10, and is placed at a position at which the switch piece is moved in the contact hole 27 facing the contact piece 25b of the erroneous erasure preventing switch 25.

As described above, as the knob portion 25a is operated in a direction of prohibiting the optical disc 2 from being written, the contact piece 25b is moved in a direction opposite to the switch piece 111 through the contact hole 27 formed in the lower surface portion 14b of the rear surface block 14 which constitutes a portion of the lower surface of the cartridge body 10 together with the lower shell 12. In addition, as the knob portion 25a is operated in a direction of allowing the optical disc 2 to be written, the contact piece 25b is moved so as to not face the switch piece 111 through the contact hole 27.

Figure 19A:
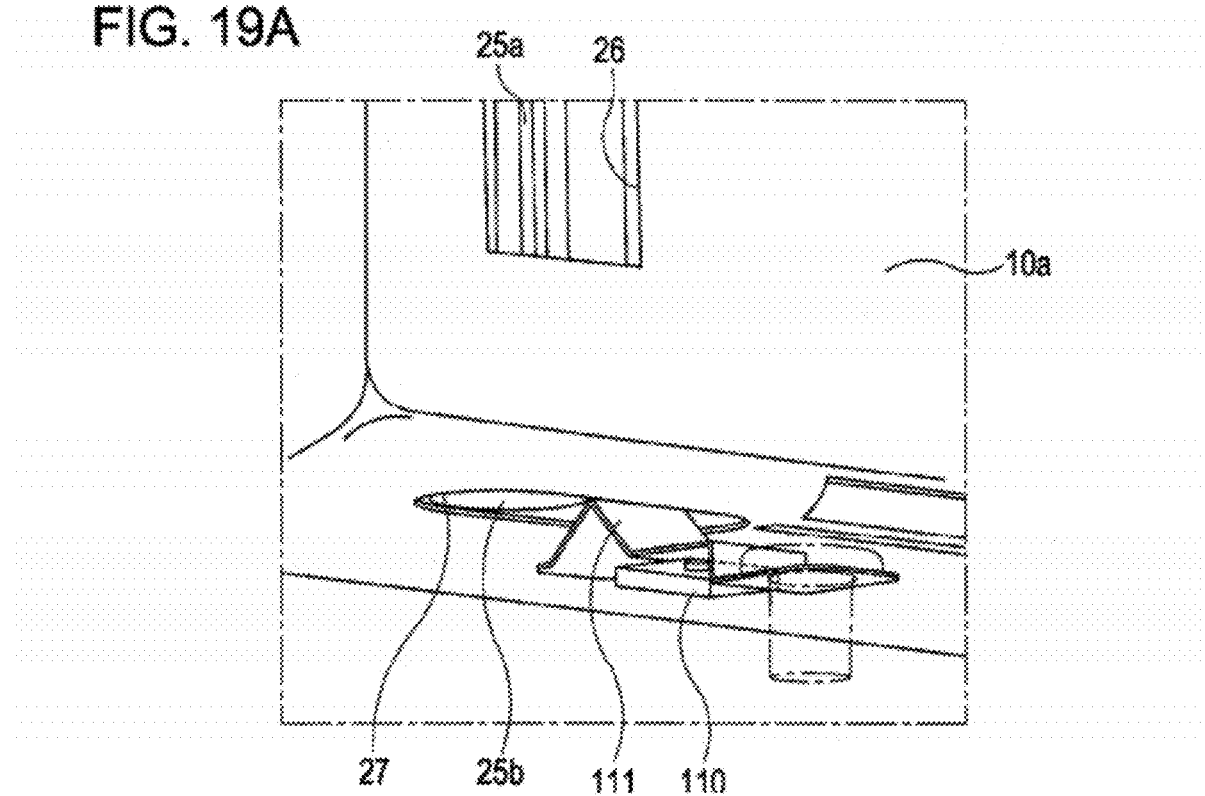
FIG. 19A is a perspective view illustrating a contact switch piece which is spaced apart from an erroneous erasure preventing switch.
Figure 19B:
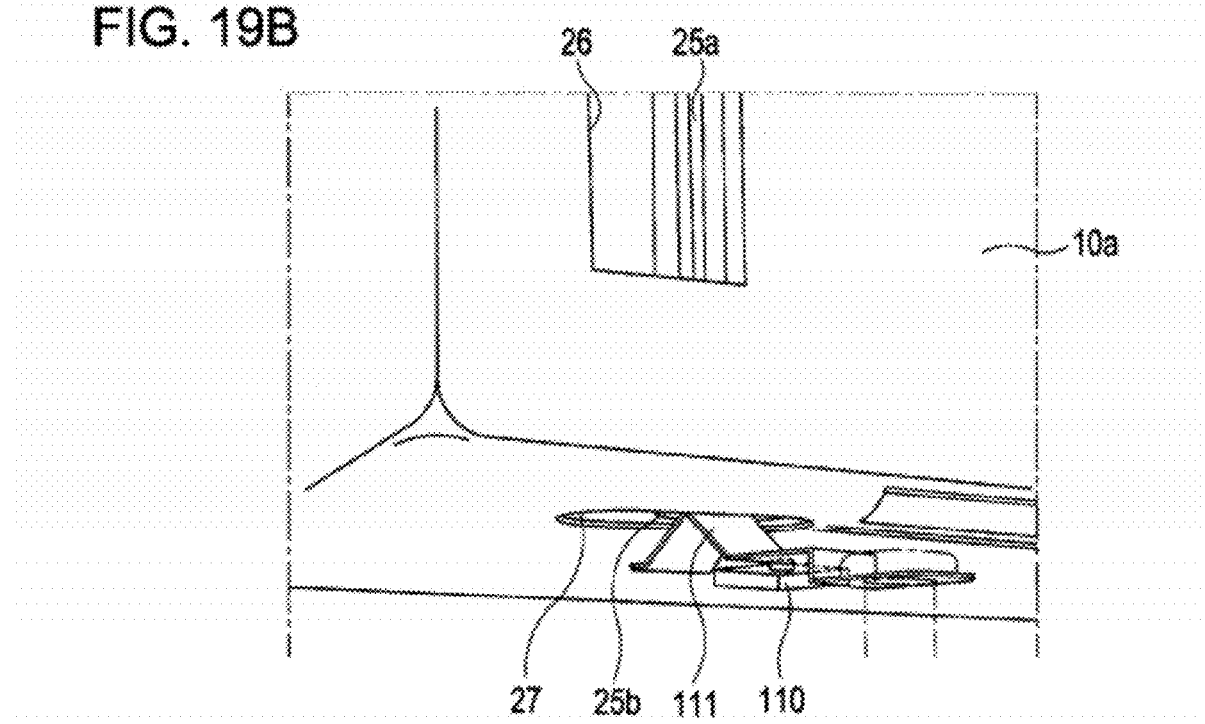
FIG. 19B is a perspective view illustrating a contact switch piece which comes into contact with an erroneous erasure preventing switch.

As shown in FIG. 19A, if the switch piece 111 is moved in the contact hole 27 and does not come into contact with the contact piece 25b of the erroneous erasure preventing switch 25, the switch piece 111 does not come into contact with the identification switch 110, so that the identification switch 110 is turned off (writable). In addition, as shown in FIG. 19B, if the switch piece 111 is moved in the contact hole 27 and comes into contact with the contact piece 25b of the erroneous erasure preventing switch 25, the switch piece 111 is bent under the placing surface portion 106 to come into contact with the identification switch 110, so that the identification switch 110 is turned on (non-writable).

Figure 20:
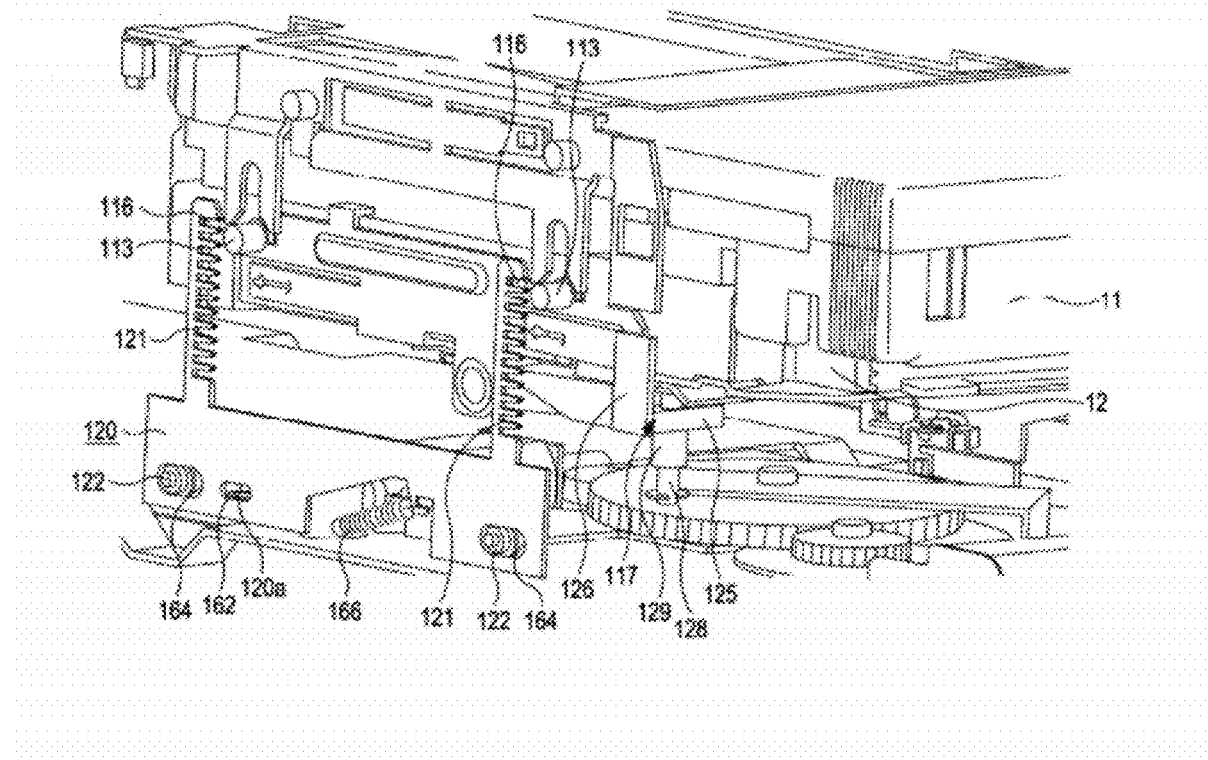
FIG. 20 is a perspective view illustrating a select loader.
Figure 21:
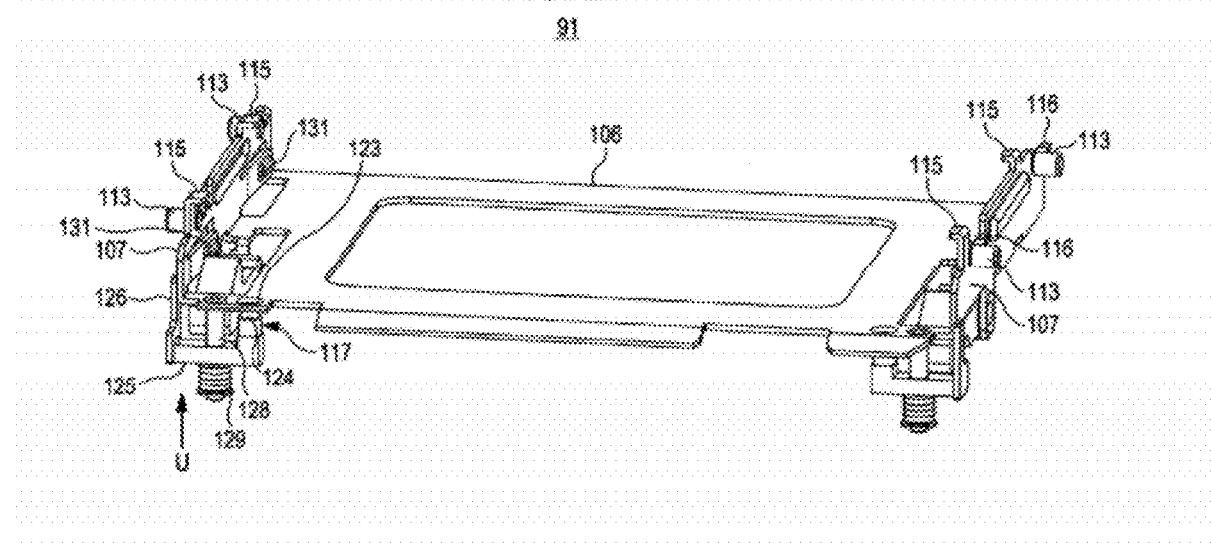
FIG. 21 is a perspective view illustrating a lower holder.

The pair of left and right lower lateral surface portions 107 and 107 have, as shown in FIGS. 17, 20 and 21, an engaging cam pin 113 which is engaged with the upper holder 90 and is engaged with the holder cover 81 in a slidable manner, a lower shell separating piece 115 which is moved in the separation groove 47 of the cartridge body 10 and holds the lower shell 12 in the lower holder 91, a height restricting piece 116 which regulates the height of the lower shell 12 at disc insertion/ejection position with high precision, and a shell positioning pin 117 which secures the positioning of the lower shell 12 mounted at the placing surface portion 106.

The engaging cam pins 113 are engaged with the holder engaging pieces 100 of the upper holder 90 to engage the upper and lower holders 90 and 91 to be slid in the forward and backward direction of the apparatus body 60. The engaging cam pins 113 are spaced apart from each other in the front and rear of the lower lateral surface portion 107, and is arranged outwardly in a protruding manner. When the upper and lower holders 90 and 91 are joined to each other at the cartridge insertion/removal position, the engaging cam pins 113 are moved in the slits 100a of the holder engaging pieces 100 of the upper holder 90. Accordingly, the lower holder 91 is integrated with the upper holder 90 in the forward and backward direction of the apparatus body 60, so that the lower holder 91 and the upper holder 90 are slid in an integrated manner in the forward and backward direction.

In addition, the engaging cam pins 113 are inserted in the lower cam slits 141 formed in the holder cover 81 to support the lower holder 91 in a slidable manner along the lower cam slits 141 in the forward and backward direction and the upward and downward direction of the apparatus body 60.

The lower shell separating pieces 115 move in the separation grooves 47 formed in the left and right lateral surfaces 10c and 10d of the cartridge body 10 to support the upper end surfaces of the entrance grooves 43 formed on the left and right disc holders 41 and 42 of the lower shell 12 and thus holds the lower shell 12 in the lower holder 91. The lower shell separating piece 115 is formed in the shape of plate to support the upper end surface of the entrance groove 43, and is arranged in a protruding manner at the inner surface of the respective lower lateral surface portions 107 and 107. In addition, the lower shell separating pieces 115 are joined to the upper and lower holders 90 and 91, and thus are adjacent to the upper shell separating piece 103 formed at the upper holder 90.

If the cartridge body 10 is inserted in the cartridge holder 80, the lower shell separating piece 115 is moved in the separation groove 47 to support the upper end surface of the entrance groove 43 of the lower shell 12 from above. Consequently, the lower shell separating piece 115 holds the lower shell 12 in the lower holder 91, and if the lower shell 12 is moved down from the cartridge insertion/removal position to the disc insertion/ejection position by the cam plate 82 described below, the lower shell separating piece 115 separates the lower shell 12 from the upper shell 11.

The height restricting piece 116 facilitates the positioning of the lower holder 91 which moves down to the disc insertion/ejection position, so that the predetermined optical disc 2 among the plurality of optical discs 2 stacked and accommodated in the cartridge body 10 is positioned on the pivot trace of the push-out lever 167. The height regulating pieces 116 are spaced apart from each other in the front and rear of the lower lateral surface portions 107 and 107, as shown in FIG. 20, and are arranged outwardly in a protruding manner to engage with the height adjusting plate 120.

As shown in FIG. 20, the height adjusting plate 120 is supported by the support convex portions 122 installed in the inner surfaces of support lateral surface portions 134 and 135 of the holder cover 81 such that the height adjusting plate 120 is slid by the driving mechanism 83 described below along the forward and backward direction of the apparatus body 60. The height adjusting plate 120 is provided with a plurality of adjustment slits 121 formed at the same interval as the support interval of the optical discs 2 which are accommodated in the cartridge body 10. Each of the adjustment slits 121 is joined to the height restricting piece 116 to facilitate the positioning of the lower holder 91 at the disc insertion/ejection position at which the corresponding optical disc 2 among the plurality of optical discs 2 supported in the support grooves 48 is located at the pivot trace of the push-out lever 167. The adjustment slit 121 is opened toward the height restricting piece 116 of the lower holder 91 which is moved down at the disc insertion/ejection position, and is engaged or disengaged with the height restricting piece 116 as the height adjusting plate 120 is slid. At this time, since the front end of each opening portion becomes wider, the adjustment slit 121 is able to easily retract the height restricting piece 116.

If the lower holder 91 is moved down to the disc insertion/ejection position by the cam plate 82, at which the predetermined optical disc 2, on which the information signal is recorded and/or reproduced, is located on the pivot trace of the push-out lever 167, the height adjusting plate 120 is slid and then engaged with the height restricting piece 116. Consequently, the lower holder 91 is regulated at the disc insertion/ejection position of the predetermined optical disc 2 to prevent the other optical discs 2 vertically stacked from being inserted or ejected in error at the disc insertion/ejection position.

The shell positioning pins 117 are inserted in the positioning holes 45 drilled in the lower plate 40 of the lower shell 12 to facilitate the positioning of the lower shell 12 in the lower holder 91. The shell positioning pins 117 are provided at both sides of the front edge, which serves as an insertion end portion of the cartridge body 10, in the widthwise direction as shown in FIG. 21. The shell positioning pin 117 has an insertion pin 124 inserting through the positioning hole 45 through the pin hole 123 formed in the lower holder 91, a lifting block 125 with the insertion pin 124 protruded, and a pressing-down piece 126 pressed downward on the upper holder 90. In addition, the lifting shaft 128 attached to the lower holder 91 is inserted in the lifting block 125 in a free lifting manner, and the shell positioning pin 117 is slid along the lifting shaft 128, so that the insertion pin 124 is able to move in and out from the pin hole 123 above the placing surface portion 106.

The lifting shaft 128 is installed at the lower side of the placing surface portion 106, and the front end portion of the lifting shaft is inserted in a coil spring 129 which presses the lifting block 125 upward. The coil spring 129 is locked by a locking member, such as an E-ring, installed at the front end portion of the lifting shaft 128, and the lifting block 125 is typically biased in the direction of the arrow U in FIG. 21 in which the insertion pin 124 is arranged in a protruding manner at the top of the placing surface portion 106.

The pressing-down piece 126 is extended from the lifting block 125 to the outside of lower lateral surface portion 107, and is pressed down by the upper holder 90, so that the lifting block 125 is pressed down in the direction opposite to the arrow U against the biasing force of the coil spring 129 to retract the insertion pin 124 from the placing surface portion 106.

Figure 22:
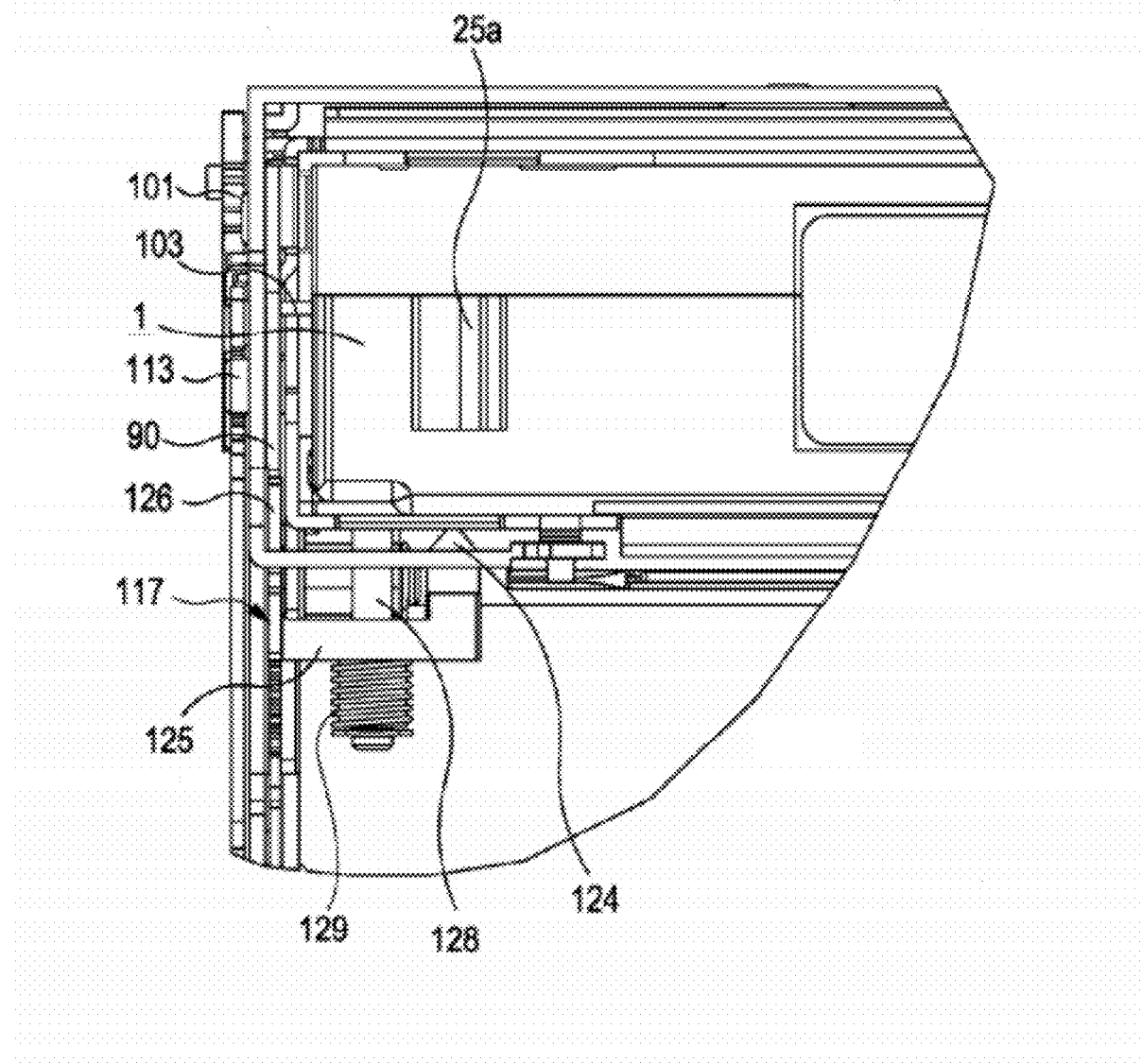
FIG. 22 is a perspective view illustrating a shell positioning pin in the state in which upper and lower holders come into contact with each other.

With the shell positioning pins 117, as the pressing-down piece 126 is pressed down by the upper holder 90 due to the contact of the upper and lower holders 90 and 91, as shown in FIG. 22, the cartridge body 10 is able to be separatably attached in the cartridge holder 80. In addition, with the shell positioning pins 117, if the cartridge body 10 is mounted and the lower holder 91 is moved down at the disc insertion/ejection position, the pressing force of the pressing-down piece 126 by the upper holder 90 is released, so that the lifting block 125 is moved up by the coil spring 129. Consequently, the insertion pin 124 is inserted in the positioning hole 45 of the lower shell 12 through the pin hole 123, the shell positioning pins 117 are able to facilitate the positioning of the lower shell 12 in the lower holder 91.

At this time, the lower lateral surface portion 107 is provided with a pressing piece 131 pressing each of the left and right disc holders 41 and 42 of the lower shell 12. The pressing piece 131 is formed of a plate-like substance having flexibility and arranged in a protruding manner at the lower lateral surface portion 107 toward the inside of the lower holder 91. The pressing piece 131 provided at the front surface 60a of the apparatus body 60 is fitted with a resin component such as POM, and the pressing piece 131 formed at the rear surface 60b side is formed by hammering a plate. As the pressing piece 131 presses the lower shell 12, the lower holder 91 prevents the wobble, thereby reliably performing the insertion and ejection of the optical disc 2 or the engagement or disengagement with the upper shell 11.

Next, the holder lifting mechanism 84 for lifting the cartridge holder 80 will be described. As described above, the holder lifting mechanism 84 includes a holder cover 81 supporting the cartridge holder 80 in a slidable manner, a cam plate 82 transporting the cartridge holder 80, and a driving mechanism 83 sliding the cam plate 82.

The holder cover 81 supports the cartridge holder 80 in a slidable manner, and as shown in FIGS. 13 and 16, is fastened to the cover connection portions 67 of the bottom cover 62 together with the top cover 61 of the apparatus body 60 to be integrally fixed to the apparatus body 60. In addition, the holder cover 81 has a top face portion 133 which is in parallel with the upper surface 60c of the apparatus body 60, and a pair of left and right support lateral surface portions 134 and 135 bent from both edges of the top face portion 133 and supporting the cartridge holder 80.

The top face portion 133 is provided with a spring hanging portion 137, to which one end portion of the tension coil spring 95 extended between the upper holder 90 and the spring locking portion 137 is locked, at the front surface 60a side of the apparatus body 60. The tension coil spring 95 is locked to the spring hanging portion 137 to typically bias the cartridge holder 80 toward the front surface 60a of the apparatus body 60 in a slidable manner.

The support lateral surface portions 134 and 135 have an upper cam slit 140 which guides the upper holder 90 of the cartridge holder 80, a lower cam slit 141 which guides the lower holder 91, a holder latch 142 which holds the upper holder 90 at the rear surface 60b side of the apparatus body 60, a slide guide pin 143 which guides the sliding of the cam plate 82 described below, and a through groove 144 through which the holder holding piece 102 formed at the upper holder 90 is inserted.

The upper cam slit 140 and the lower cam slit 141 guide movement of the cartridge holder 80. When the Disc changer apparatus 3 is waiting for insertion of the disc cartridge 1 or the Disc changer apparatus 3 ejects the disc cartridge 1, the cartridge holder 80 is slid to the cartridge insertion/removal position of the front surface 60a side of the apparatus body 60. In addition, if the disc cartridge 1 is inserted in a cartridge insertion/removal opening 70, the disc changer apparatus 3 is pressed against the cartridge body 10, so that the cartridge holder 80 is slid to the insertion position of the rear surface 60b side. Moreover, in the disc changer apparatus 3, when the disc cartridge 1 is ejected, the cartridge holder 80 is slid to the cartridge insertion/removal position of the front surface 60a side by the tension coil spring 95. At this time, the sliding of the cartridge holder 80 is guided in the forward and backward direction by the upper cam slit 140 and the lower cam slit 141. In addition, when the lower holder 91 is lifted over the insertion position and the disc insertion/ejection position by the cam plate 82, the lower holder 91 is guided to the lower cam slit 141.

As the cam pin 101 arranged in a protruding manner at the upper lateral surface portion 94 of the upper holder 90 is inserted in the upper cam slit 140, the upper cam slit 140 guides the sliding of the cartridge holder 80 in the forward and backward direction. The upper cam slits 140 are spaced apart from each other in the front and rear at the upper portions of the support lateral surface portions 134 and 135. Each of the upper cam slits 140 has an upper horizontal portion 140a guiding the cartridge holder 80 in the forward and backward direction, and an upper vertical portion 140b extending downwardly from the end portion of the rear surface 60b side of the lower horizontal portion 140a.

As the cam pin 101 of the upper holder 90 is inserted in the upper cam slit 140, the upper cam slit 140 guides the forward and backward sliding of the upper holder 90 by the upper horizontal portion 140a. At this time, since the upper holder 90 and the lower holder 91 are joined to each other by engagement of the holder engaging piece 100 and the engaging cam pin 113, the cartridge holder 80 guides the forward and backward movement of the upper and lower holders 90 and 91 in an integrated manner. In addition, the cartridge body 10 is held in the state in which the upper and lower shells 11 and 12 are joined to each other. The upper cam slit 140 moves the cartridge body 10 along a horizontal direction by the upper horizontal portion 140a, and the cartridge body 10 is not guided by the upper vertical portion 140b in typical use.

As the engaging cam pin 113 arranged in a protruding manner at the lower lateral surface portion 107 of the lower holder 91 is inserted in the lower cam slit 141, the lower cam slit 141 guides the sliding of the cartridge holder 80 along the forward and backward direction, and the sliding of the lower holder 91 along the upward and downward direction. The lower cam slits 141 are spaced apart from each other in the front and rear at a position adjacent to the center of the support lateral surface portions 134 and 135 in the height direction. Each of the lower cam slits 141 has a lower horizontal portion 141a guiding the cartridge holder 80 in the forward and backward direction, and a lower vertical portion 141b which is substantially perpendicular to the lower horizontal portion 141a and extends downward from the rear surface 60b side of the lower horizontal portion 141a. At this time, the lower horizontal portion 141a is provided with a preliminary horizontal portion 141c at the rear surface 60b side rather than the lower vertical portion 141b.

As the engaging cam pin 113 of the lower holder 91 is inserted in each of the lower cam slits 141, the lower cam slit 141 guides the sliding of the lower holder 91 along the forward and backward direction by the lower horizontal portion 141a. At this time, since the lower holder 91 and the upper holder 90 are engaged with each other by the engagement of the engaging cam pin 113 and the holder engaging piece 100, the upper and lower holders 90 and 91 of the cartridge holder 80 are slid in an integrated manner.

In addition, if the lower holder 91 is slid to the insertion position of the rear surface 60b side of the lower horizontal portion 141a, the lower cam slit 141 guides the engaging cam pin 113, which is lifted by the cam plate 82, in the upward and downward direction by the lower vertical portion 141b. Accordingly, the lower cam slit 141 guides the lifting of the lower holder 91 over the cartridge insertion/removal position and the disc insertion/ejection position.

The holder latch 142 holds the cartridge holder 80, which is slid to the insertion position of the rear surface 60b side of the apparatus body 60, at the corresponding insertion position against the biasing force of the tension coil spring 95. Each of the holder latches 142 is installed at the rear surface 60b side of the respective support lateral surface portions 134 and 135. The holder latch 142 is locked to the holder holding piece 102, which is formed at the upper lateral surface portion 94 of the upper holder 90, from the front surface 60a side, thereby restricting the sliding of the upper holder 90 and the lower holder 91 integrally joined to the upper holder 90 towards the front surface 60a side.

Each of the holder latches 142 has a hook portion 142a which is locked to the holder holding piece 102, a pivot support portion 142b which is pivotally supported by each of the support lateral surface portions 134 and 135, and a spring locking portion 142c to which the latch spring 145 is locked. Since one end portion of the holder latch 142 is locked to the other end portion of the latch spring 145, of which one end portion is locked to each of the support lateral surface portions 134 and 135, the holder latch 142 is pivotally biased in the direction of the arrow L in FIG. 15 to lock the hook portion 142a at the holder holding piece 102. Accordingly, if the cartridge holder 80 is slid to the rear surface 60b side, the hook portion 142a is locked to the holder holding piece 102, so that the holder latch 142 is able to restrict the cartridge holder 80 from being slid to the front surface 60a side.

At this time, in the lower cam slit 141, since the cartridge holder 80 pushes down the holder holding piece 102 and the hook portion 142a of the holder latch 142 until the hook portion is locked to the holder holding piece 102, the engaging cam pin 113 is slid from the lower horizontal portion 141a to the preliminary horizontal portion 141c through the lower vertical portion 141b. In the lower cam slit 141, if the holder holding piece 102 is locked to the holder latch 142, the engaging cam pin 113 is positioned over the lower vertical portion 141b. Consequently, the upper and lower shells 11 and 12 are held at the insertion position.

In addition, when the spring locking piece portion 142c is positioned over a sliding trace of the cam plate 82 described below and the disc cartridge 1 is ejected, the spring locking piece portion 142c is pressed towards the rear surface 60b by the cam plate 82, the holder latch 142 pivots in the direction opposite to the arrow L in FIG. 15. Consequently, the hook portion 142a is out of the holder holding piece 102, and the holder latch 142 allows the upper holder 90 and the lower holder 91 to slide to the front surface 60a, so that the upper holder 90 and the lower holder 91 are slid toward the front surface 60a by the tension coil spring 95.

In addition, the slide guide pins 143 guiding the sliding of the cam plate 82 are arranged in a protruding manner at the lower portion of the support lateral surface portions 134 and 135. Each of the slide guide pin 143 is inserted in the guide slit 151 formed in the cam plate 82 to guide the sliding of the cam plate 82.

Each of the insertion grooves 144, in which the holder holding piece 102 is inserted, is formed at the rear surface 60b of the support lateral surface portions 134 and 135 along the forward and backward direction. The holder holding piece 102 is arranged outwardly in a protruding manner at the insertion groove 144 and is slid to be locked to the hook portion 142a of the holder latch 142.

At this time, the support lateral surface portions 134 and 135 are provided with a plurality of cover connection pieces 146 at the lower edge in the height direction, with the cover connection pieces 146 being connected to the cover connection portions 67 of the bottom cover 62. The cover connection pieces 146 are fastened to the cover connection portions 67 of the bottom cover 62 together with the top cover 61. In addition, the support lateral surface portions 134 and 135 are provided with extension support pieces 154 and 154 extending toward the rear surface 60b of the apparatus body 60 and attached to the housing 200 of the carry loader 6 described below.

Next, the cam plates 82 lifting the lower holder 91 will be described. The cam plates 82 are adjacent to the outside of the support lateral surface portions 134 and 135, and are supported by the holder cover 81 and the driving mechanism 83 described below to be slid in the forward and backward direction. As shown in FIG. 15, each of the cam plates 82 has lifting guide grooves 150 in which the engaging cam pins 113 arranged in a protruding manner at the lower holder 91 are inserted, a guide slit 151 in which the slide guide pin 143 arranged in a protruding manner at the holder cover 81 is inserted, and a latch pressing portion 152 pressing the spring locking piece portion 142c of the holder latch 142.

The lifting guide grooves 150 are spaced apart from each other in the forward and backward direction of the cam plate 82, and each of the lifting guide grooves has a horizontal guide portion 150a which is formed at the apparatus body 60 in the forward and backward direction to guide the sliding of the lower holder 91 in the same direction, and a lifting guide portion 150b which is arranged obliquely from the end portion of the rear surface 60b side of the horizontal guide portion 150a to the downward side to lift the lower holder 91. As the cam plate 82 is slid along the lifting guide grooves 150 by the driving mechanism 83 in the forward and backward direction of the apparatus body 60, the engaging cam pin 113 is slid along the horizontal guide portion 150a and the lifting guide portion 150b to lift the lower holder 91.

In addition, the cam plate 82 is linked with the driving mechanism 83 via a connecting member, and is slid in the forward and backward direction of the apparatus body 60 by driving of the driving mechanism 83. At this time, the slide guide pins 143 installed at the support lateral surface portions 134 and 135 of the holder cover 81 are inserted in the guide slits 151, and the cam plates 82 are guided by the slide guide pins 143. The guide slit 151 is formed at the lower portion of the respective cam plates 82 in the forward and backward direction of the apparatus body 60.

The latch pressing portion 152 is formed at the side edge of the rear surface 60b side of the cam plate 82. As the cam plate 82 is slid to the rear surface 60b side, the latch pressing portion 152 presses the spring locking piece portion 142c of the holder latch 142, so that the hook portion 142a pivots in the direction opposite to the arrow L and thus is deviated from the holder holding piece 102.

Figure 23:
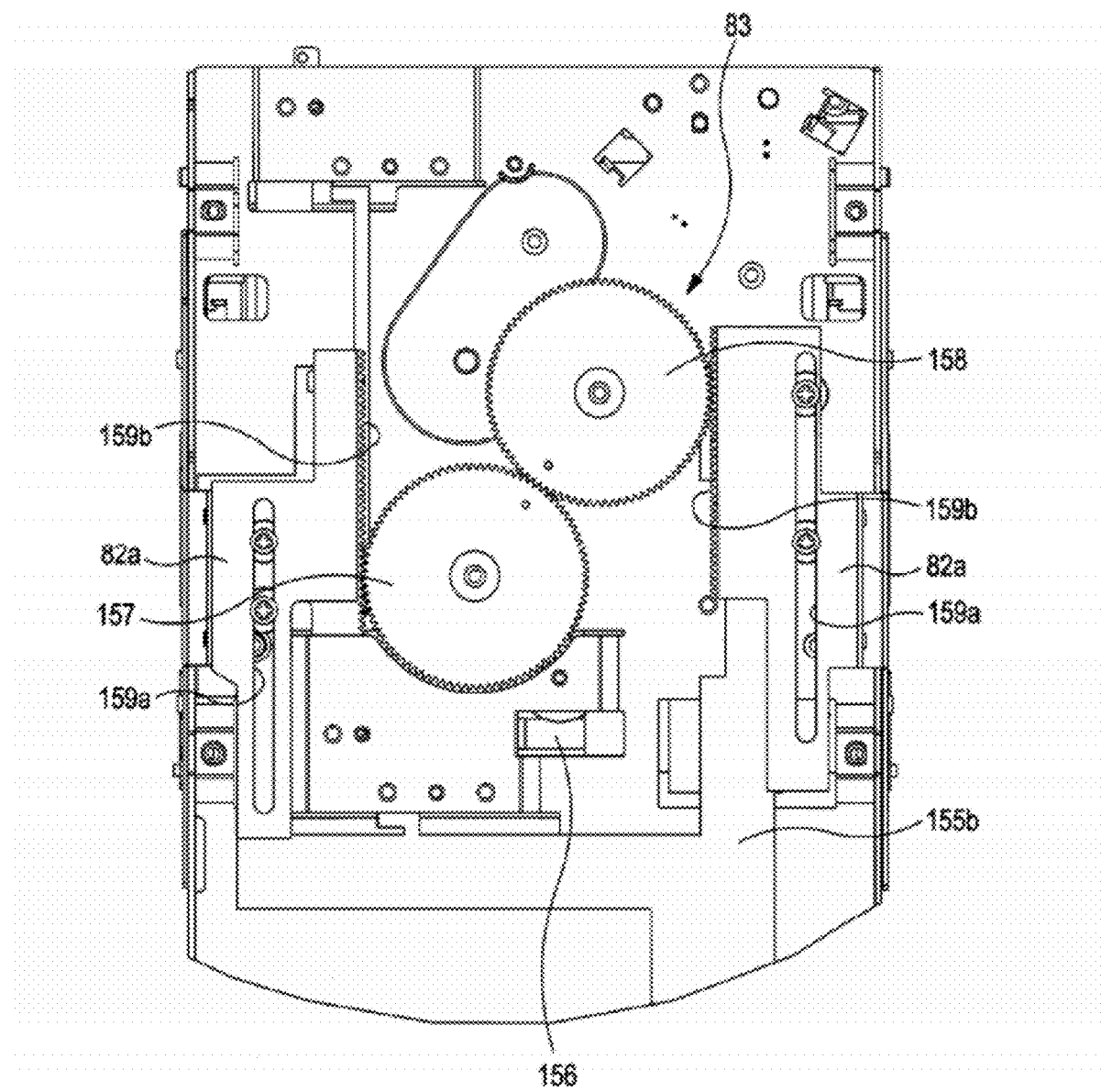
FIG. 23 is a plan view illustrating a driving mechanism.

The driving mechanism 83 driving the cam plate 82 includes, as shown in FIGS. 13 and 23, a first driving motor 156 placed on a base plate 155 which is fastened to the bottom cover 62 serving as a driving source, and a first back surface gear 157 and a second back surface gear 158 which are rotated by the first driving motor 156 and are respectively connected to the cam plates 82.

The base plate 155 is formed in a rectangular shape having substantially the same size as that of the bottom cover 62, and is fastened and fixed to the cover connecting portion 67 of the bottom cover 62 together with the top cover 61 and the holder cover 81. The base plate 155 is provided with a disc push-out mechanism 85, which will be described below, at the front surface 60a side on the surface 155a. In addition, the base plate 155 is provided with the carry loader 6 described below, and the recording/reproducing device 7 at the rear surface 60b side over the surface 155a.

The first back surface gear 157 and the second back surface gear 158 are pivotally supported on the rear surface 155b of the base plate 155 and are meshed with each other. In addition, the first back surface gear 157 is coupled to the first driving motor 156 mounted on the surface 155a of the base plate 155 via a reduction gear. The first back surface gear 157 is meshed with a gear portion 159b of a gear coupling portion 82a which extends to the rear surface 155b side of the base plate 155 from the lower edge of the cam plate 82. The second back surface gear 158 is meshed with the first back surface gear 157, and is meshed with the gear portion 159b of the gear coupling portion 82a which extends to the rear surface 155b side of the base plate 155 from the lower edge of the cam plate 82.

The gear coupling portion 82a of the cam plate 82 is provided with a guide elongated hole 159a which is formed along the forward and backward direction of the apparatus body 60, and a gear portion 159b meshed with the first back surface gear 157 or the second back surface gear 158. The guide shaft arranged in a protruding manner at the rear surface 155b of the base plate 155 is inserted in the guide elongated hole 159a. In addition, the gear portion 159b is formed over the forward and backward direction of the apparatus body 60.

If the first driving motor 156 is driven, the first back surface gear 157 and the second back surface gear 158 of the driving mechanism 83 are rotated, and thus the gear coupling portion 82a is moved along the guide elongated hole 159a. Consequently, the pair of left and right cam plates 82 is synchronously slid in the forward and backward direction of the apparatus body 60.

The cam plate 82 is slid to the rear surface 60b side of the apparatus body 60 in the state in which the disc cartridge 1 is waiting for insertion. In addition, in the cartridge holder 80, as the cam pin 101 and the engaging cam pin 113 are guided along the horizontal guide portion 150a of the cam plate 82, and the upper horizontal portion 140a and the lower horizontal portion 141a of the holder cover 81, so that the upper and lower holders 90 and 91 are joined to each other and thus is held at the cartridge insertion/removal position.

In the apparatus body 60, if the disc cartridge 1 is inserted in the cartridge holder 80 and the cartridge holder 80 is slid to the rear surface 60b side of the apparatus body 60 against the biasing force of the tension coil spring 95, the hook portion 142a of the holder latch 142 is locked in the holder holding piece 102 to restrict the sliding of the apparatus body 60 toward the front surface 60a side. If it is detected that the cartridge holder 80 is slid to such a position, the cam plate 82 is slid to the front surface 60a side as the first driving motor 156 is driven. In addition, the engaging cam pin 113 is slidably moved to the lifting guide portion 150b from the horizontal guide portion 150a, the lower holder 91 is moved down along the lower vertical portion 141b from the lower horizontal portion 141a of the holder cover 81, and then is transported to the disc insertion/ejection position.

Figure 24:
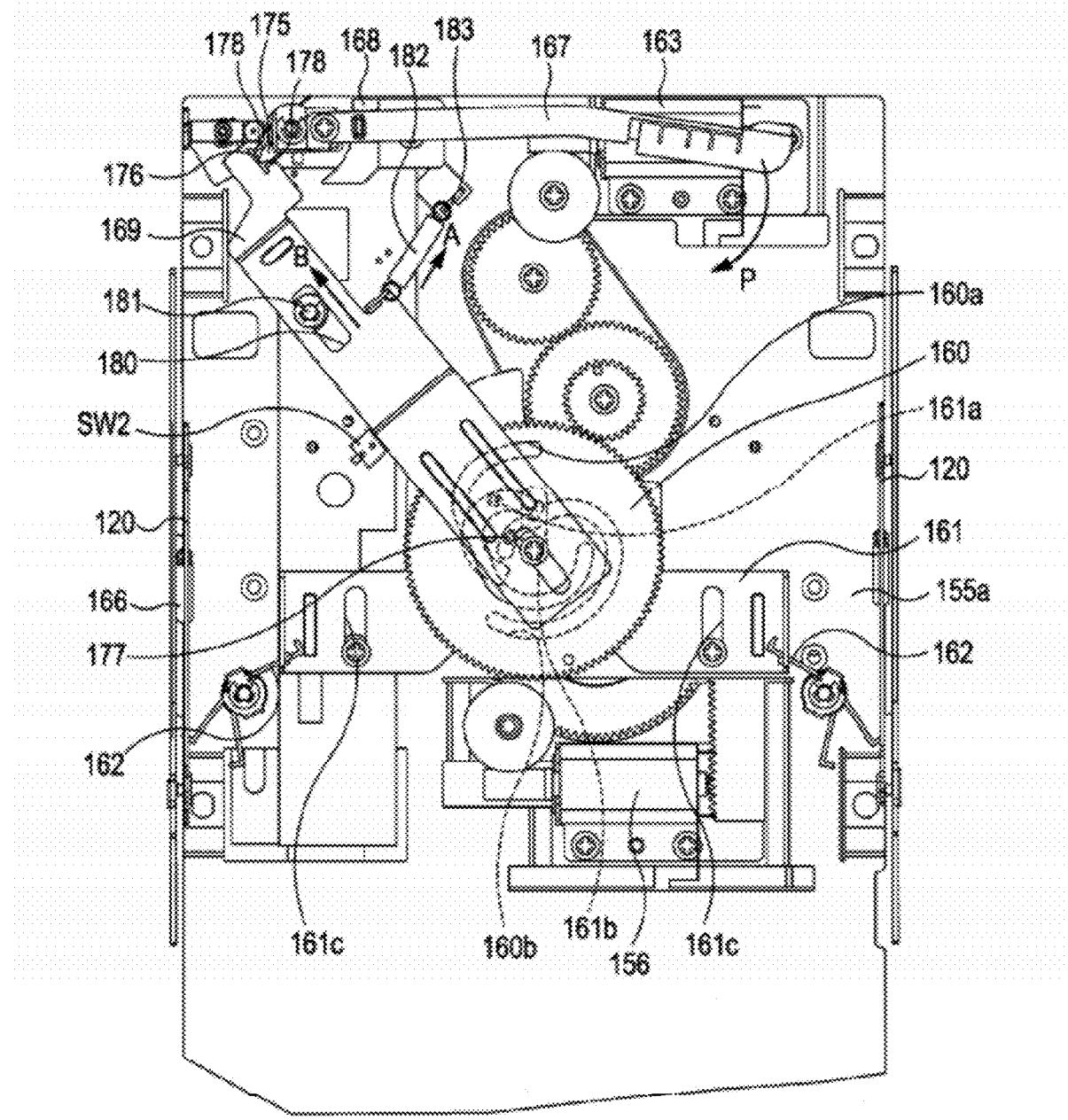
FIG. 24 is a plan view illustrating a driving mechanism.

As shown in FIG. 24, the driving mechanism 83 includes a surface cam gear 160 rotatably supported over the surface 155a of the base plate 155. The surface cam gear 160 is coupled to the second driving motor 163, which is installed on the base plate 155, via a reduction gear. In addition, the surface cam gear 160 is provided with a second cam groove 160a to slide the height adjusting plate 120. The second cam groove 160a is engaged with the cam pin 161a of the adjustment slide plate 161. The adjustment slide plate 161 is provided with straight guide grooves 161b and 161c extending along the forward and backward direction of the apparatus body 60. As a guide shaft vertically arranged at the base plate 155 and a rotational support shaft of the surface cam gear 160 are inserted in the straight guide grooves 161b and 161c, the adjustment slide plate 161 is supported to be slid in the forward and backward direction.

The adjustment spring 162 is locked to the adjustment slide plate 161. The adjustment spring 162 is rotatably supported by the support shaft arranged in a protruding manner at the base plate 155. One end portion of the adjustment spring 162 is locked to the adjustment slide plate 161, and the other end portion is locked to the spring locking hole 120a which is opened in the height adjusting plate 120 (FIG. 20).

The height adjusting plate 120 is provided with an elongated hole 164 extending along the forward and backward direction of the apparatus body 60. In addition, as described above, the holder cover 81 is provided with support convex portions 122 arranged in a protruding manner at the inner surface of the support lateral surface portions 134 and 135, with the support convex portion 122 being inserted in the elongated holes 164 to guide the sliding of the height adjusting plate 120. As the support convex portions 122 are inserted in the elongated holes 164, the height adjusting plate 120 is supported by the support convex portions 122 to be slid in the forward and backward direction of the apparatus body 60. In addition, since the spring 166 extends between the support shaft lateral surface portions 134 and 135 of the holder cover 81, the height adjusting plate 120 is typically slid and biased to the rear surface 60b side of the apparatus body 60.

In the height adjusting plate 120, if the surface cam gear 160 is rotated, the cam pin 161a is slid along the second cam groove 160a, so that the adjustment slide plate 161 is slid to the rear surface 60b side of the apparatus body 60. Consequently, as the other end portion of the adjustment spring 162 pivots to the front surface 60a side, the adjustment spring 162 is able to allow the height adjusting plate 120 to slide along the elongated hole 164 toward the front surface 60a of the apparatus body 60.

Next, the disc push-out mechanism 85 pushing the optical disc 2 to the carry loader 6 side will be described. The disc push-out mechanism 85 is installed at the front surface 60a side of the surface 155a of the base plate 155, and presses the optical disc 2 from the disc extrusion opening 51 of the lower shell 12 which is transported to the disc insertion/ejection position, thereby extracting the optical disc from the disc insertion/ejection opening 50. The disc push-out mechanism 85 includes, as shown in FIGS. 24 and 25, an push-out lever 167 pushing the optical disc 2, a lever support wall 168 supporting the push-out lever 167, a lever slider 169 pivoting the push-out lever 167, and a second driving motor 163 applying a driving force to pivot the push-out lever 167.

As shown in FIG. 25, the push-out lever 167 is formed in the shape of elongated flat plate, and has a thickness to move in the support groove 48 formed at the inner surfaces of the left and right disc holders 41 and 42 to support the optical disc 2. In addition, the front end portion of the push-out lever 167 which is moved in the support groove 48 is fitted with a disc contact member 173 which is made of a resin member softer than the optical disc 2.

The disc contact member 173 presses the outer circumference of the optical disc 2 to eject the optical disc 2 from the disc insertion/ejection opening 50, and the front end portion of the disc contact member 173 is formed in the shape of circular arc, so that the disc contact member 173 is able to come into contact with the optical disc 2 without damaging the optical disc 2.

The push-out lever 167 is pivotally supported on the upper end portion of the lever support shaft 172 having a base end portion protruding toward the front surface 60a of the base plate 155. Consequently, if the lever slider 169 described below is slid, the push-out lever 167 draws a pivot trace around the lever support shaft 172 as a pivot point in the direction of the arrow P in FIG. 25 in which the optical disc 2 is pushed to the disc insertion/ejection opening 50 and in the direction opposite to the arrow P in which the optical disc is returned to the disc extrusion opening 51 side. The pivot trace is identical to that of the guide portion 48c formed at the support groove 48 in the shape of circular arc. Accordingly, if the push-out lever 167 is moved in the support groove 48, the push-out lever pivots along the guide portion 48c, and thus the disc contact member 173 is supported by the guide portion 48c.

The push-out lever 167 is supported by the lever support shaft 172, and thus pivots at the height of the disc insertion/ejection position. In the disc push-out mechanism 85, the lower shell 12 is moved down so that the predetermined optical disc 2 to be ejected to the carry loader 6 side is positioned at the height of the disc insertion/ejection position. Therefore, the predetermined optical disc 2 is able to be pressed by the push-out lever 167. At this time, the disc push-out mechanism 85 determines the height to perform the insertion and ejection of the optical disc 2. The holder lifting mechanism 84 lifts the lower holder 91 to set the accommodating position of the predetermined optical disc 2 to the height at which the optical disc 2 is inserted or ejected by the disc push-out mechanism 85, that is, the disc insertion/ejection position. Therefore, the disc push-out mechanism 85 is able to select the predetermined optical disc 2 to be recorded or reproduced among the plurality of optical discs 2 which are stacked and accommodated, and thus perform the insertion and ejection of the predetermined optical disc 2. Therefore, the configuration is easily implemented in which the select loader 5 is able to simultaneously perform the separation of the cartridge body 10 in order to perform the insertion and the eject of the optical disc 2 and the selection of the predetermined optical disc 2 among the plurality of optical discs 2.

Figures 26A, 26B:
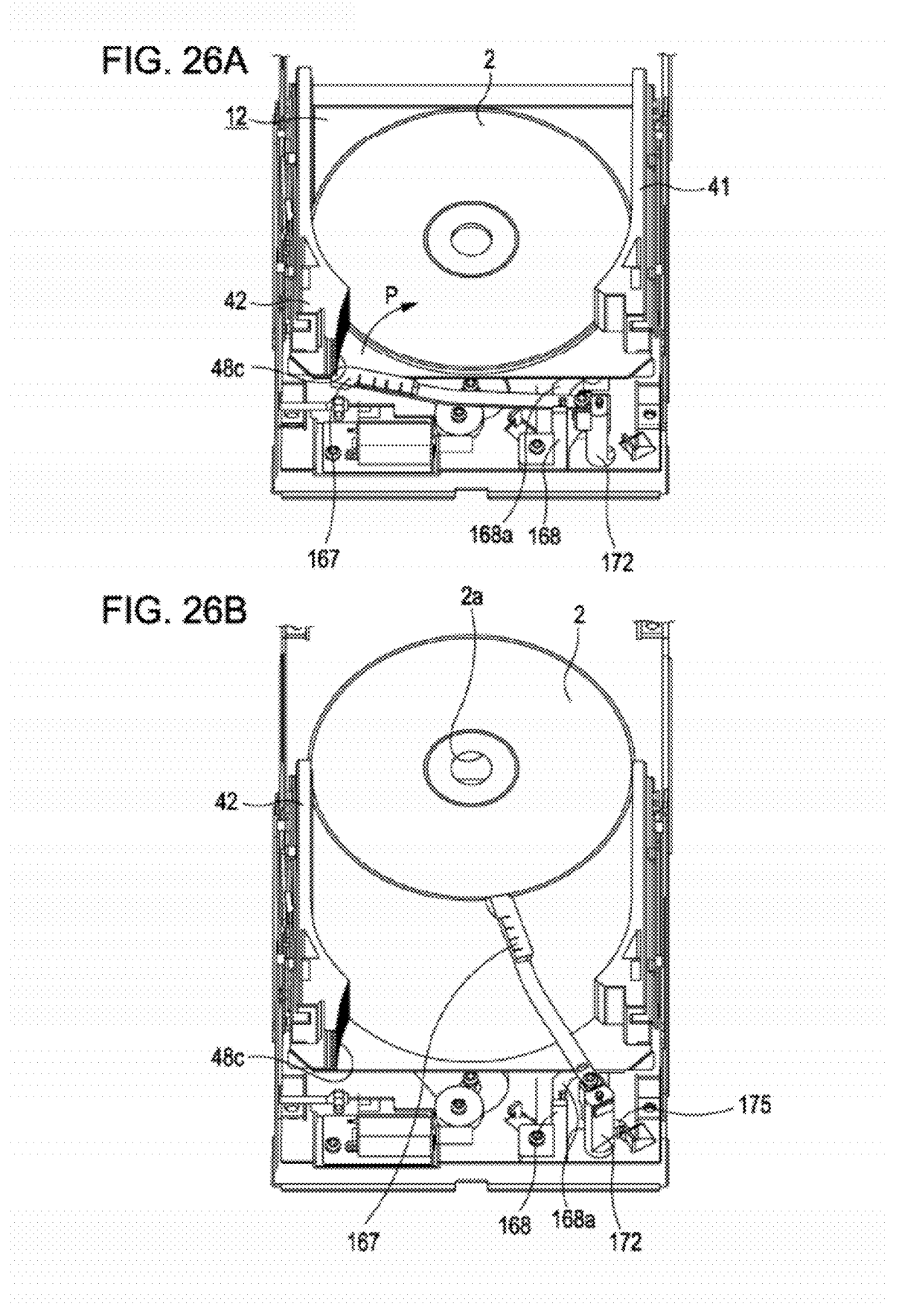

The push-out lever 167 pivots to the front surface 60a side of the apparatus body 60 further than the guide portion 48c to eject the optical disc 2 accommodated in the accommodating position from the disc insertion/ejection opening 50. At this time, as shown in FIG. 26A, since the push-out lever 167 is moved in advance in the guide portion 48c of the support groove 48 supporting the predetermined optical disc 2, the push-out lever 167 is able to push out the predetermined optical disc 2 supported in the corresponding support groove 48.

Figure 30:
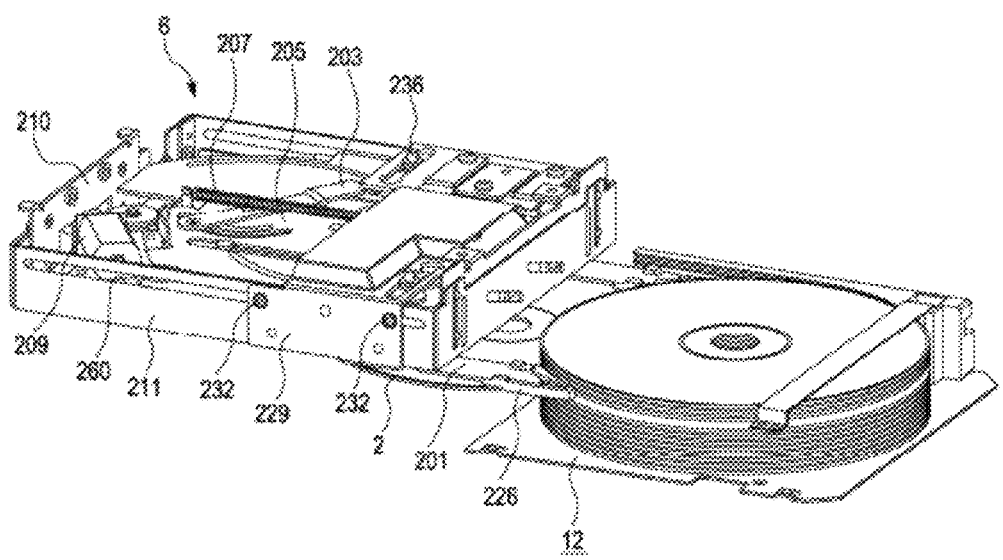
FIG. 30 is a perspective view illustrating a carry loader retracting an optical disc.

The push-out lever 167 pushes the optical disc 2 to be transported to the position at which at least the center hole 2a of the optical disc 2 is ejected from the disc insertion/ejection opening 50. Accordingly, the disc push-out mechanism 85 is able to eject the optical disc 2 to the position at which a loading arm 201, which will be described below, of the carry loader 6 is able to hold a rear end side of the optical disc 2 in the eject direction rather than the center hole 2a (FIG. 30).

The push-out lever 167 is supported by the lever support wall 168 over the whole pivot region. As shown in FIG. 26B, when the push-out lever 167 pivots before the guide portion 48c of the support groove 48, the front end portion is deviated from the support groove 48. For this reason, the lever support wall 168 prevents the elongated push-out lever 167 from being detached from the predetermined optical disc 2 to be ejected or from colliding against the other optical discs 2 due to the wobble of the push-out lever 167.

The lever support wall 168 is provided with a support surface 168a which is located adjacent to the lever support shaft 172 supporting the push-out lever 167 and formed in the shape of circular arc along the pivot trace of the base end side of the push-out lever 167. In addition, the support surface 168a of the lever support wall 168 is formed at the height in which the push-out lever 167 is supported by the lever support shaft 172. The lever support wall 168 is installed at the base end side of the push-out lever 167, so that the lever support wall is able to be supported over the whole pivot region of the push-out lever 167.

The lever slider 169 is slid by the driving mechanism 83 to pivot the push-out lever 167, and as shown in FIG. 24, is formed in the shape of substantially rectangular plate. The lever slider 169 is provided with an operation concave portion 176, which is engaged with the pivot operation piece 175 installed at the push-out lever 167, at one end portion thereof in the longitudinal direction. A cam pin 177 engaging with the third cam groove 160b formed at the surface cam gear 160 is arranged in a protruding manner at the other end portion in the longitudinal direction.

The operation concave portion 176 is provided with a pair of contact surfaces 178 and 178 which are spaced apart from each other along the longitudinal direction of the lever slider 169, and the pivot operation piece 175 of the push-out lever 167 is engaged between the contact surfaces 178 and 178. If the lever slider 169 is slid in the direction of the arrow B or in the direction opposite to the arrow B in FIG. 24 which is the longitudinal direction, the operation concave portion 176 presses the pivot operation piece 175 by the one contact surface 178 or the other contact surface 178 to pivot the push-out lever 167 in the direction of pushing out the optical disc 2 or in the direction of returning the optical disc to the initial position.

The lever slider 169 is provided with an elongated hole 180 having a slightly wide width along the longitudinal direction, and the guide shaft 181 vertically arranged at the base plate 155 is inserted in the elongated hole 180 to guide the movement in the longitudinal direction. In addition, the lever slider 169 is locked to one end portion of the tension spring 182, so that the lever slider is typically is biased in the direction of the arrow A in FIGS. 24 and 27 in which the pivot operation piece 175 is locked to the operation concave portion 176. One end portion of the tension spring 182 is locked to the lever slider 169, and the other end portion is locked to the spring locking piece 183 arranged in a protruding manner at the base plate 155.

As the cam pin 177 is slid in the third cam groove 160b of the surface cam gear 160, the lever slider 169 is slid in the direction of the arrow B in FIG. 24 which is the longitudinal direction. The lever slider 169 is slid in the direction of the arrow B, and thus the lever slider 169 presses the pivot operation piece 175 of the push-out lever 167 in the same direction by the contact surface 178 of the operation concave portion 176 to pivot the push-out lever 167 in the direction of the arrow P. At this time, since the lever slider 169 is pulled in the direction of the arrow A by the tension spring 182, the pivot operation piece 175 is engaged between the contact surfaces 178 and 178 of the operation concave portion 176 to reliably pivot the push-out lever 167.

In addition, if the optical disc 2 is ejected to the carry loader 6 side, the surface cam gear 160 is reversely rotated, and thus the lever slider 169 is slid in the direction opposite to the arrow B. Consequently, the lever slider 169 presses the pivot operation piece 175 in the same direction to pivot the push-out lever 167 in the direction opposite to the arrow P.

Figure 27:
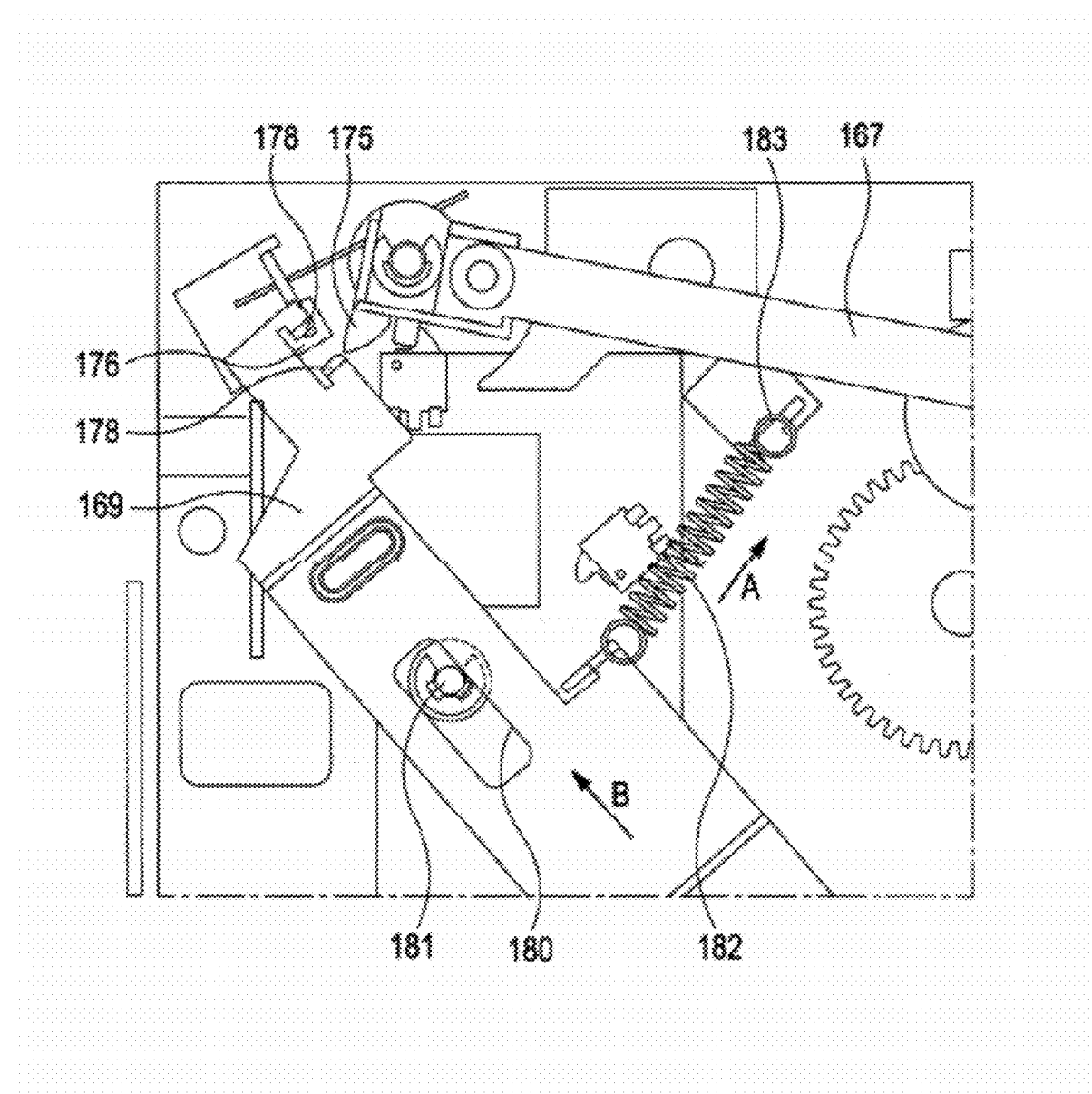
FIG. 27 is a plan view illustrating the state in which engagement of a lever slider and a rotation operation piece is released.

As shown in FIG. 27, if the pivot of the push-out lever 167 in the direction of the arrow P is restricted, for example, in the case where the carry loader 6 is already inserted in the optical disc 2 or the push-out lever 167 is wobbled so that the front end portion comes into contact with the cross section between the support grooves 48, the disc push-out mechanism 85 releases the engagement of the lever slider 169 and the pivot operation piece 175.

That is, the lever slider 169 is provided with an elongated hole 180 having a slightly wide width in the widthwise direction perpendicular to the slide direction. For this reason, if the pivot of the push-out lever 167 in the direction of the arrow P is restricted and the pivot operation piece 175 is fixed, the lever slider 169 is moved in the direction opposite to the arrow A against the biasing force of the tension spring 182, so that the engagement of the operation concave portion 176 and the pivot operation piece 175 is released. Consequently, the lever slider 169 is able to be slid in the direction of the arrow B according to the pivot of the surface cam gear 160, thereby preventing an excess load from being applied to the driving mechanism 83, the push-out lever 167 or the optical disc 2.

In the disc push-out mechanism 85, after the lapse of predetermined time, the surface cam gear 160 is reversely rotated, and the lever slider 169 is slid in the direction opposite to the arrow B. In this instance, since the lever slider 169 is biased in the direction of the arrow A by the tension spring 182, the operation concave portion 176 is engaged with the pivot operation piece 175.

The configuration for avoiding the interference between the bezel 71 installed at the front panel 63, and the upper shell separating piece 103 and the lower shell separating piece 115 installed at the cartridge holder 80 will now be described. As described above, the bezel 71 closing the cartridge insertion/removal opening 70 has a center bezel 74 opening and closing substantially the whole surface of the cartridge insertion/removal opening 70 except for both sides thereof in the longitudinal direction, and a pair of side bezels 75 and 75 opening and closing both sides of the cartridge insertion/removal opening 70 in the longitudinal direction. In addition, the cartridge holder 80 is slid at the cartridge insertion/removal position, and the upper shell separating piece 103 protrudes toward the inner surface sides of the upper lateral surface portions 94 and 94 of the upper holder 90.

In the case where the bezel 71 is configured to close the cartridge insertion/removal opening 70 only by the center bezel 74, since the center bezel 74 draws the pivot trace along the upper edge of the cartridge insertion/removal opening 70 towards the rear surface 60b side, it is necessary to move back other obstacles, such as the upper shell separating piece 103, from the pivot region of the center bezel 74 at both sides thereof in the longitudinal direction.

As the upper shell separating piece 103 is moved to the rear surface 60b side, it is necessary to form the upper shell separating piece 103 at the rear surface 60b side of the apparatus body 60 in order to avoid the interference of the center bezel 74. However, when the cartridge body 10 is mounted on the cartridge holder 80, the upper shell separating piece 103 presses the rear-side lock piece 33, which is installed at the rear surface 10d of the cartridge body 10, in the direction opposite to the arrow S which is opposite to the insertion direction.

Accordingly, if the cartridge body 10 is not deeply inserted in the rear surface 60b side of the apparatus body 60 as the upper shell separating piece 103 is formed at the rear surface 60b side of the apparatus body 60, it is not able to release the locking of the rear-side lock piece 33. For this reason, since it is necessary for a hand of a user to move deeply into the apparatus body 60 in the case where the hand of the user is inserted in the cartridge body 10, the risk of contacting the mechanisms in the apparatus body 60 with the hand is increased, as well as the convenience of use being deteriorated. In addition, in the case where a mechanism for automatically retracting the cartridge body 10 is built in, since the transport distance of the cartridge body 10 is extended, the size of the apparatus body 60 in the depth direction is also extended, thereby deteriorating the space-saving performance of the apparatus body 60.

Accordingly, in the Disc changer apparatus 3, the bezel 71 has the center bezel 74 opening and closing substantially the whole surface of the cartridge insertion/removal opening 70 except for both sides thereof in the longitudinal direction, and the pair of side bezels 75 and 75 opening and closing both sides of the cartridge insertion/removal opening 70 in the longitudinal direction. Therefore, since the length of the center bezel 74 in the longitudinal direction is extended to the region which does not interfere with the upper shell separating piece 103, the bezel 71 is able to avoid the interference of the upper shell separating piece 103.

Figure 28:
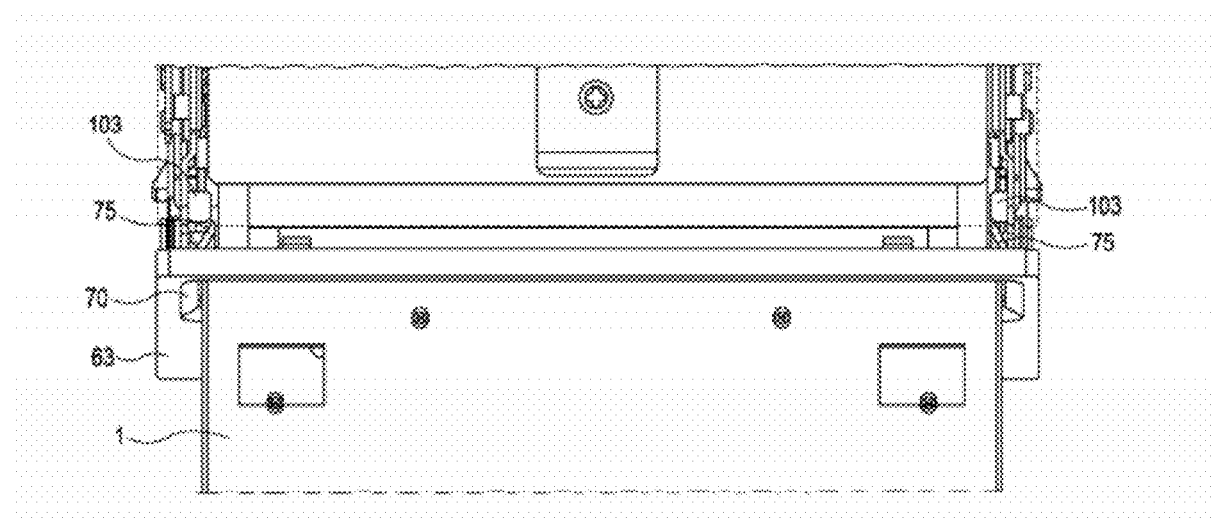
FIG. 28 is a perspective view illustrating a position relation between a side bezel and an upper shell separation piece.

Both sides of the cartridge insertion/removal opening 70 in the longitudinal direction which is not covered by the center bezel 74 are covered by the side bezels 75 and 75. As shown in FIG. 28, since the pivot region of the side bezels 75 and 75 in the insertion direction of the cartridge body 10 is shorter than that of the center bezel 74, it is possible to install the upper shell separating piece 103 as close toward the front surface 60a side as possible.

Consequently, the insertion depth of the cartridge body 10 necessary for releasing the locking of the lock mechanism 30 is shortened while avoiding the interference of the upper shell separating piece 103 and the bezel 71, so that the Disc changer apparatus 3 is able to improve the using convenience for the users and miniaturize the apparatus body 60.

2-3 Carry Loader

Next, the carry loader 6 will be described. The carry loader 6 retracts the optical disc 2 to be ejected from the select loader 5 to transport the optical disc 2 to the recording/reproducing device 7, and pushes back the optical disc 2 ejected from the recording/reproducing device 7 to the inside of the lower shell 12 of the select loader 5. The carry loader 6 is installed adjacent to the select loader 5 at the rear surface 60b side of the apparatus body 60, as shown in FIGS. 2 and 3.

The carry loader 6 is installed in the housing 200 serving as the external case together with the recording/reproducing device 7. The housing 200 is fixed and screwed to the extension support pieces 154 and 154 formed at the holder cover 81 of the select loader 5.

Figure 29:
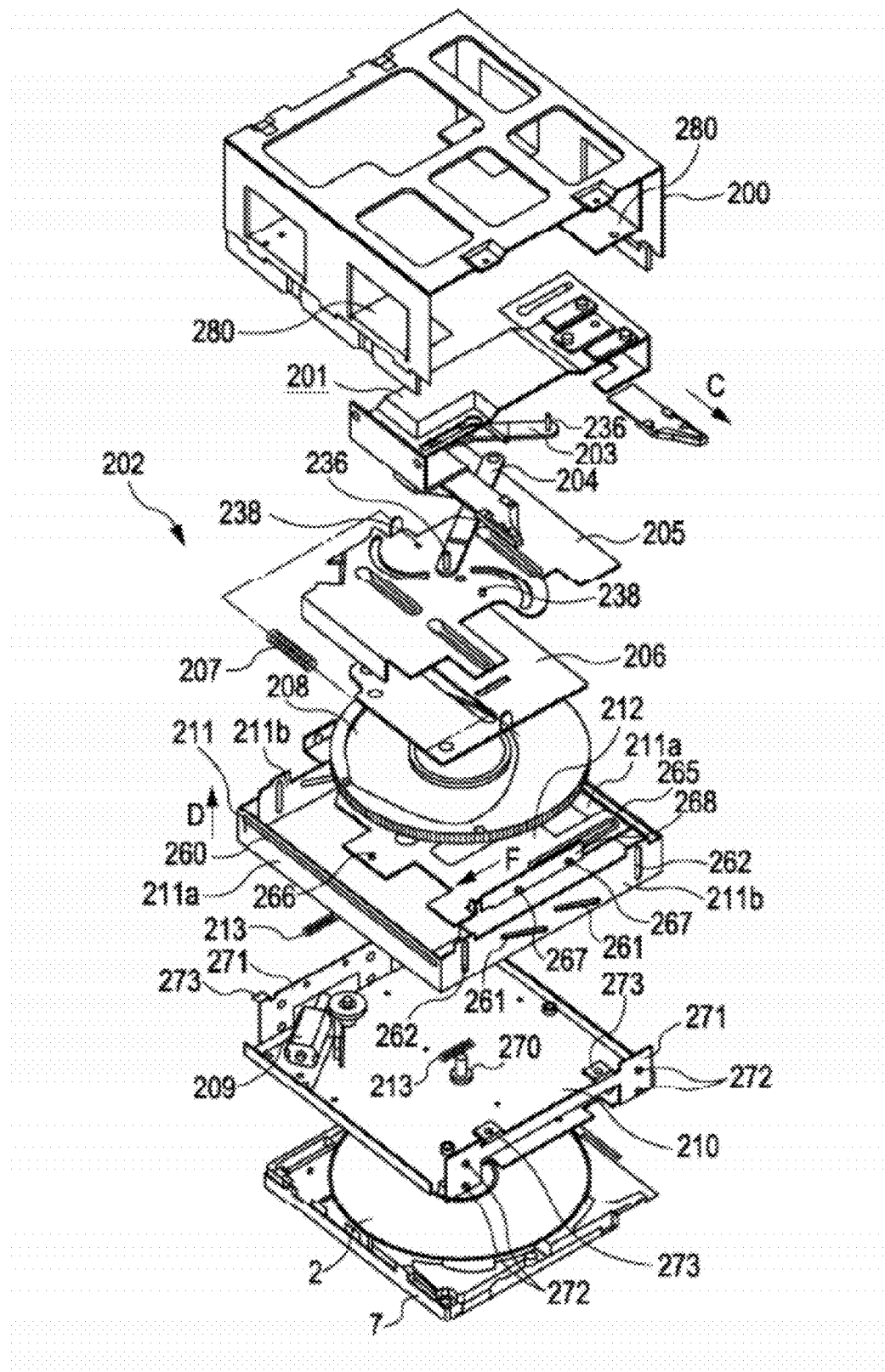
FIG. 29 is an exploded perspective view illustrating a carry loader.

As shown in FIG. 29, the carry loader 6 includes a loading arm 201 which comes into contact with the outer circumference of the optical disc 2 to retract the optical disc 2 to the inside of the carry loader 6 and push back the optical disc 2 to the inside of the lower shell, and an arm driving mechanism 202 which drives the loading arm 201 in the transport direction of the optical disc 2.

The arm driving mechanism 202 includes a pair of slide arms 203 and 204 which slide the loading arm 201, a slide deck 205 which pivotally supports the slide arms 203 and 204, a slide plate 206 which is slidably supported by the slide deck 205 and is engaged with the slide arms 203 and 204 via the slide deck 205, a slide biasing spring 207 which is extended between the slide deck 205 and the slide plate 206 to bias the slide plate 206 against the slide deck 205, a cam gear 208 which slides the slide plate 206 with respect to the slide deck 205 against the biasing force of the slide biasing spring 207, with the cam gear 208 being provided with a slide cam groove 252 engaged with the slide cam pin 250 arranged in a protruding manner at the slide plate 206, and a base deck 210 which rotatably supports the cam gear 208 and is provided with a driving motor 209 for driving the cam gear 208.

In addition, the arm driving mechanism 202 includes a lifting deck 211 which is connected to the loading arm 201 and lifts the loading arm 201, a lifting plate 212 which is slidably engaged with the lifting cam hole 261 formed at the lifting deck 211 and slidably supported on the base deck 210, and a lifting biasing spring 213 which is extended between the lifting plate 212 and the base deck 210 to bias the lifting plate 212 against the cam gear 208.

Figure 31:
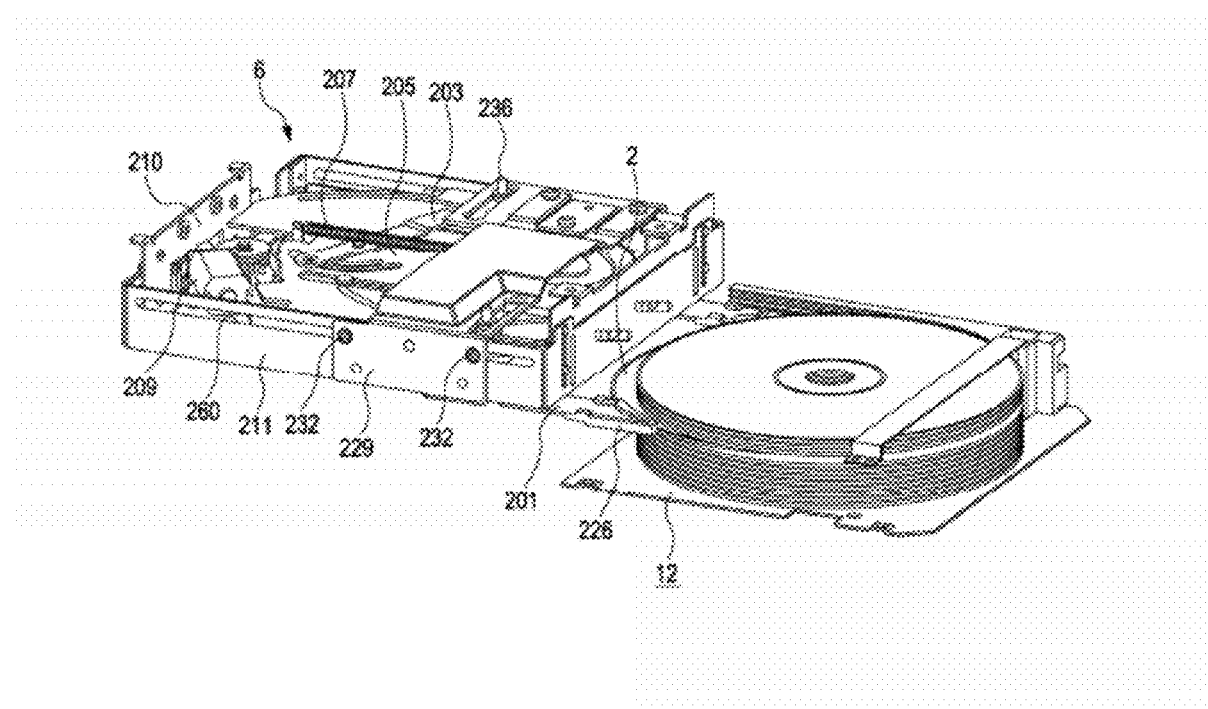
FIG. 31 is a perspective view illustrating an appearance of a carry loader which inserts an optical disc into a lower shell.

The carry loader 6 drives the loading arm 201 by the arm driving mechanism 202, as shown in FIG. 30, to retract the predetermined optical disc 2 pushed out from the lower shell 12 by the select loader 5. In addition, the carry loader 6 pushes back the optical disc 2, in which the information signals are recorded and/or reproduced by the recording/reproducing device 7, to the inside of the lower shell 12, as shown in FIG. 31.

The loading arm 201 is formed by connecting the left and right arm plates 220 and 221 which are engaged with the slide arms 203 and 204, as shown in FIG. 32. The left and right arm plates 220 and 221 are provided with screw holes 222 which are screwed to each other, and an engaging groove 223 with which the slide arm 203 or 204 is engaged. The engaging groove 223 is formed in the direction perpendicular to the direction of the arrow C in FIG. 32 which corresponds to the slide direction of the loading arm 201.

In addition, the left and right arm plates 220 and 221 are provided with arm portions 224 which are provided with a locking claw 226 coming into contact with the outer circumference of the optical disc 2. The arm portion 224 extends in the slide direction of the loading arm 201, and the locking claw 226 is attached to the front end portion of the arm portion 224.

Figure 33A:
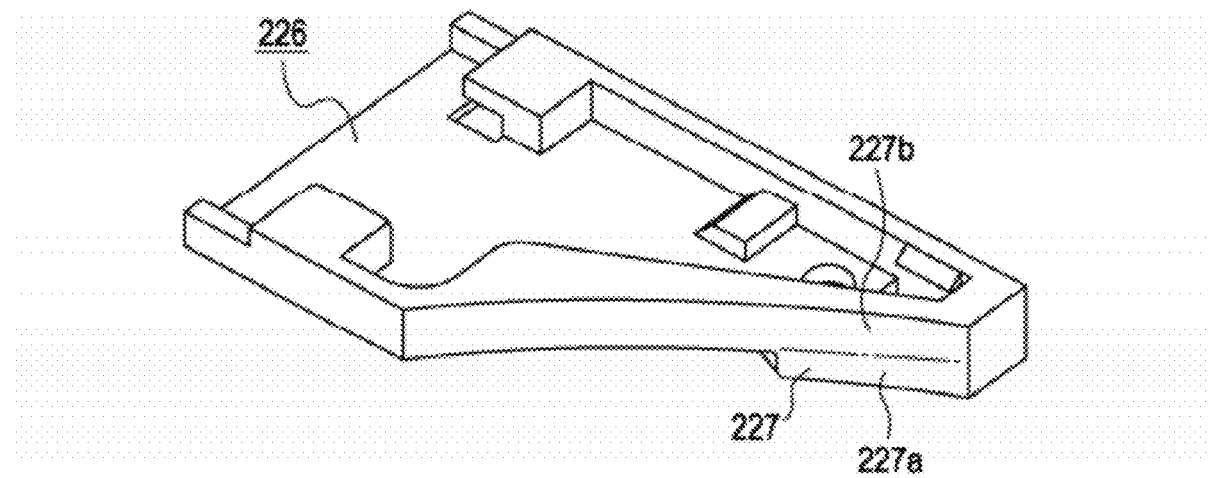
FIG. 33 is a perspective view illustrating a locking claw.
Figure 33B:
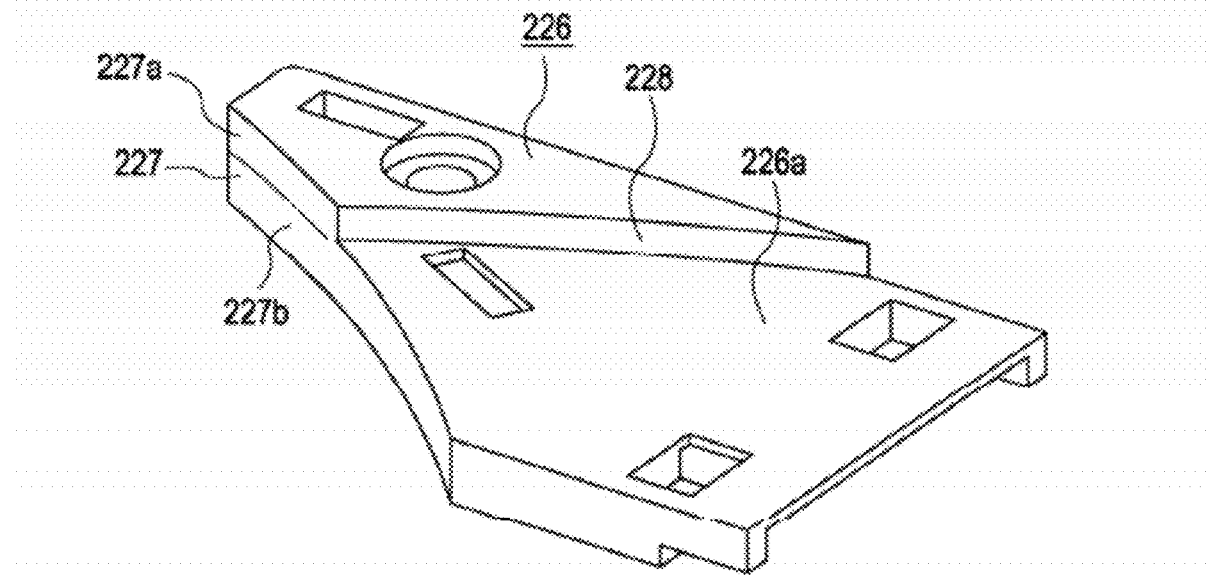

The locking claws 226 are made of resin material capable of coming contact with the optical disc 2 without damaging the optical disc 2, and are attached to the arm portions 224 of the left and right arm plates 220 and 221 so that the locking claws are slidably supported in parallel with each other. Each of the engaging claws 226 is provided with an insertion surface portion 227 which presses the optical disc 2 to insert it into the lower shell 12, and a retraction surface portion 228 retracting the optical disc 2 to the carry loader 6, at the inner side thereof opposite to the outer circumference of the optical disc 2, as shown in FIGS. 33A and 33B.

The insertion surface portion 227 is installed at the front end side of the locking claw 226, and is formed in the form of circular arc having substantially the same curvature as the outer circumference of the optical disc 2, so that the insertion surface portion 227 is able to come into surface-contact with the outer circumference of the optical disc 2. In addition, the front end portion of the insertion surface portion 227 is formed to have a thickness thicker than that of the optical disc 2. The insertion surface portion 227 has a lower region serving as a pressing portion 227a which presses the predetermined optical disc 2 to be inserted or ejected from the lower shell 12, and an upper region serving as a restriction portion 227b which presses other optical disc 2 adjacent to the predetermined optical disc 2 to restrict the accommodating position.

The retraction surface portion 228 is installed at the base end side of the locking claw 226 rather than the insertion surface portion 227, and is formed at the lower surface 226a side of the locking claw 226 which faces the upper surface serving as the non-signal recording surface of the optical disc 2. The retraction surface portion 228 is formed in the form of circular arc having substantially the same curvature as the outer circumference of the optical disc 2, so that the retraction surface portion is able to surface-contact with the outer circumference of the optical disc 2.

In the loading arm 201, if the locking claws 226 are attached to the left and right arm plates 220 and 221, the insertion surface portions 227 face each other, and the retraction surface portions 228 face each other. The loading arm 201 presses uniformly in left and right directions the rear end side of the optical disc 2 in the insertion direction by the pair of insertion surface portions 227 to insert the optical disc 2 in the lower shell 12 (FIG. 31). In addition, the loading arm 201 presses uniformly in left and right directions the rear end side of the optical disc in the retraction direction by the pair of retraction surface portions 228 to retract the optical disc 2 in the carry loader 6 (FIG. 30).

Since screws 232 are inserted in the lateral walls 229 and 230 of the left and right arm plates 220 and 221, and then are inserted in the slide guide hole 260 formed in the lifting deck 211 described below, the loading arm 201 is supported to be slid in the direction of the arrow C and the direction opposite to the arrow C in FIG. 29 with respect to the lifting deck 211. As the lifting deck 211 is lifted, the loading arm 201 is able to be lifted in the direction of the arrow D in FIG. 29 which corresponds to the height direction perpendicular to an in-plane direction of the optical disc 2.

Next, the arm driving mechanism 202 driving the loading arm 201 will be described. The arm driving mechanism 202 slides the loading arm 201 in the transport direction of the optical disc 2, that is, in the forward and backward direction of the apparatus body 60, and lifts the loading arm 201 in the upward and downward direction of the apparatus body 60.

Figure 34:
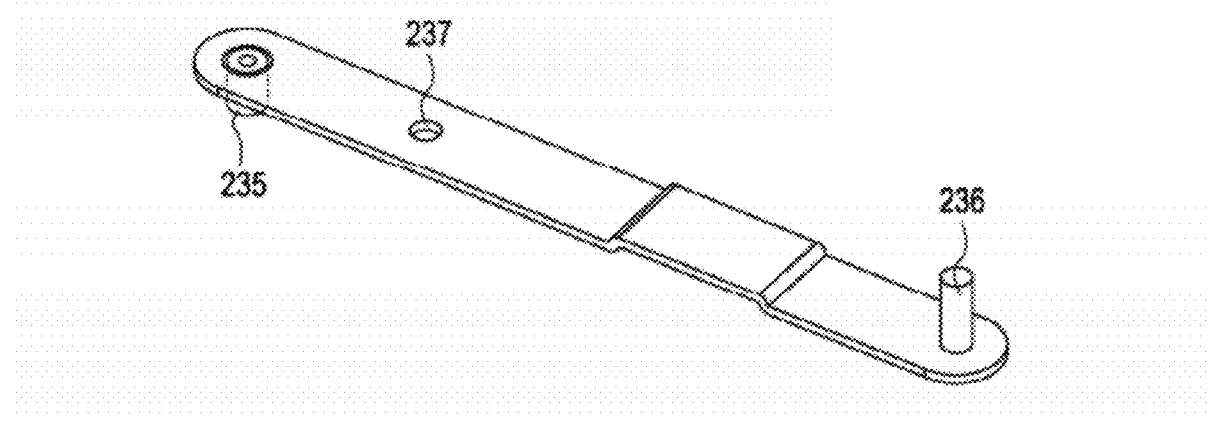
FIG. 34 is a perspective view illustrating an appearance of a slide arm.

The slide arms 203 and 204 engaged with the left and right arm plates 220 and 221 of the loading arm 201 are made of flat and elongated metal plates, as shown in FIG. 34, and are provided with a guide pin 235 in a protruding manner, which guides the slide deck 205, at one end in the longitudinal direction. In addition, the other end portion of the respective slide arms 203 and 204 in the longitudinal direction is provided with a slide pin 236 in a protruding manner which is inserted in the engaging groove 223 formed at the left and right arm plates 220 and 221. The slide arms 203 and 204 are provided with a through-hole 237 at substantially the center in the longitudinal direction, through which the rotation shaft 238 arranged in a protruding manner at the slide deck 205 is inserted and supported.

The guide pin 235 of the slide arms 203 and 204 is engaged with the slide plate 206 via the slide deck 205, and as the slide plate 206 is slid in the forward and backward direction, the slide pin 236 pivots around the rotation shaft 238 as a pivot point. Therefore, the slide pin 236 is slid along the engaging groove 223 of the left and right arm plates 220 and 221, and thus the slide arms 203 and 204 slide the left and right arm plates 220 and 221 in an integrated manner in the direction of the arrow C and the direction opposite to the arrow C.

Figure 35:
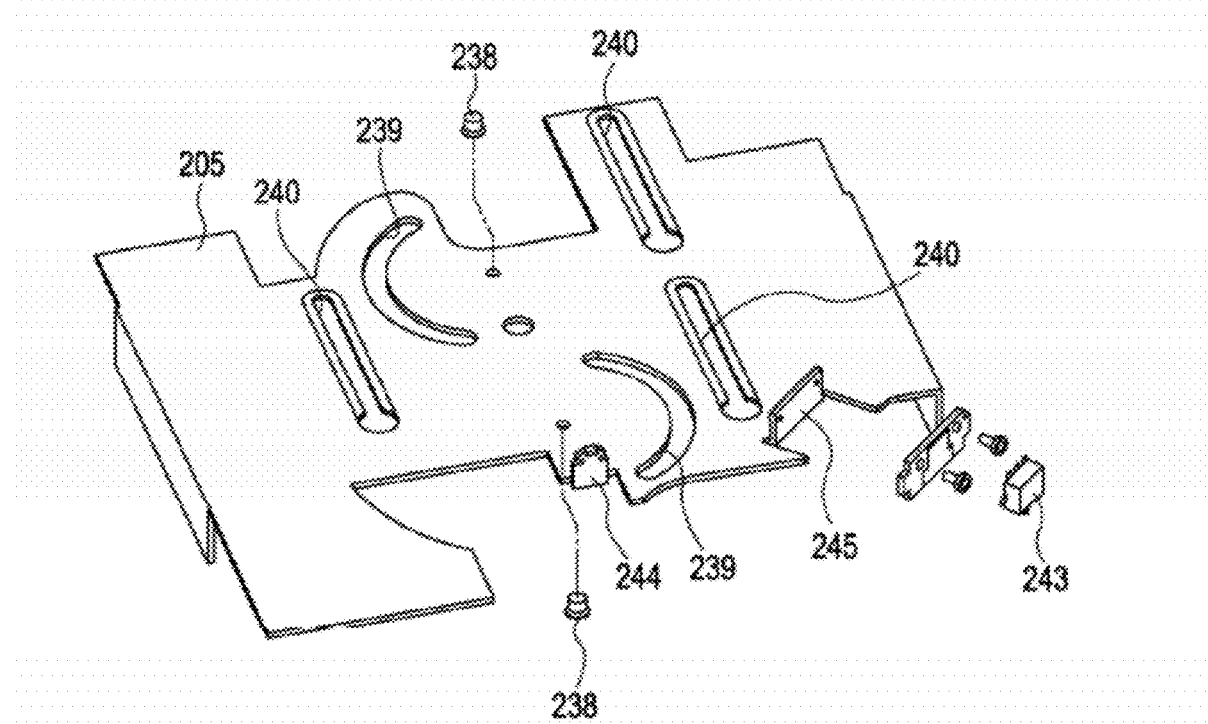
FIG. 35 is an exploded perspective view illustrating a slide deck.

The slide deck 205 supports the slide arms 203 and 204 and the slide plate 206, and is fixed to the base deck 210 described below. As shown in FIG. 35, the slide deck 205 includes a rotation shaft 238 inserted in the through-hole 237 of the respective slide arms 203 and 204, a guide hole 239 through which the guide pin 235 arranged in a protruding manner at the respective slide arms 203 and 204 in inserted, and a straight guide groove 240 guiding the straight movement of the slide plate 206.

The rotation shaft 238 is arranged in a protruding manner at the main surface of the slide deck 205 by attaching the rotation shaft to the shaft hole opened in the main surface of the slide deck from the rear surface. The rotation shaft 238 is inserted in each of the through-holes 237 of the slide arms 203 and 204 to rotatably support the slide arms 203 and 204. The guide holes 239 are formed in the shape of circular arc along the pivot trace of the guide pins 235 of the slide arms 203 and 204. In addition, each of the guide pins 235 of the slide arms 203 and 204 is arranged downward in a protruding manner through the guide hole 239, and thus are engaged with the engaging hole 247 of the slide plate 206.

Figure 36A:
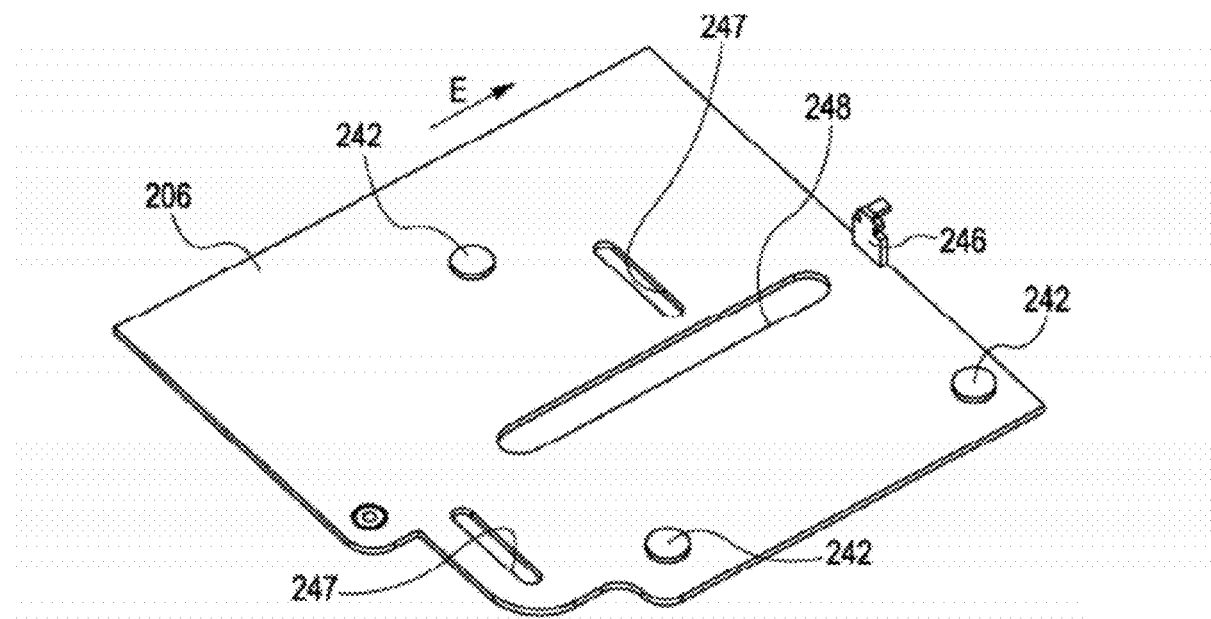
FIGS. 36A and 36B are perspective views illustrating an appearance of a slide plate.

The straight guide groove 240 guides the movement of slide plate 206, and is formed in the forward and backward direction of the apparatus body 60. As shown in FIG. 36A, since the slide plate 206 is attached with the screw 242 inserted in the straight guide groove 240, the slide plate 206 is supported by the slide deck 205, and is slidable along the straight guide groove 240.

The slide deck 205 is provided with a spring locking piece 244 adjacent to the side edge of the rear surface 60b side of the apparatus body 60, and one end portion of the slide biasing spring 207 extended between the slide plate 206 and the spring locking piece 244 is locked to the spring locking piece 244. In addition, the slide deck 205 is provided with a switch attaching piece 245 to which a gear switch 243 for detecting a pivot position of the cam gear 208 is attached.

The slide plate 206 is slid by the pivot of the cam gear 208, so that the slide arms 203 and 204 pivot. As shown in FIG. 36A, the slide plate 206 has a screw 242 which is inserted in the straight guide groove 240, and a spring hanging piece 246, to which the other end of the slide biasing spring 207 is locked, on the main surface of the slide deck 205 side. Since the screw 242 is inserted in the straight guide groove 240, the slide plate 206 is supported to be slid in the direction of the arrow E and the direction opposite to the arrow E in FIG. 36A which are the forward and backward direction of the slide deck 205, and is biased by the slid biasing spring 207 in the direction opposite to the arrow E with respect to the slide deck 205 which corresponds to the rear surface 60b side of the apparatus body 60.

The slide plate 206 is provided with an engaging hole 247, to which the guide pin 235 arranged in a protruding manner at the slide arms 203 and 204 through the guide hole 239 of the slide deck 205 is engaged, and a shaft through-hole 248 through which the gear support shaft 270, which is arranged in a protruding manner at the base deck 210 to rotatably support the cam gear 208 is inserted.

Two engaging holes 247 are formed along the slide arms 203 and 204, and are formed in the shape of elongated hole. As the guide pin 235 is inserted in the engaging hole 247, the slide plate 206 is straightly moved along the straight guide groove 240 to pivot the slide arms 203 and 204, and thus the left and right arm plates 220 and 221 of the loading arm 201 are slid in the direction of the arrow C and the direction opposite to the arrow C.

Figure 36B:
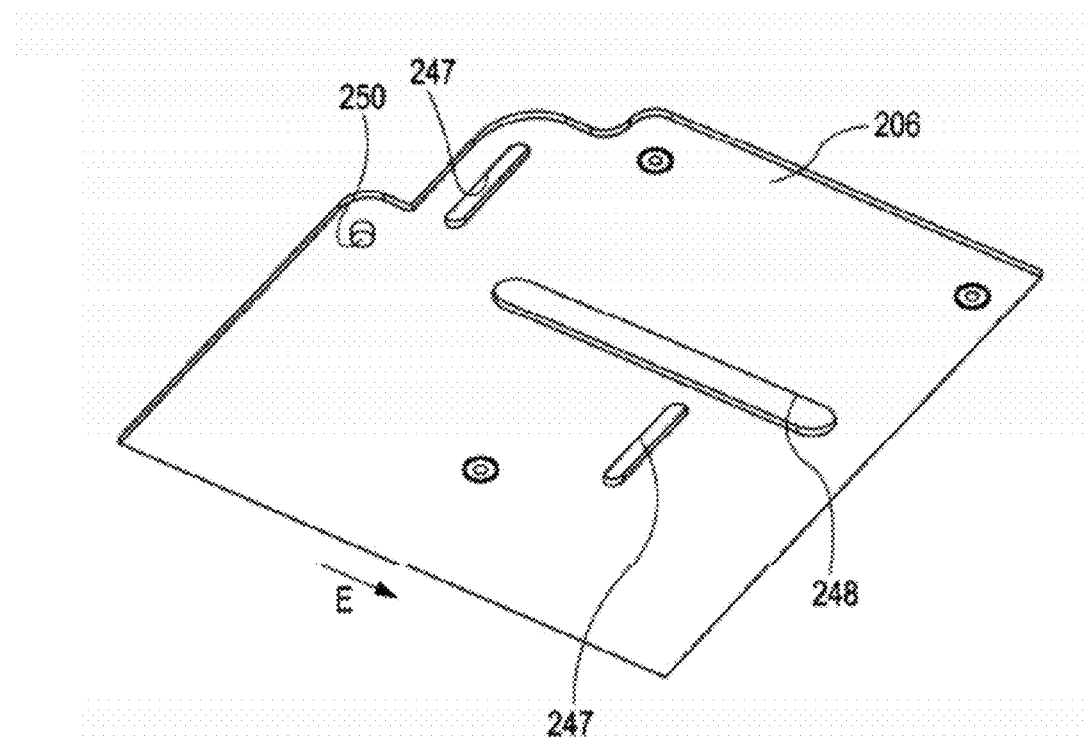

As shown in FIG. 36B, the slide plate 206 is provided with a slide cam pin 250 which is engaged with the slide cam groove 252 formed at the cam gear 208, at the main surface thereof facing the cam gear 208. As the slide plate 206 is biased in the direction opposite to the arrow E, which corresponds to the rear surface 60b side of the apparatus body 60, by the slide biasing spring 207, the slide cam pin 250 is slid along the slide cam groove 252 of the cam gear 208, and is slid along the straight guide groove 240 according to the rotation of the cam gear 208.

Figure 37A:
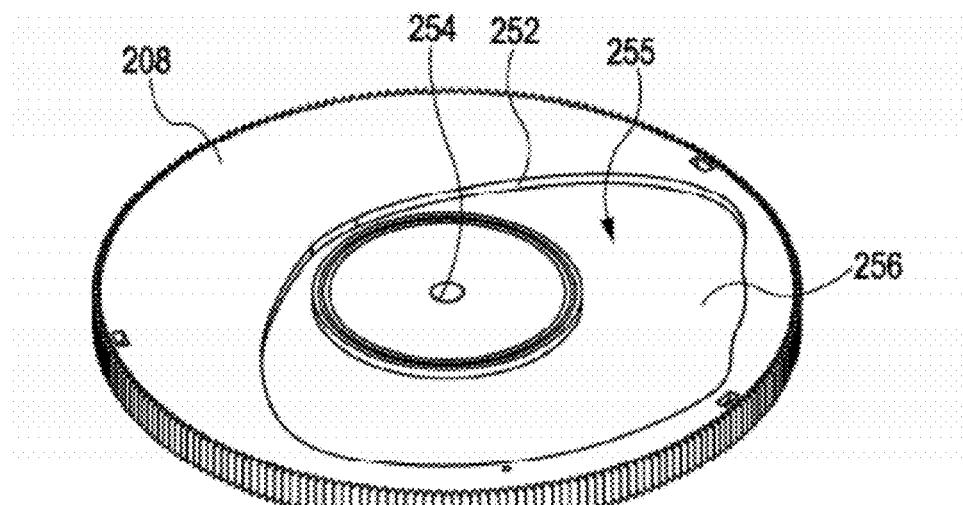
FIGS. 37A and 37B are perspective views illustrating an appearance of a cam gear.
Figure 37B:
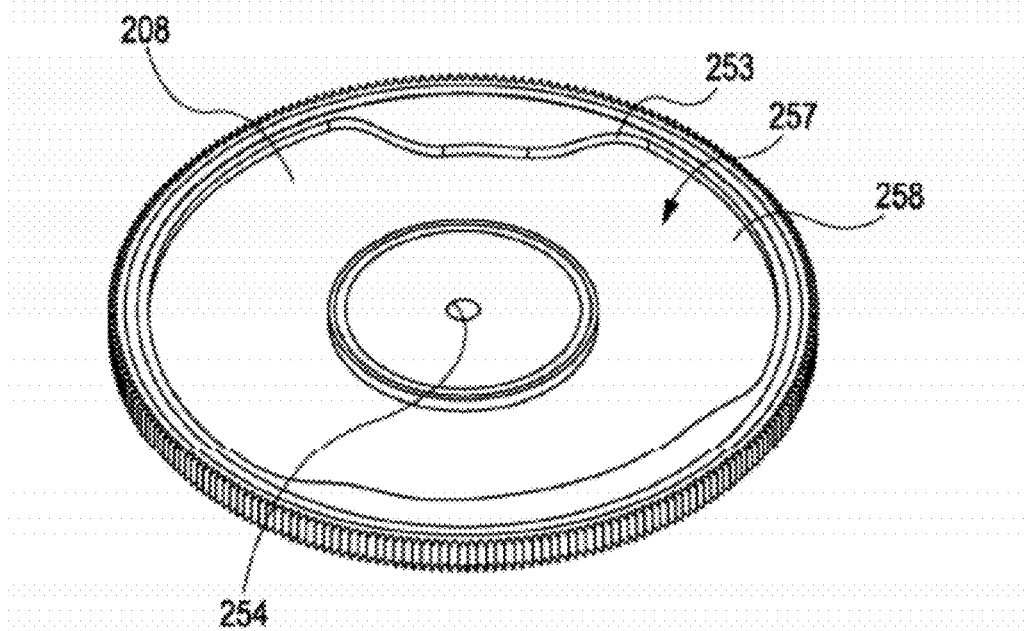

The cam gear 208 slides the slide plate 206 and the lifting plate 212 described below, and as shown in FIGS. 37A and 37B, is provided with a slide cam groove 252 at one main surface, along which the slide plate 206 is slide, and a lifting cam groove 253 at the other main surface, along which the lifting plate 212 is slid.

The cam gear 208 is provided with a support shaft through-hole 254 through which the gear support shaft 270 arranged in a protruding manner at the base deck 210 at the center thereof is inserted, and is rotatably supported by the gear support shaft 270. In addition, the cam gear 208 is coupled to the driving motor 209, which is attached to the base deck 210, via a reduction gear.

As the slide plate 206 is biased to the rear surface 60b side of the apparatus body 60 by the slide biasing spring 207, the slide cam pin 250 is typically slid along the lateral surface of the outer circumference side of the slide cam groove 252 which is formed at the one main surface of the cam gear 208. Consequently, as the cam gear 208 is rotated, the slide cam groove 252 slides the slide plate 206 along the straight guide hole 240 via the slide cam pin 250.

The slide cam groove 252 is provided with a slide limiter mechanism 255 which interferes with the sliding of the loading arm 201 which is slid in the direction of the arrow C to insert the optical disc 2 in the lower shell 12. When the load is applied to the slide arms 203 and 204 and the slide plate 206 in the direction opposite to the slide direction, the load is escaped from the slide limiter mechanism 255.

The slide limiter mechanism 255 is formed by installing a retreat space 256 at the slide cam groove 252 from the lateral surface of the outer circumference side, on which the slide cam pin 250 is slid, to the support shaft through-hole 254 side. The slide limiter mechanism 255 will be described in detail later.

In addition, as described below, in the lifting cam groove 253 formed at the other main surface of the cam gear 208, as the lifting plate 212 is biased to the left lateral surface 60d side of the apparatus body 60 by the lifting biasing spring 213, the lifting cam pin 266 typically slides along the lateral surface of the outer circumference side. Consequently, the lifting cam groove 253 slides the lifting plate 212 via the lifting cam pin 266 according to the rotation of the cam gear 208. At this time, the lifting cam groove 253 is provided with a lifting limiter mechanism 257 which restricts the lowering motion of the loading arm 201, and, when the load is applied to the lifting deck 211 and the lifting plate 212 in the direction opposite to the lowering direction, the load is escaped from the lifting limiter mechanism 257.

The lifting limiter mechanism 257 is formed by installing a retreat space 258 at the slide cam groove 253 from the lateral surface of the outer circumference side, on which the lifting cam pin 266 is slid, to the support shaft through-hole 254 side. The lifting limiter mechanism 257 will be described in detail later.

Next, the lifting deck 211 will be described. The lifting deck 211 is to lift the loading arm 201. The lifting deck 211 is supported by the base deck 210 in a lifting manner, and is engaged with the lifting plate 212, so that the lifting deck 211 is lifted according to the sliding of the lifting plate 212.

The lifting deck 211 is made up of a substantially rectangular frame having four sides. A pair of facing lateral walls 211a, which is in parallel with the forward and backward direction of the apparatus body 60, is provided with slide guide holes 260 in which screws 232 arranged in a protruding manner at the left and right arm plates 220 and 221 of the loading arm 201 are inserted. Each of the slide guide holes 260 is formed in parallel with the longitudinal direction of the lateral wall 211a, and the screw 232 is inserted in the slide guide hole 260, thereby guiding the sliding of the loading arm 201 in the direction of the arrow C. In addition, the lifting deck 211 lifts the loading arm 201 integrally as the screw 232 is inserted in the slide guide hole 260.

In addition, the lifting deck 211 is provided with a lifting cam hole 261 which is engaged with the lifting plate 212, and a lifting guide hole 262 which is supported by the base deck 210, at the pair of lateral walls 211b perpendicular to the lateral wall 211a.

The lifting cam hole 261 is formed obliquely with respect to the longitudinal direction of the lateral wall 211b, and the lifting cam convex portion 267 arranged in a protruding manner at the lifting plate 212 is inserted in the lifting cam hole 261 from the inner surface side. Consequently, if the lifting plate 212 is slid, the lifting cam convex portion 267 is slid along the lifting cam hole 261, and thus the lifting deck 211 is lifted in the upward and downward direction of the apparatus body 60.

The lifting guide hole 262 is formed in the upward and downward direction of the apparatus body 60 perpendicular to the longitudinal direction of the lateral wall 211b, and the lifting guide convex portion 272 arranged in a protruding manner at the base deck 210 is inserted in the lifting guide hole from the inner surface side. Consequently, if the lifting plate 212 is slid, the lifting guide convex portion 272 is slid along the lifting guide hole 262, and thus the lifting deck 211 is lifted in the upward and downward direction of the apparatus body 60.

The lifting plate 212 lifting the lifting deck 211 is slidably supported by the base deck 210, and is slid by the cam gear 208, so that the lifting deck 211 is lifted. The lifting plate 212 is provided with a slide guide groove 265 which is slidably supported by the base deck 210, a lifting cam pin 266 which is engaged with the lifting cam groove 253 of the cam gear 208, and a lifting cam convex portion 267 which is inserted in the lifting cam hole 261 of the lifting deck 211.

The slide guide groove 265 is formed in the shape of elongated hole which is in parallel with the lateral surface 211b of the lifting deck 211, and is formed adjacent to the side edge of the front surface 60a side and the side edge of the rear surface 60b side of the apparatus body 60. As the screw is inserted in the slide guide groove 265 and then is fixed to the base deck 210, the lifting plate 212 is supported by the base deck 210 to be slid along the slide guide groove 265.

The lifting cam pin 266 is engaged with the lifting cam groove 253 of the cam gear 208, so that the lifting cam pin 26 is slid along the lateral wall of the outer circumference side of the lifting cam groove 253 to slide the lifting plate 212. As the lifting biasing spring 213 is extended between the lifting plate 212 and the base deck 210, the lifting plate 212 is typically slidably biased in the direction of the arrow F in FIG. 29 which corresponds to the left side 60d side of the apparatus body 60, and thus the lifting cam pin 266 comes into contact with the lateral wall of the lifting cam groove 253.

The lifting cam convex portion 267 is formed at the outer surface of the cam wall 268 which is formed by being bent upward from the side edge of the front surface 60a side and the side edge of the rear surface 60b side of the apparatus body 60 of the lifting plate 212. The lifting cam convex portion 267 is inserted in the lifting cam hole 261 formed at the lateral surface 211b of the lifting deck 211, thereby lifting the lifting deck 211 according to the sliding of the lifting plate 212.

The base deck 210 slidably supporting the lifting plate 212 is provided with a gear support shaft 270 which rotatably supports the cam gear 208 on the main surface, a plurality of screws (not illustrated) which is inserted in the slide guide groove 265 to slidably support the lifting plate 212, and a spring locking piece (not illustrated) to which one end portion of the lifting biasing spring 213 biasing the lifting plate 212 is locked. In addition, the base deck 210 is provided with a driving motor 209 at one corner portion of the main surface.

The base deck 210 is provided with a lateral wall 271 vertically arranged at the front surface 60a side and the rear surface 60b side of the apparatus body 60. The lateral wall 271 is provided with the lifting guide convex portion 272 which is inserted in the lifting guide hole 262 formed at the lateral surface 211b of the lifting deck 211. In addition, the lateral wall 271 is provided with a housing connecting piece 273 connected to the housing 200.

Figure 38A:
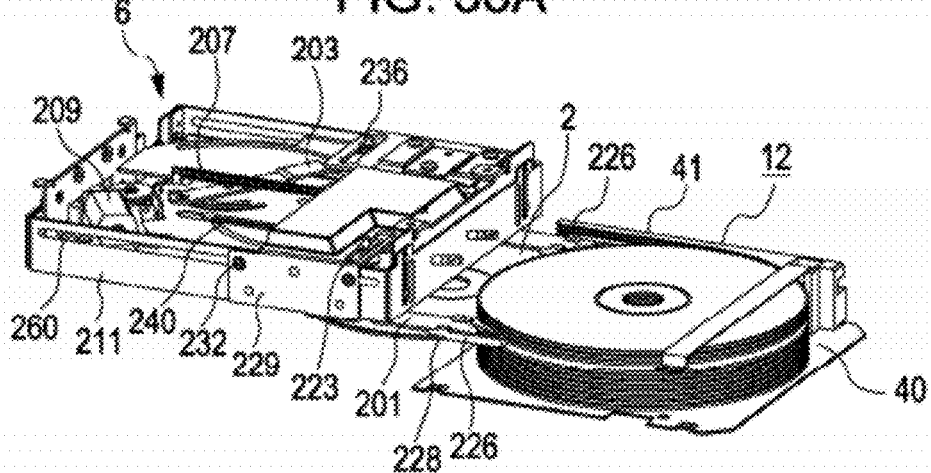
FIGS. 38A to 38C are perspective views illustrating a process of retracting an optical disc into an inside of a carry loader from a disc cartridge.
Figure 38B:
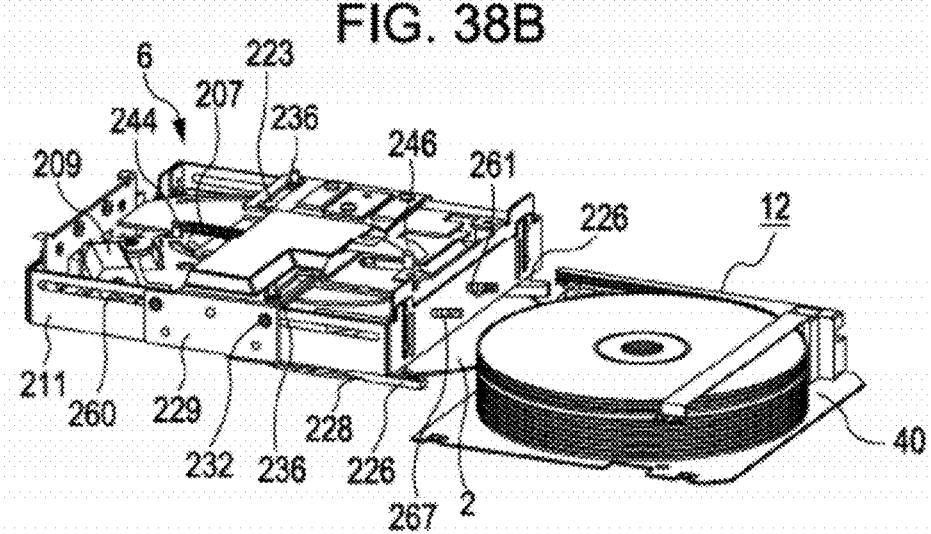
Figure 38C:
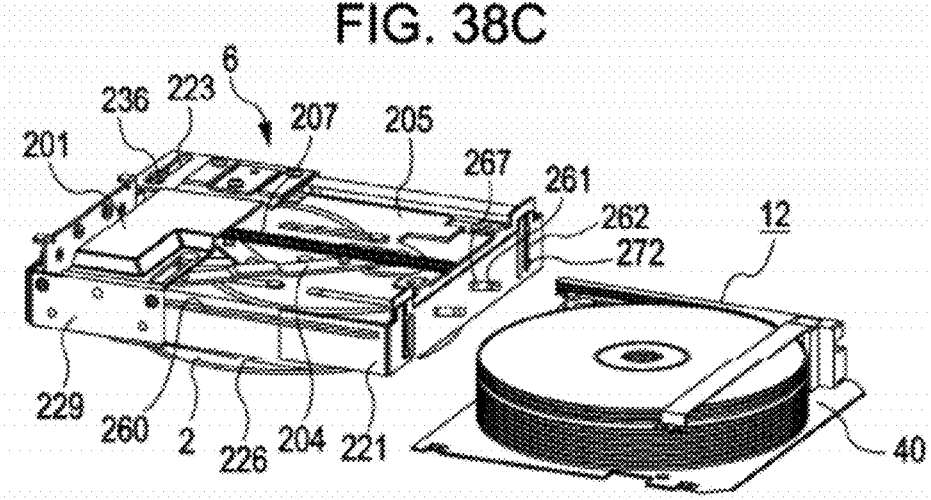
Figure 39A:
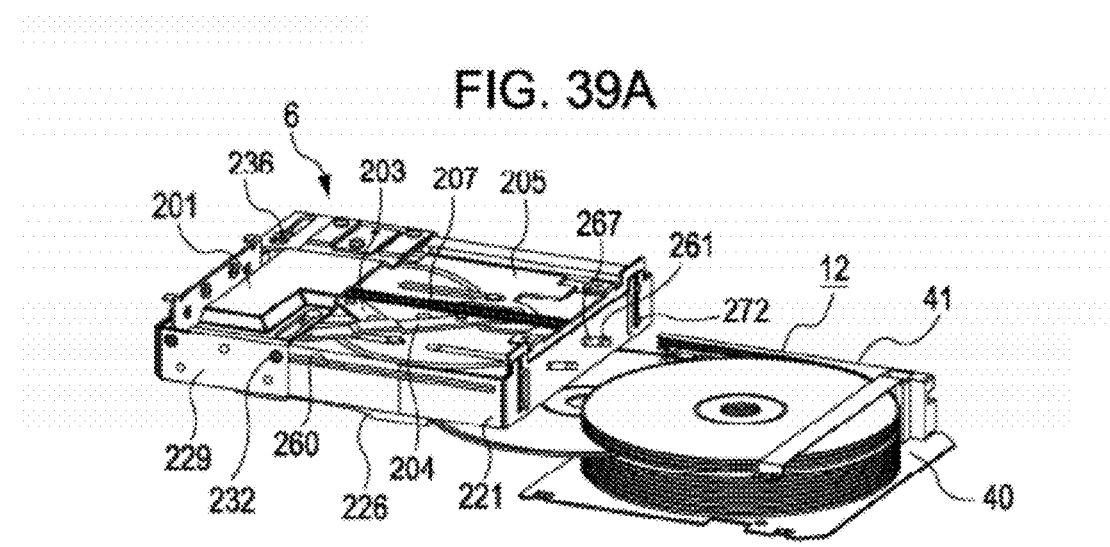
FIGS. 39A to 39C are perspective views illustrating a process of pushing back an optical disc into an inside of a disc cartridge from a carry loader.
Figure 39B:
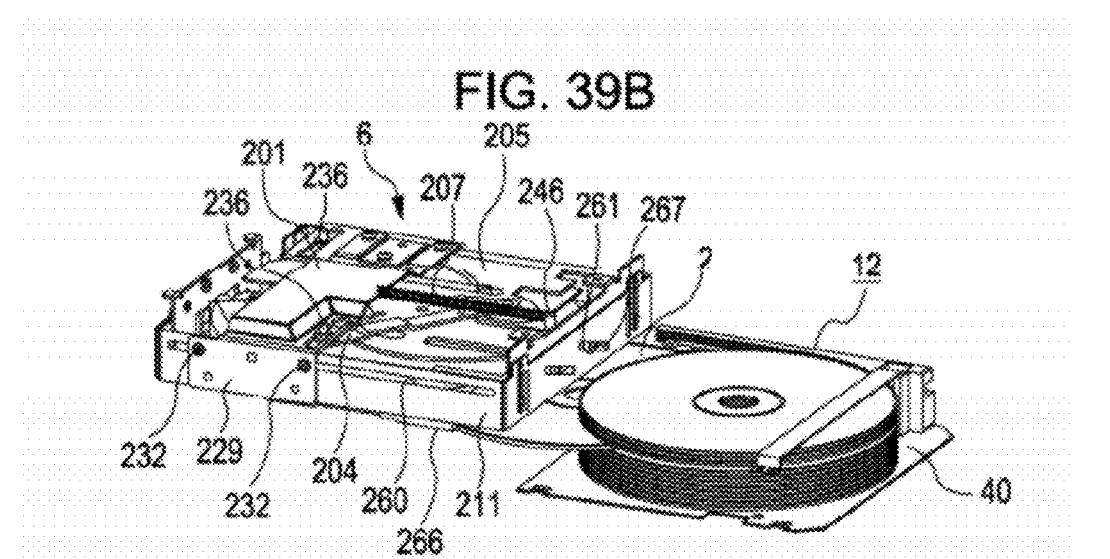
Figure 39C:
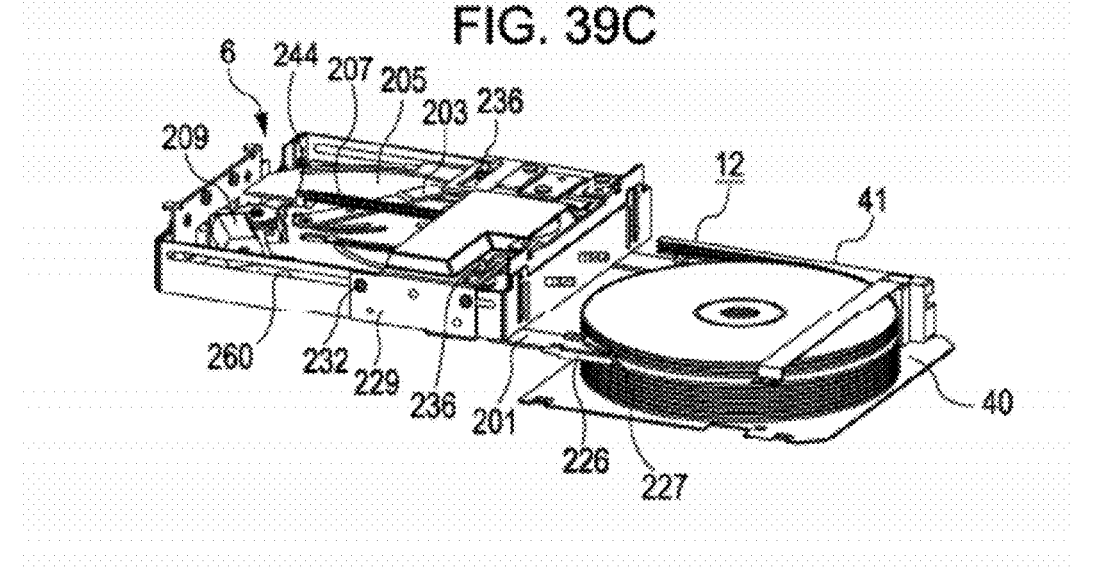

As the slide plate 206 and the lifting plate 212 are slid along the slide cam groove 252 and the lifting cam groove 253 of the cam gear 208, the arm driving mechanism 202 slides the loading arm 201 in the direction of the arrow C and lifts the loading arm in the direction of the arrow D. Consequently, the loading arm 201 retracts the optical disc 2 into the carry loader 6 from the lower shell 12, as shown in FIGS. 38A to 38C, and thus transfers the optical disc over to the recording/reproducing device 7. In addition, as shown in FIGS. 39A to 39C, the loading arm pushes back the optical disc 2, which is ejected from the recording/reproducing device 7, to the lower shell 12.

Figure 40:
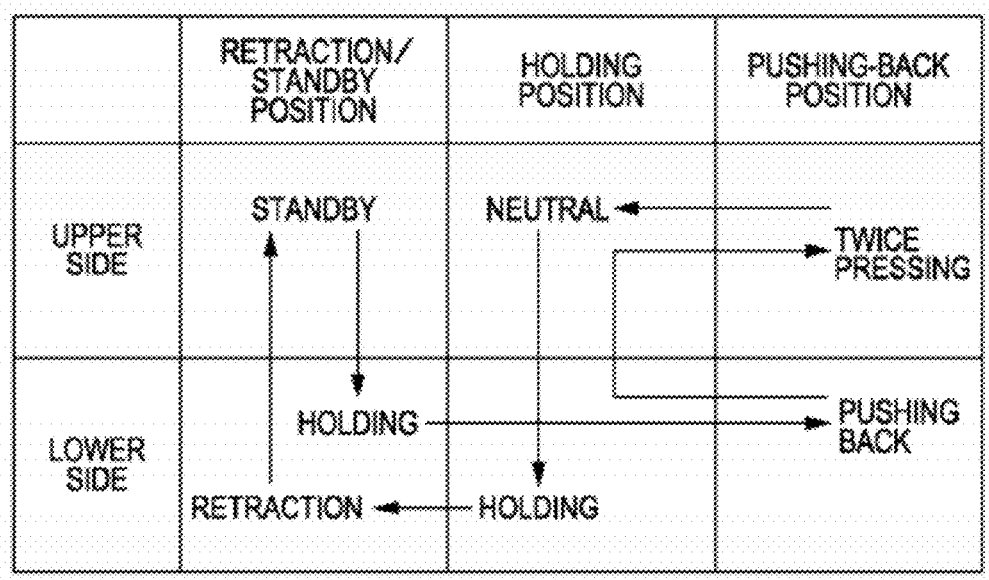
FIG. 40 is a diagram illustrating an operation state of a loading arm.

More specifically, the loading arm 201 is slid between a retraction/standby position at which the loading arm 201 is retreated from the select loader 5, a disc holding position at which the optical disc 2 pushed out from the lower shell 12 by the disc push-out mechanism 85 is held, and a disc pushing-back position at which the optical disc 2 is pushed back to the inside of the lower shell 12, as shown in FIG. 40. In addition, at each position, the loading arm 201 is lifted over the lower side at which the loading arm 201 comes into contact with the optical disc 2 to be transported, and the upper side at which the loading arm is spaced apart from the optical disc 2 to be transported.

The retraction/standby position is a position at which the loading arm 201 is retreated from the select loader 5, and delivers the optical disc 2 from or to the recording/reproducing device 7. The disc holding position is a position at which the loading arm 201 is moved in the lower shell 12 lowered at the disc insertion/ejection position to hold the optical disc 2 pushed by the disc push-out mechanism 85 at the retraction surface portion 228 of the locking claw 226, and a position which is spaced apart from the other optical discs 2 supported at the accommodating position. The disc pushing-back position is a position at which the loading arm 201 presses the optical disc 2 ejected from the recording/reproducing device 7 at the insertion surface portion 227 of the locking claw 226 to push back the optical disc 2 to the accommodating position of the lower shell 12. At the disc pushing-back position, the optical disc 2 to be stacked, which is adjacent to the optical disc 2 inserted and ejected by the loading arm 201, is pressed.

The arm driving mechanism 202 slides the slide plate 206 and the lifting plate 212 in association with the rotation of the cam gear 208. Consequently, as the respective positions of the retraction/standby position, the disc holding position, and the disc pushing-back position, and a combination of the upper side and the lower side of the respective positions are unambiguously set, the loading arm 201 draws a predetermined transport trace, as shown in FIG. 40.

The loading arm 201 is paused at the upper side of the holding position at the state in which the disc cartridge 1 is waiting for the insertion. The loading arm 201 is driven at the corresponding position at the initial state in which the power is input to the Disc changer apparatus 3, and is in the neutral state in which the disc cartridge 1 is waiting for the insertion. If the insertion of the disc cartridge 1 is detected, the loading arm 201 is moved down to the lower side of the holding position, and then is moved up to the upper side of the retraction/standby position via the lower side of the retraction/standby position. Therefore, the loading arm 201 is retreated from the lifting region of the lower shell 12, and then waits until the lower shell 12 is moved down to the disc insertion/ejection position.

If the lower shell 12 is moved down to the disc insertion/ejection position, the loading arm 201 is driven to the upper side of the holding position via the pushing-back position again. If the predetermined optical disc 2 is pushed out from the lower shell 12, the loading arm 201 is moved down to the lower side of the holding position, and holds the outer circumference of the optical disc 2 at the retraction surface portion 228 of the locking claw 226.

The loading arm 201 is slid to the lower side of the retraction/standby position, and retracts the optical disc 2 to the inside of the carry loader 6 to transfer the optical disc over to the transport mechanism of the recording/reproducing device 7. After that, the loading arm 201 is moved up to the upper side of the retraction/standby position, and thus is spaced apart from the optical disc 2.

If the recording and reproducing of the optical disc 2 by the recording/reproducing device 7 is completed and the optical disc 2 is ejected by the transport mechanism, the loading arm 201 is moved down to the lower side of the retraction/standby position to hold the outer circumferential surface of the optical disc 2 at the insertion surface portion 227. Then, the loading arm 201 is slid to the lower side of the disc pushing-back position to push back the optical disc 2 to the accommodating position of the lower shell 12.

After that, the loading arm 201 is slid to the lower side of the holding position, is moved to the upper side of the holding position, and then is slid to the upper side of the pushing-back position. Consequently, the loading arm 201 presses the other optical disc 2, which is accommodated adjacent to the transported optical disc 2, at the accommodating position, and thus returns the other optical disc 2 which was wobbled during the insertion/ejection process of the optical disc 2 to the accommodating position. If the upper and lower shells 11 and 12 are joined to each other again, it is able to prevent the interference of the support shaft 16 and the center hole 2a of the other optical disc 2 due to the position deviation of the other optical disc 2. At this time, the twice-pressing process of the loading arm 201 may be performed more than two times by controlling the shape of the slide cam groove 252 and the lifting cam groove 253 of the cam gear 208, or reverse rotation and forward rotation of the cam gear 208.

After the twice-pressing of the optical disc 2, the loading arm 201 is slid to the upper side of the holding position to be under a neutral state, and then is waiting for the next transport operation.

The recording/reproducing device 7 will now be described. The recording/reproducing device 7 installed below the base deck 210 employs a so-called recording/reproducing device of a slot type, and is positioned on a mounting protrusion 280 of the housing 200. The recording/reproducing device 7 writes and/or reads information signals into or from the optical disc 2, and includes a transport mechanism which receives the optical disc 2 to be retracted by the loading arm 201 to transport the optical disc 2 to the inside of the apparatus body, and transfer the optical disc 2 over to the loading arm 201, a chucking mechanism which rotatably chucks the optical disc 2 transported to the inside of the apparatus body, and an optical pickup mechanism which writes and/or reads information signals into or from the optical disc 2.

The transport mechanism includes a plurality of transport arms for transporting the optical disc 2, and as the recording/reproducing device 7 is alternatively aligned with the carry loader 6, the transport mechanism pivots at the height at which is able to receive and deliver the optical disc 2 between the loading arm 201 and the transport mechanism. At this time, the transport mechanism may employ a configuration using a transport roller, as well as the configuration using the transport arm.

The chucking mechanism includes a disc table which supports the optical disc 2 retracted by the transport mechanism, and a spindle motor which rotates the disc table. The disc table is provided with an engaging convex portion which is inserted in the center hole 2a of the optical disc 2. In addition, the disc table is supported in a liftable manner, and if the optical disc 2 is transported, the engaging convex portion is inserted in the center hole 2a to hold the optical disc 2. At this time, the chucking mechanism may be configured to use a chuck plate which is rotatably pinched in the optical disc 2 together with the disc table.

The optical pickup mechanism includes a pickup base having an optical block which condenses a light beam emitted from a semiconductor laser serving as a light source by using an object lens to irradiate the condensed light beam onto a signal recording surface of the optical disc 2, and detects the returned light beam reflected from the signal recording surface of the optical disc 2 by using an optical detector made up of a light sensing element or the like, thereby writing or reading signals into or from the optical disc 2.

In addition, since the pickup base is supported by the pickup moving mechanism, the optical pickup mechanism is able to move in a radial direction of the optical disc 2. The pickup moving mechanism includes a stepping motor having a pair of guide shafts which support the pickup base in such a manner that the pickup base is able to slide in the radial direction of the optical disc 2, and a lead screw which moves the pickup base, which is supported by the pair of guide shafts, in the radial direction of the optical disc 2.

At this time, the recording/reproducing device 7 may employ all recording/reproducing devices capable of writing and/or reading information signals into or from the optical disc 2, as well as the above-described configuration.

2-4 Operation of Disc Changer Apparatus 3

Next, the operation of the Disc changer apparatus 3 will be described. First, the state of the respective parts of the Disc changer apparatus 3 in the insertion standby state of the disc cartridge 1 will be described, the process of inserting the disc cartridge 1, ejecting the optical disc 2 from the cartridge body 10, and transporting the optical disc 2 to the inside of the recording/reproducing device 7 will be described, and then the process of ejecting the optical disc 2 from the recording/reproducing device 7, transporting the optical disc 2 to the inside of the cartridge body 10, and ejecting the disc cartridge 1 will be described.

In the state in which the disc cartridge 1 is waiting for insertion, the cartridge insertion/removal opening 70 of the front panel 63 is closed by the bezel 71. In addition, as the initial position detecting switch (not illustrated) provided at the base plate 155 is inserted in the initial position detecting hole (not illustrated) formed in the first back surface gear 157 and the second back surface gear 158, the initial position in which the disc cartridge 1 is waiting for insertion is detected, and the select loader 5 is stopped at the corresponding initial position. At this time, the cam plate 82 is slid to the rear surface 60b side of the apparatus body 60 via the gear coupling portion 82a which is meshed with the first back surface gear 157 and the second back surface gear 158.

Consequently, as the lower holder 91 is moved up and the engaging cam pin 113 is inserted in the holder engaging piece 100 of the upper holder 90, the upper and lower holder 90 and 91 of the cartridge holder 80 are engaged with each other. In addition, since the upper holder 90 is biased by the tension coil spring 95 extended between the cartridge holder 80 and the holder cover 81, the upper and lower holders 90 and 91 are slid in an integrated manner to the front surface 60a side of the apparatus body 60, and thus the cartridge holder 80 is held in the cartridge insertion/removal position.

At this time, in the cartridge holder 80, since the lower holder 91 is moved up and thus the upper and lower holders 90 and 91 are engaged with each other, the pressing-down piece 126 of the shell positioning pin 117 installed at the lower holder 91 is pushed down by the upper holder 90. Therefore, the lifting block 125 is pushed down against the biasing force of the coil spring 129, and thus the insertion pin 124 of the shell positioning pin 117 is retreated from the pin hole 123 of the lower holder 91.

The holder latch 142 of the holder cover 81 pivots in the direction of the arrow L by the latch spring 145, and thus the hook portion 142a is positioned over the slide region of the holder holding piece 102 of the upper holder 90. In addition, as the height adjusting plate 120 is biased to the rear surface 60b side by the spring 166 which is locked to the wall 165 vertically arranged at the base plate 155, and the cam pin 161a of the adjustment slide plate 161 is guided by the second cam groove 160a of the surface cam gear 160, the height adjusting plate 120 is slid to the front surface 60a side of the apparatus body 60. Thus, the adjustment spring 162 pivots to the rear surface 60b side, and the height adjusting plate 120 is slid to the rear surface 60b side of the apparatus body 60.

In addition, as the cam pin 177 is guided by the third cam groove 160b of the surface cam gear 160, the lever slider 169 of the disc push-out mechanism 85 is slid in the direction opposite to the arrow B. Consequently, the pivot operation piece 175 is pressed on the abutting surface 178 of the operation concave portion 176, the push-out lever 167 pivots in the direction opposite to the arrow P, and thus is retreated from the lifting region of the lower shell 12.

In addition, in the state in which the disc cartridge 1 is waiting for insertion, the initial position detecting switch (not illustrated) provided at the base deck 210 is inserted in the initial position detecting hole (not illustrated) formed in the cam gear 208, so that the initial position is detected in which the disc cartridge 1 is waiting for insertion, and the carry loader 6 is stopped at the corresponding initial position. At this time, the slide plate 206 is biased by the slide biasing spring 207 extended between the slide deck 205 and the slide plate 206, and the slide cam pin 250 is guided along the slide cam groove 252 of the cam gear 208 to be slid in the direction opposite to the arrow E. Consequently, as the slide arms 203 and 204 pivot by the slide plate 206, the loading arm 201 is slid in the direction of the arrow C in FIG. 32 which corresponds to the front surface 60a side of the apparatus body 60.

As the lifting cam pin 266 is guided along the lifting cam groove 253 of the cam gear 208, the lifting plate 212 is slid in the direction opposite to the arrow F in FIG. 29 against the biasing force of the lifting biasing spring 213 extended between the base deck 210 and the lifting plate 212. In addition, since the lifting cam convex portion 267 of the lifting plate 212 is slid along the lifting cam hole 261 in the direction opposite to the arrow F, the lifting guide hole 262 is guided along the lifting guide convex portion 272 of the base deck 210, and thus the lifting deck 211 is moved up. As the lifting deck 211 is moved up, the loading arm 201 is moved up in the direction of the arrow D in FIG. 29.

Therefore, the loading arm 201 is driven to the upper side of the holding position shown in FIG. 40, so that the loading arm 201 is in the neutral state in which the disc cartridge 1 is waiting for the insertion.

Then, the process of inserting the disc cartridge 1 in the Disc changer apparatus 3 and transporting the optical disc 2 to the recording/reproducing device 7 will be described. The disc cartridge 1 is inserted in the cartridge insertion/removal opening 70 from the front surface 10a side of the cartridge body 10 by the hand of the user or the robot arm. The disc cartridge 1 presses the center bezel 74 to pivot the center bezel to the rear surface 60b side of the apparatus body 60 and to pivot the side bezel 75 to the rear surface 60b side through the center bezel 74.

At this time, in the Disc changer apparatus 3, since the pivot distance of the side bezel 75 to the rear surface 60b side is short, the cartridge insertion/removal position is able to be set as close toward the front surface 60a side as possible, without interfering with the upper shell separating piece 103 formed at the upper holder 90 of the cartridge holder 80 which is held at the cartridge insertion/removal position.

Since the disc cartridge 1 is inserted in the rear surface 60b side of the apparatus body 60, the upper shell separating piece 103 and the lower shell separating piece 115, which is adjacent to the upper shell separating piece 103 in parallel, of the cartridge holder 80 move in the separation groove 47 of the cartridge body 10. In addition, in the cartridge holder 80, if the front surface 10a of the cartridge body 10 comes into contact with the rear lateral surface 97 of the upper holder 90, the upper and lower holders 90 and 91 are slid in an integrated manner to the insertion position of the rear surface 60b side of the apparatus body 60 against the biasing force of the tension coil spring 95. At this time, with the configuration of the holder 80, the cam pin 101 of the upper holder 90 is guided along the upper cam slit 140 of the holder cover 81, and the engaging cam pin 113 of the lower holder 91 is guided along the lower cam slit 141 of the holder cover 81, and the horizontal guide portion 150a of the lifting guide groove 150 which is formed at the cam plate 82.

In the cartridge holder 80, if the front surface 10a of the cartridge body 10 comes into contact with the rear lateral surface 97 of the upper holder 90, the lock releasing piece 99 bent and formed at the rear lateral surface 97 is moved in the lock releasing hole 22 to press the pressing surface portion 31b of the front-side lock piece 31. Consequently, the front-side lock piece 31 pivots in the direction opposite to the arrow R in FIG. 6 against the biasing force of the coil spring 35, so that the engaging portion 31c is deviated from the engaged concave portion 56 of the lower shell 12.

In addition, in the cartridge holder 80, if the cartridge body 10 is inserted in the rear surface 60b side of the apparatus body 60, the upper shell separating piece 103 presses the pressing piece portion 33b of the rear-side lock piece 33 which is slid along the extension line of the separation groove 47. Consequently, the rear-side lock piece 33 is slid in the direction opposite to the arrow S in FIG. 6 against the biasing force of the coil spring 38, and thus is deviated from the engaged concave portion 57 of the lower shell 12 under the engaging portion 33c. Therefore, the cartridge body 10 is able to be separated into the upper and lower shells 11 and 12.

The holder holding piece 102 of the upper holder 90 is locked to the hook portion 142a of the holder latch 142, the cartridge holder 80 is held at the insertion position of the rear surface 60b side of the apparatus body 60 against the biasing force of the tension coil spring 95. At this time, in the cartridge holder 80, the engaging cam pin 113 of the lower holder 91 is located over the lower vertical portion 141b from the lower horizontal portion 141a via the preliminary horizontal portion 141c. In addition, the cartridge holder 80 presses the cartridge insertion detecting switch SW1 installed at the one support lateral surface portion 134 of the holder cover 81 (FIG. 18) to detect the insertion of the disc cartridge 1.

At this time, in the cartridge holder 80, the upper shell holding convex portion 98 installed at the support surface portion 93 of the upper holder 90 is engaged with the concave portion 21 of the upper shell 11, and the separation wall 32 of the upper shell 11 is pressed by the pressing piece 104 installed at each of the upper lateral surface portions 94 and 94. In addition, in the cartridge holder 80, the left and right disc holders 41 and 42 of the lower shell 12 are pressed by the pressing piece 131 installed at the lower lateral surface portion 107 of the lower holder 91. Therefore, the cartridge holder 80 prevents the wobble of the upper and lower shells 11 and 12.

If the insertion of the disc cartridge 1 is detected by the cartridge insertion detecting switch SW1, the first driving motor 156 is driven so that the first back surface gear 157 and the second back surface gear 158 are rotated. If the first back surface gear 157 and the second back surface gear 158 are rotated, the gear coupling portion 82a is slid along the guide elongated hole 159a. Consequently, the pair of left and right cam plates 82 is synchronously slid to the front surface 60a side of the apparatus body 60.

If the cam plate 82 is slid to the front surface 60a, the engaging cam pin 113 is slid along the lifting guide portion 150b from the horizontal guide portion 150a of the lifting guide groove 150, and thus the lower holder 91 is moved down. At this time, the lower holder 91 is guided to the lower vertical portion 141b in which the engaging cam pin 13 is formed at the lower cam slit 141 of the holder cover 81. Consequently, the engaging cam pin 113 is deviated from the slit 100a of the holder engaging piece 100 of the upper holder 90, and thus the lower holder 91 is separated from the upper holder 90. In addition, the upper holder 90 is held at the insertion position.

As the upper shell separating piece 103 of the upper holder 90 is moved in the separation groove 47 of the cartridge body 10, the lower end surface of the separation wall 32 of the upper shell 11 is supported. In addition, in the lower shell 12, as the lower shell separating piece 115 of the lower holder 91 is moved in the separation groove 47, the upper end surface of the entrance groove 43 formed at the left and right disc holders 41 and 42 is supported. Consequently, the upper shell 11 is supported by the upper holder 90 and thus is held at the insertion position. If the lower shell 12 is supported by the lower holder 91 and the lower holder 91 is moved down, the lower holder is moved to the disc insertion/ejection position, so that the upper and lower shells 11 and 12 are separated.

The lower holder 91 is moved down to the disc insertion/ejection position at which the predetermined optical disc 2 previously designated by a user is located over the pivot trace of the push-out lever 167. Therefore, the lower shell 12 is able to select the predetermined optical disc 2 and insert or eject the corresponding optical disc. Then, if the lower holder 91 is moved down to the disc insertion/ejection position, the second driving motor 163 is driven and the surface cam gear 160 is rotated. Therefore, as the cam pin 161a is slid on the second cam groove 160a of the surface cam gear 160, the adjustment slide plate 161 is slid to the rear surface 60b side, and the height adjusting plate 120 is slid to the front surface 60a via the adjustment spring 162. The height adjusting plate 120 regulates the height of the lower holder 91 with high precision by engaging the height restricting piece 116 of the lower holder 91 with the adjustment slit 121 formed according to the disc insertion/ejection position in order to position the predetermined optical disc 2 at the disc insertion/ejection position (FIG. 20).

At this time, if the lower holder 91 is moved down at the disc insertion/ejection position by the cam plate 82 and then is spaced apart from the upper holder 90, the upper holder 90 is spaced apart from the pressing-down piece 126 of the shell positioning pin 117, and thus the lifting block 125 is slid in the direction of the arrow U by the coil spring 129 (FIG. 24). The insertion pin 124 is arranged in a protruding manner at from the pin hole 123, and the lower holder 91 is inserted in the positioning hole 45 of the lower shell 12. Consequently, the lower holder 91 is able to facilitate the positioning of the lower shell 12.

In addition, if the insertion of the disc cartridge 1 is detected by the cartridge insertion detecting switch SW1, the cam gear 208 is rotated by the driving motor 209, and thus the slide plate 206 and the lifting plate 212 are slid, so that the loading arm 201 of the carry loader 6 is moved down from the upper side of the holding position and then is moved to the upper side of the retraction/standby position. Consequently, the loading arm 201 of the carry loader 6 is moved back from the lifting region of the lower holder 91, the lower holder 91 is able to be transported to the disc insertion/ejection position.

After the position of the lower holder 91 is restricted by the height adjusting plate 120, the loading arm 201 is moved down from the upper side of the retraction/standby position, and then is moved to the upper side of the holding position via the pushing-back position.

After the loading arm 201 is moved to the upper side of the holding position, the surface cam gear 160 is further rotated by the second driving motor 163, and thus the cam pin 177 engaged with the third cam groove 160b is slid, so that the lever slider 169 is slid in the direction of the arrow B in FIG. 24. Therefore, the pivot operation piece 175 is pressed on one of the contact surfaces 178 formed at the operation concave portion 176 of the lever slider 169, the push-out lever 167 pivots in the direction of the arrow P in FIGS. 24 and 25.

The push-out lever 167 is moved in the guide portion 48c of the support groove 48, which supports the predetermined optical disc 2 located at the disc insertion/ejection position, from the disc extrusion opening 51 of the lower shell 12 supported by the lower holder 91, thereby pushing out the predetermined optical disc 2. As shown in FIG. 26A, since the guide portion 48c is formed in the shape of circular arc having the same trace as the pivot trace of the push-out lever 167, the push-out lever 167 pivots while the push-out lever is supported by the guide portion 48c. Consequently, the push-out lever 167 is not deviated from the support groove 48 during pivoting.

As shown in FIG. 26B, the push-out lever 167 is slid until the lever slider 169 presses the lever position detecting switch SW2 mounted on the base plate 155, so that the optical disc 2 is pushed out until the center hole 2a is ejected from the disc insertion/ejection opening 50 of the lower shell 12. Consequently, the optical disc 2 is ejected to the holdable position by the loading arm 201.

In the disc cartridge 1, the lower shell 12 is moved down until the predetermined optical disc 2 reaches the disc insertion/ejection position. Accordingly, for example, in the case where the optical disc 2 accommodated in the uppermost support groove 48 is ejected, the lower shell 12 is moved down to the position at which the support shaft 16 of the upper shell 11 is retreated from the center hole 2a of the optical disc 2 accommodated in the uppermost support groove 48. On the other hand, for example, in the case where the optical disc 2 accommodated in the middle or lower support groove 48 is ejected, the lower shell 12 is moved down to the position at which the support shaft 16 is retreated from the center hole 2a of the middle or lower optical disc 2.

The support shaft 16 is inserted in the center hole 2a of the other optical disc 2 accommodated at a position higher than the predetermined optical disc 2. Therefore, the support shaft 16 prevents the other optical disc from being ejected with the predetermined optical disc 2 when the predetermined optical disc 2 is ejected by the push-out lever 167, and restricts the wobble of the other optical disc 2 during accommodating in the select loader 5 to prevent the circumferential portion of the center hole 2a of the other optical disc 2 from colliding with the support shaft 16 when the upper and lower shells 11 and 12 are joined to each other.

In this embodiment, in order to reliably retreat the support shaft 16 from the center hole 2a of the predetermined optical disc 2 and prevent the interference of the support shaft 16 and the push-out lever 167, the support shaft 16 is retreated from the center hole 2a of the other optical discs 2 adjacent to the predetermined optical disc 2 to be inserted or ejected, and is inserted in the center holes 2a of at least three of the other optical discs 2 stacked over the predetermined optical disc. In addition, the support shaft 16 is retreated from the center holes 2a of the other optical discs 2 stacked below the predetermined optical discs 2, but the other optical discs 2 are restricted at the predetermined accommodating position by the self-lock spring 53.

After the optical disc 2 is pushed out from the disc ejection opening 50 by the push-out lever 167, the loading arm 201 is moved down from the upper side of the holding position, and then holds the rear side of outer circumference of the optical disc 2 in the extrusion direction by the retraction surface portion 228 formed at the lower surface 226a of the locking claw 226. At this time, since the retraction surface portion 228 has substantially the same curvature as the outer circumference of the optical disc 2, the locking claw 226 comes into contact with the outer circumference of the optical disc 2 in the circular-arc shape. Then, the loading arm 201 is moved to the lower side of the retraction/standby position, and then the loading arm 201 retracts the optical disc 2 to the inside of the carry loader 6 to transfer it over to the transport mechanism of the recording/reproducing device 7. After that, the loading arm 201 is moved to the upper side of the retraction/standby position, and then is stopped. Therefore, the loading arm 201 is spaced apart from the optical discs 2, so that the loading arm does not impede the rotation of the optical disc 2 by the recording/reproducing device 7.

If the optical disc 2 is deeply inserted in the inside of the recording/reproducing device 7 by the loading arm 201, the transport mechanism automatically retracts the optical disc 2 in the recording/reproducing device 7. After the recording/reproducing device 7 retracts the optical disc 2, the optical disc 2 is rotatably supported by the chucking mechanism, and the optical pickup mechanism writes and/or reads information signals in or from the optical disc 2.

As the lifting plate 212 is slid in the direction of the arrow F, the lifting deck 211 is moved down, and thus the loading arm 201 is moved to the lower side of the holding position, at which the outer circumference of the optical disc 2 is held by the locking claw 226, from the upper side of the holding position. In the arm driving mechanism 202 of the loading arm 201, after the lower surface of the locking claw 226 comes into contact with the main surface of the optical disc 2, if the lifting plate 212 is further slid, the lifting limiter mechanism 257 installed at the lifting cam groove 253 of the cam gear 208 prevents the optical disc 2 from being excessively pressed by the loading arm 201.

That is, if the locking claw 226 comes into contact with the optical disc 2, the arm driving mechanism 202 restricts the lowering of the lifting deck 211 and the sliding of the lifting plate 212, so that the lifting cam pin 266 of the lifting plate 212 is not slidable on the lateral surface of the lifting cam groove 253 according to the rotation of the cam gear 208. Accordingly, the lifting limiter mechanism 257 is provided with a retreat space 258 formed from the lateral surface of the outer circumferential surface side, on which the lifting cam pin 266 is slid, to the support shaft through-hole 254 side, so that the lifting cam pin 266 is able to retreat.

As the lifting cam pin 266 is moved back to the retreat space 258, the driving force of the driving motor 209 for rotating the cam gear 208 is absorbed by extension of the lifting biasing spring 213 extended between the lifting plate 212 and the base deck 210, so that the driving force is hardly transferred to the loading arm 201 and the optical disc 2 via the lifting plate 212 and the lifting deck 211. Accordingly, the lifting limiter mechanism 257 is able to prevent the loading arm 201 from being damaged or the optical disc 2 from being scratched or deformed due to the excessive load to be applied to the loading arm 201 or the optical disc 2.

Next, the process of pushing back the optical disc 2, in which the writing or reading of the information signal by the recording/reproducing device 7 is completed, to the lower shell 12, and extracting the disc cartridge 1 from the Disc changer apparatus 3 will be described.

The chucking of the optical disc 2, in which the writing or reading of the information signal by the optical pickup device is completed, is released by the chucking mechanism, and then is ejected from the recording/reproducing device 7 by the transport mechanism. At this time, the optical disc 2 is ejected to the position at which the center hole 2a is exposed outwardly from the recording/reproducing device 7, and the insertion surface portion 227 of the locking claw 226 is able to come into contact with the rear side of the lower shell 12 in the insertion direction.

In addition, until that time, the second driving motor 163 and the surface cam gear 160 are reversely rotated by the predetermined amount, the push-out lever 167 is return-rotated in the direction opposite to the arrow P, and the select loader 5 is moved back from the lower shell 12.

If the optical disc 2 is ejected from the recording/reproducing device 7, the cam gear 208 is driven, and then the carry loader 6 lowers the loading arm 201 from the upper side of the retraction/standby position to the lower side of the retraction/standby position. Therefore, the loading arm 201 holds the rear side of the optical disc 2 in the insertion direction to the lower shell 12 by the insertion surface portion 227 of the locking claw 226. Then, the loading arm 201 is slid to the lower side of the pushing-back position to push back the optical disc 2 to the accommodating position of the lower shell 12.

Figure 43:
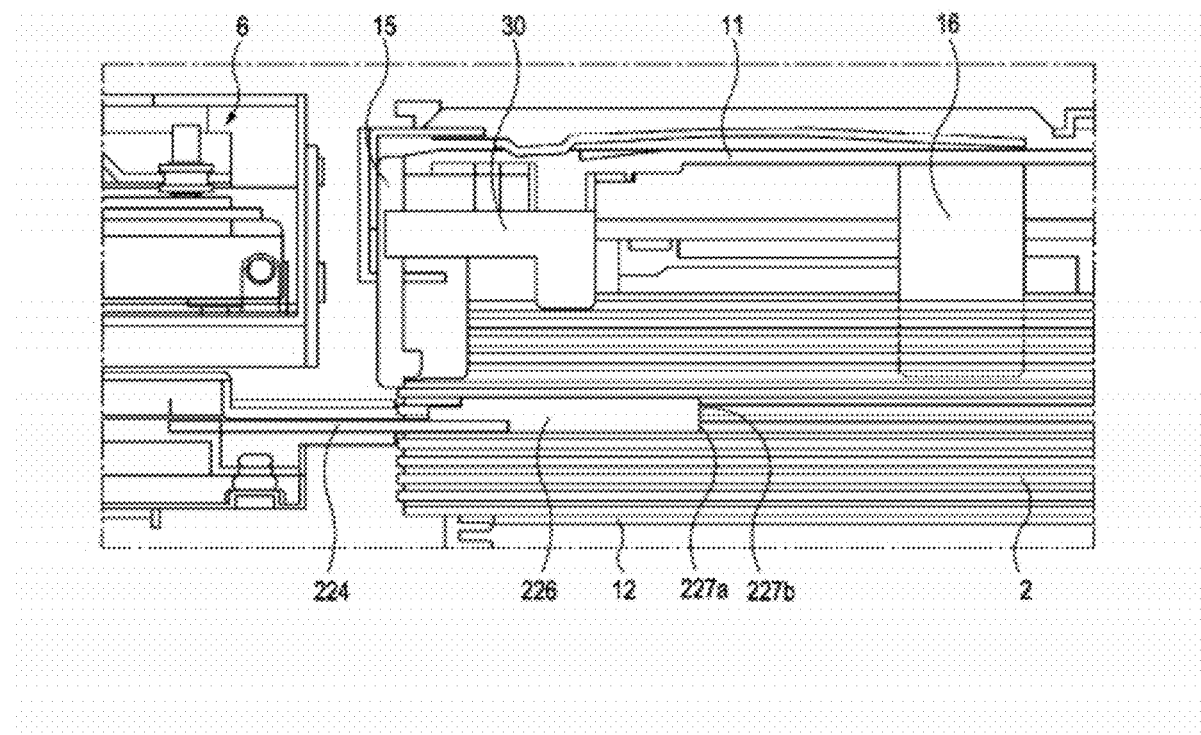
FIG. 43 is a cross-sectional view illustrating a process of pushing back an optical disc to a lower shell.

As shown in FIG. 43, in the loading arm 201, the pressing portion 227a presses the optical disc 2 in the lower region of the insertion surface portion 227, while the restriction portion 227b presses the other optical disc 2, which is accommodated immediately above the optical disc 2, to the accommodating position in the upper region of the insertion surface portion 227. As described above, the other optical disc 2 accommodated at a position adjacent to the predetermined optical disc 2 to be inserted or ejected from the lower shell 12 does not insert the support shaft 16, and is restricted at the accommodating position only by the self-lock spring 53. Accordingly, in the case where the other optical disc 2 is ejected with the predetermined optical disc 2 when the predetermined optical disc 2 is ejected from the lower shell 12, and there is the wobble of the other optical disc 2 from the accommodating position while the predetermined disc 2 is transported, the other optical disc 2 is restricted at the predetermined accommodating position by the restriction portion 227b.

Furthermore, after the loading arm 201 is slid to the lower side of the pushing-back position, the loading arm 201 is slid to the upper side of the pushing-back via the lower side of the holding position and the upper side of the holding position. Consequently, the loading arm 201 presses the adjacent other optical disc 2 above the predetermined optical disc 2 by the pressing portion 227a to restrict the other optical disc at the accommodating position, and presses the adjacent other optical disc 2 above the corresponding other optical disc 2 by the restriction portion 227b to restrict the adjacent other optical disc at the accommodating position. Through such the twice-pressing process, two other optical discs 2 accommodated above the predetermined optical disc 2 to be inserted or ejected are restricted at the accommodating position, so that the position of the other optical discs 2 accommodated above the predetermined optical disc 2, in which the support shaft 16 is retreated, is restricted.

At this time, the twice-pressing process of the loading arm 201 may be performed more than two times by controlling the shape of the slide cam groove 252 and the lifting cam groove 253 of the cam gear 208, or reverse rotation and forward rotation of the cam gear 208. In addition, the lifting of the lower holder 91 and the pushing-back operation by the loading arm 201 may be alternatively performed by controlling the first driving motor 156 of the select loader 5 and controlling the operation of the first and second back surface gears 157 and 158 and the cam plate 82, thereby restricting the position of the other optical disc 2 positioned under the predetermined optical disc 2.

After the optical disc 2 is pushed back to the inside of the lower shell 12, the loading arm 201 is moved back to the upper side of the holding position, and then is stopped in the neutral state. If the loading arm 201 is moved back to the upper side of the holding position, and is retreated from the select loader 5, the second driving motor 163 and the surface cam gear 160 are further reversely rotated, and the adjustment slide plate 161 is slid to the front surface 60a side, such that the select loader 5 slides the height adjusting plate 120 to the rear surface 60b side. Consequently, the engagement of the adjustment slit 121 of the height adjusting plate 120 and the height restricting piece 116 is released, and thus the lower holder 91 is able to lift.

Then, in the select loader 5, the first driving motor 156 and the first and second back surface gears 157 and 158 are driven, and thus the cam plate 82 is slid to the rear surface 60b side of the apparatus body 60.

If the cam plate 82 is slid to the rear surface 60b side, the lower holder 91 is moved up since the engaging cam pin 113 is slid along the horizontal guide portion 150a from the lifting guide portion 150b of the lifting guide groove 150. At that time, the engaging cam pin 113 of the lower holder 91 is guided along the lower vertical portion 141b formed at the lower cam slit 141 of the holder cover 81. Therefore, the engaging cam pin 113 is moved in the slit 100a of the holder engaging piece 100 of the upper holder 90, such that the lower holder 91 is joined to the upper holder 90.

As the upper and lower holders 90 and 91 are joined to each other, the pressing-down piece 126 of the shell positioning pine 117 is pressed on the upper holder 90, and thus the lifting block 125 lowers the lifting shaft 128 against the biasing force of the coil spring 129. Consequently, the insertion pin 124 of the shell positioning pin 117 is moved back from the positioning hole 45 of the lower shell 12 and the pin hole 123 of the lower holder 91.

As the upper and lower holder 90 and 91 are joined to each other, the upper and lower shells 11 and 12 supported by the upper and lower holders 90 and 91 are joined to each other.

After the joint of the upper and lower holders 90 and 91, as the cam plate 82 is further slid to the rear surface 60b side, the spring locking piece portion 142c is pressed by the latch pressing portion 152 of the cam plate 82, and thus the holder latch 142 pivots in the direction opposite to the arrow L. Consequently, the cartridge holder 80 is slid to the front surface 60a side of the apparatus body 60 by the tension coil spring 95, and then is moved to the cartridge insertion/removal position.

As the cartridge holder 80 is moved to the cartridge insertion/removal position, the rear surface 10b side of the cartridge body 10 is arranged outwardly in a protruding manner at the cartridge insertion/removal opening 70, so that the cartridge body is able to be withdrawn. Then, as the cartridge body 10 is withdrawn from the cartridge holder 80, the lock releasing piece 99 installed at the upper holder 90 is moved back from the lock releasing hole 22. Accordingly, the front-side lock piece 31 receives the biasing force of the coil spring 35 and thus pivots in the direction of the arrow R, so that the engaging portion 31c is engaged with the engaged concave portion 56 of the lower shell 12. In addition, as the cartridge body 10 is withdrawn from the cartridge holder 80, the upper shell separating piece 103 of the upper holder 90 is spaced apart from the pressing piece portion 33b of the rear-side lock piece 33. Therefore, the rear-side lock piece 33 receives the biasing force of the coil spring 38, and then is slid in the direction of the arrow S, so that engaging portion 33c is engaged with the engaged concave portion 57 of the lower shell 12. As a result, the upper and lower shells 11 and 12 of the cartridge body 10 are locked to each other.

At this time, when the carry loader 6 pushes back the optical disc 2 to the lower shell 12, the sliding of the loading arm 201 to the pushing-back position is restricted, for example, as well as the optical disc 2 not being inserted in the support groove 48 serving as an accommodating place but in the adjacent support groove 48. When the load is applied to the slide arms 203 and 204 and the slide plate 206 in the direction opposite to the slide direction, the slide limiter mechanism 255 for escaping the load is provided.

As described above, the slide limiter mechanism 255 is formed by installing the retreat space 256 at the slide cam groove 252 from the lateral surface of the outer circumference side, on which the slide cam pin 250 is slid, to the support shaft through-hole 254 side.

Figure 41A:
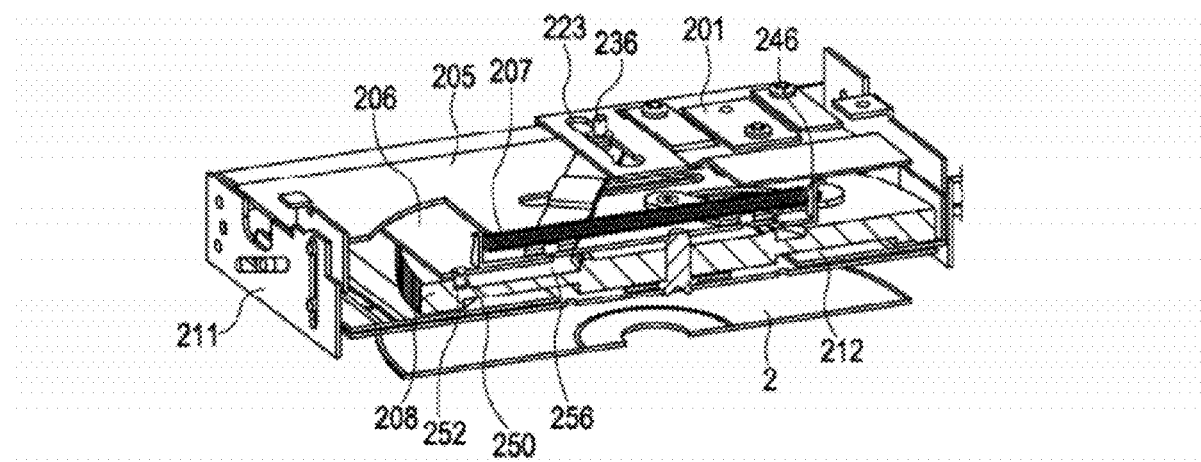
Figure 41B:
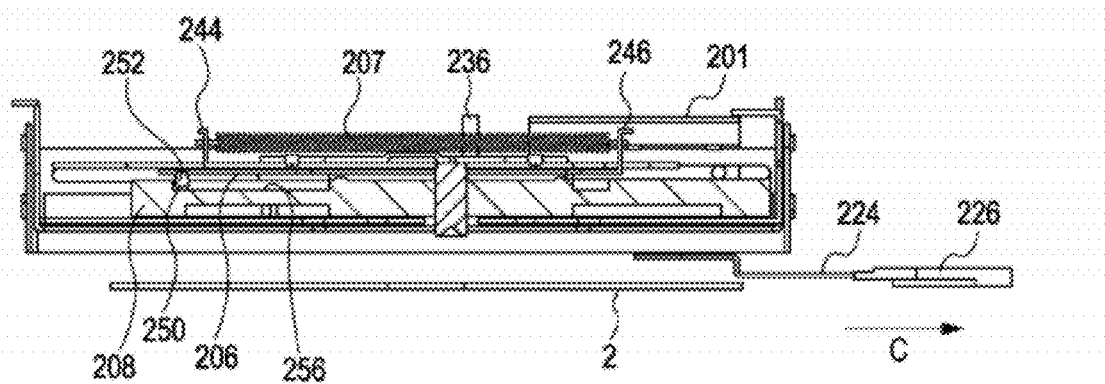

As shown in FIGS. 41A and 41B, in the slide limiter mechanism 255, in the state in which the sliding of the loading arm 201 is not restricted, the slide cam pin 250 of the slide plate 206 is slid on the lateral surface of the outer circumferential side of the slide cam groove 252 of the cam gear 208 and is slid in the direction opposite to the arrow E in FIGS. 41A and 41B. In the slide arms 203 and 204, as the slide plate 206 is slid in the direction opposite to the arrow E, the slide pin 236 pivots to the front surface 60a side of the apparatus body 60. Therefore, the loading arm 201 is slid in the direction of the arrow C in FIGS. 41A and 41B to push back the optical disc 2 to the inside of the lower shell 12.

Figure 42A:
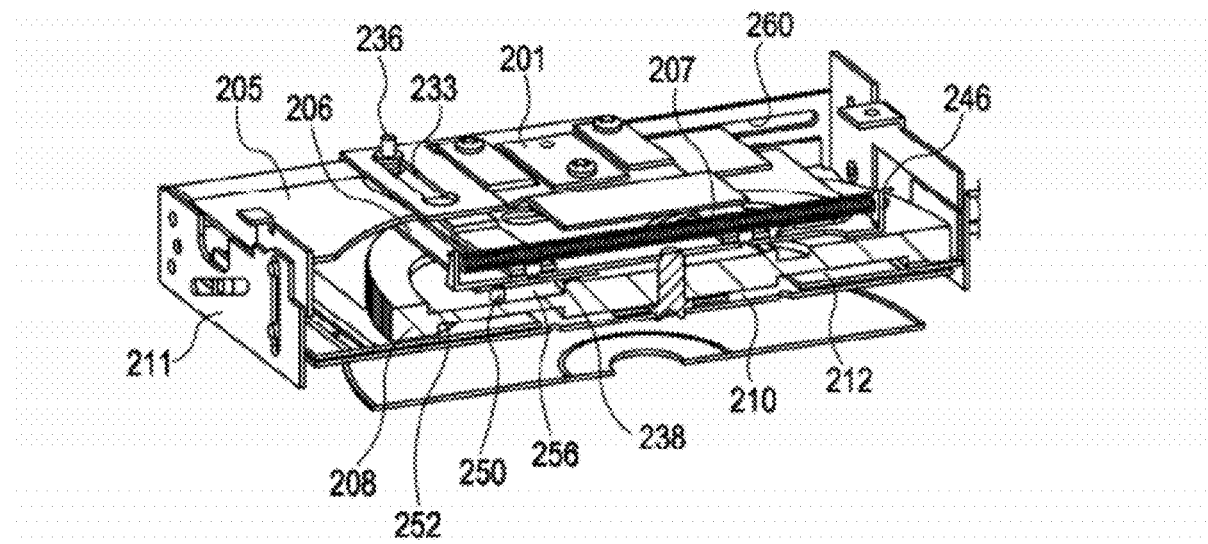
Figure 42B:
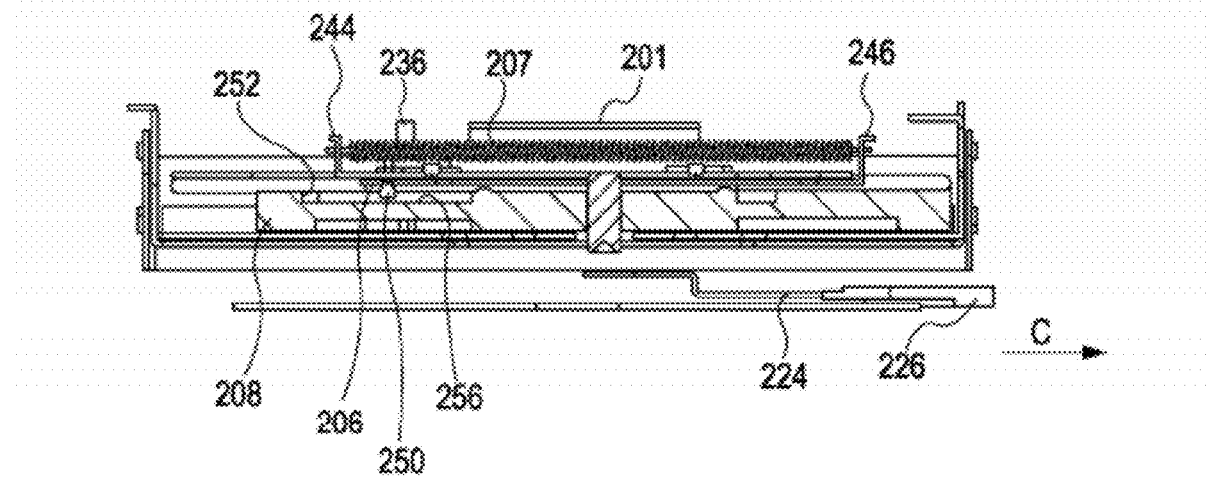

As shown in FIGS. 42A and 42B, if the sliding of the loading arm 201 in the direction of the arrow C is restricted, since the pivoting of the slide arms 203 and 204 and the sliding of the slide plate 206 in the direction opposite to the arrow E are restricted, the slide cam pin 250 is not able to be slid along the lateral surface of the outer circumferential side of the slide cam groove 252. At this time, since the slide limiter mechanism 255 is provided with the retreat space 256 from the lateral surface of the outer circumference side of the slide cam groove 252 to the support shaft through-hole 254 side, the slide cam pin 250 is moved along the retreat space 256. Consequently, the loading arm 201 and the optical disc 2 are applied with only the load generated by the extension of the slide biasing spring 207 between the slide plate 206 and the obstacle for restricting the sliding of the loading arm 201, and are not pinched by the driving force transferred from the driving motor 209 via the cam gear 208 and the obstacle for restricting the sliding of the loading arm 201, thereby preventing the optical disc from being deformed due to the application of excessive load.

The present application contains subject matter related to that disclosed in Japanese Priority Patent Application JP 2009-261406 filed in the Japan Patent Office on Nov. 16, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A cartridge drive apparatus for a disc cartridge having upper and lower shells that are separately joined to each other to form a cartridge body, in which an accommodated disc is inserted or ejected by separating the upper and lower shells vertically, the cartridge drive apparatus comprising:
   a cartridge holder which, by inserting the cartridge body, has an upper holder supporting the upper shell and a lower holder supporting the lower shell; and
   a holder moving mechanism that separates the upper holder and the lower holder of the cartridge holder to separate the upper shell and the lower shell and thus is able to allow the disc to be inserted or ejected;
   the holder moving mechanism moves one shell, in which the disc is accommodated, of the upper and lower shells, and holds the other shell, in which the disc is not accommodated, at an insertion position;
   the disc is accommodated in the lower shell of the disc cartridge;
   the holder moving mechanism includes an upper cam slit, which slides the upper holder in a horizontal direction in which the cartridge body is inserted or removed, and a lower cam slit, which slides the lower holder in the horizontal direction and moves up and down the lower holder in a vertical direction substantially perpendicular to the horizontal direction to be vertically separated from or joined to the upper holder; and
   the upper and lower shells are slid in an integrated manner throughout the insertion position and an insertion/removal position in which the cartridge body is inserted in or removed from the apparatus body, so that the upper shell is held at the insertion position and the lower holder is moved up and down throughout the insertion position and an insertion/ejection position at which the disc is inserted or ejected.

2. The cartridge drive apparatus according to claim 1, wherein:
   the disc cartridge receives a plurality of discs that are stacked in parallel with a main surface of the cartridge body; and
   the holder moving mechanism moves the lower holder to the insertion/ejection position to select one of the plurality of discs and is able to allow the selected disc to be inserted or ejected.

3. The cartridge drive apparatus according to claim 2, wherein the lower holder is engaged with one of the plurality of slits which are vertically arranged in a lifting direction and are formed at an interval according to a stacked interval of the discs, to restrict a moving height.

4. The cartridge drive apparatus according to claim 1 or 2, wherein:
   the lower cam slit has a horizontal portion for guiding horizontal movement and a vertical portion for guiding vertical movement, and a cam pin, arranged in a protruding manner at the lower holder, is inserted in the lower cam slit;
   the apparatus further comprises a biasing member for biasing the upper and lower holders toward the insertion/removal position, and a locking member which is locked to a holding piece arranged in a protruding manner at the lower holder; and
   in which the locking member is engaged with the holding piece, so that the lower holder is held against a biasing force of the biasing member to position the cam pin on the vertical portion.

5. The cartridge drive apparatus according to claim 4, wherein the cam slit is provided with a preliminary horizontal portion at an end portion of the horizontal portion in an insertion direction of the cartridge body, in which the cam pin is moved along the preliminary horizontal portion through the vertical portion.

6. A cartridge drive apparatus for a disc cartridge having upper and lower shells that are separately joined to each other to form a cartridge body, in which an accommodated disc is inserted or ejected by separating the upper and lower shells vertically, the cartridge drive apparatus comprising:
   a cartridge holder which has an upper holder supporting the upper shell and a lower holder supporting the lower shell; and
   a holder moving mechanism that separates the upper holder and the lower holder of the cartridge holder to separate the upper shell and the lower shell and thus is able to allow the disc to be inserted or ejected;
   the holder moving mechanism moves one shell, in which the disc is accommodated, of the upper and lower shells, and holds the other shell, in which the disc is not accommodated, at an insertion position;
   the disc is accommodated in the lower shell of the disc cartridge;
   the holder moving mechanism includes an upper cam slit, which slides the upper holder in a horizontal direction in which the cartridge body is inserted or removed, and a lower cam slit, which slides the lower holder in the horizontal direction and moves up and down the lower holder in a vertical direction substantially perpendicular to the horizontal direction to be vertically separated from or joined to the upper holder; and
   the upper and lower shells are slid in an integrated manner throughout the insertion position and an insertion/removal position in which the cartridge body is inserted in or removed from the apparatus body, so that the upper shell is held at the insertion position and the lower holder is moved up and down throughout the insertion position and an insertion/ejection position at which the disc is inserted or ejected;
   wherein, a lock piece faces a separation groove which is formed at a pair of mutual facing lateral surfaces along a boundary of the upper and lower shells, in which the cartridge body is slid to one side, so that the upper and lower shells are engaged with each other, while the cartridge body is slid to the other side, so that the engagement of the upper and lower shells are released; and
   wherein, the cartridge holder is provided with a lock releasing piece for releasing the lock piece, which enters into the separation groove to slide the lock piece by inserting the cartridge body into an inside of the cartridge holder.

7. The cartridge drive apparatus according to claim 6, wherein:
the disc cartridge is provided with the lock piece at a rear side of the cartridge body in the insertion direction;
an insertion/removal opening, through which the cartridge body is inserted or removed, is provided with a center bezel which is slid and pivoted on an upper surface of the cartridge body, and a pair of side bezels which are slid and pivoted on a pair of lateral surfaces of the cartridge body, in which the insertion/removal opening is closed by the center bezel and the pair of side bezels; and
the lock releasing piece is installed adjacent to the insertion/removal opening at a position which is retreated from a pivot region of the side bezels.

* * * * *